US012785993B2

(12) United States Patent
Fiebrink et al.

(10) Patent No.: US 12,785,993 B2
(45) Date of Patent: Nov. 3, 2026

(54) SYSTEMS AND METHODS FOR ABUSE SAFEGUARDS IN NFT-DIRECTED ENVIRONMENTS

(71) Applicant: Artema Labs, Inc, Los Angeles, CA (US)

(72) Inventors: Rebecca Anne Fiebrink, London (GB); Michael Leisz, Los Angeles, CA (US); Ajay Kapur, Valencia, CA (US); Bjorn Markus Jakobsson, New York, NY (US); Keir Finlow-Bates, Eura (FI); Sven Stefan Dufva, Stockholm (SE); Guy Stewart, Olympia, WA (US)

(73) Assignee: Artema Labs, Inc, Los Angeles, CA (US)

( * ) Notice: Subject to any disclaimer, the term of this patent is extended or adjusted under 35 U.S.C. 154(b) by 114 days.

(21) Appl. No.: 18/839,701

(22) PCT Filed: Feb. 17, 2023

(86) PCT No.: PCT/US2023/062851

§ 371 (c)(1),
(2) Date: Aug. 19, 2024

(87) PCT Pub. No.: WO2023/159203

PCT Pub. Date: Aug. 24, 2023

(65) Prior Publication Data

US 2025/0392483 A1 Dec. 25, 2025

Related U.S. Application Data

(60) Provisional application No. 63/368,218, filed on Jul. 12, 2022, provisional application No. 63/365,936, filed on Jun. 6, 2022, provisional application No. 63/314,293, filed on Feb. 25, 2022, provisional application No. 63/311,322, filed on Feb. 17, 2022.

(51) Int. Cl.
*H04L 9/00* (2022.01)
*H04L 9/08* (2006.01)

(52) U.S. Cl.
CPC ................ *H04L 9/50* (2022.05); *H04L 9/085* (2013.01)

(58) Field of Classification Search
CPC ................................. H04L 9/50; H04L 9/085
See application file for complete search history.

(56) References Cited

U.S. PATENT DOCUMENTS

| | | | | |
|---|---|---|---|---|
| 11,496,327 | B1 * | 11/2022 | Kaplan | G06Q 20/02 |
| 2019/0058581 | A1 * | 2/2019 | Wood | H04L 9/3239 |
| 2021/0166206 | A1 * | 6/2021 | Moiyallah, Jr. | G06Q 20/363 |
| 2022/0374886 | A1 * | 11/2022 | Micali | G06F 21/64 |

* cited by examiner

*Primary Examiner* — Henry Tsang
(74) *Attorney, Agent, or Firm* — KPPB LLP

(57) ABSTRACT

Systems and techniques to protect against abuses in the transfer and maintenance of tokens within NFT platforms are illustrated. One embodiment includes a method to facilitate filtration in blockchains. The method recovers, from a list of prospective entries to be appended to a primary blockchain, a reference to a blockchain entry. The method obtains a certainty level associated with the blockchain entry. The method assesses a classification of the blockchain entry based on the associated certainty level. The method determines whether to record the blockchain entry on the primary blockchain based on the classification.

16 Claims, 41 Drawing Sheets

SYSTEMS AND METHODS FOR ABUSE SAFEGUARDS IN NFT-DIRECTED ENVIRONMENTS

CROSS-REFERENCE TO RELATED APPLICATIONS

The current application is a national stage of PCT Application No. PCT/US2023/062851, titled "Systems and Methods for Abuse Safeguards in NFT-Directed Environments," filed Feb. 17, 2023, which claims the benefit of and priority under 35 U.S.C. § 119 (e) to U.S. Provisional Patent Application No. 63/311,322, titled "Methods for Assigning and Maintaining NFT Relationships," filed Feb. 17, 2022, U.S. Provisional Patent Application No. 63/314,293, titled "Second Factor Improvement Technology," filed Feb. 25, 2022, U.S. Provisional Patent Application No. 63/365,936, titled "Using Watchful Bridging for Blockchain Fraud Prevention," filed Jun. 6, 2022, and U.S. Provisional Patent Application No. 63/368,218, titled "Watchful Consensus Mechanisms," filed Jul. 12, 2022, the disclosures of which are hereby incorporated by reference in their entireties for all purposes.

FIELD OF THE INVENTION

The present invention generally relates to systems and methods directed to preventing system abuse within collaborative blockchain configurations, including but not limited to L2 blockchains.

BACKGROUND

The efficiency of blockchains used to record entities like non-fungible tokens (NFTs) and other forms of representative tokens, benefits from combining the processing capabilities of multiple blockchains. For example, this can happen when supplementary ("Layer 2", "L2") blockchain establishes a bridge (connection) to a primary ("Layer 1", "L1") blockchain. Layer 2 blockchains are frequently used to help process incoming transactions, increasing transaction speed by sharing the load faced by the Layer 1 blockchain. Responsibilities, through the configurations of layer protocols, may be distributed, with the Layer 2 blockchain configured for processing off-chain transactions that are subsequently added/recorded on the main blockchain. A Layer 2 blockchain can be used to lower costs of operation batching entries, lowering costs, such as gas fees and environmental impact, since the Layer 2 protocol may typically use a less expensive technology than the Layer 1 protocol. Using the periodic batch recording of chain segments from the Layer 2 chain onto the Layer 1 chain, the main blockchain can still retain the security and permanence of a standard blockchain while increasing throughput and decreasing transaction fees. As such, Layer 1 blockchains will handle security, permanence and decentralization, while Layer 2 blockchains will handle scalability (i.e., transactions per second). In some instances, blockchains may be tertiary ("Layer 3", "L3") blockchains, frequently used to host decentralized network applications.

SUMMARY OF THE INVENTION

Systems and techniques to protect against abuses in the transfer and maintenance of tokens within NFT platforms are illustrated. One embodiment includes a method to facilitate filtration in blockchains. The method recovers, from a list of prospective entries to be appended to a primary blockchain, a reference to a blockchain entry, wherein the blockchain entry corresponds to a transaction. The method obtains a certainty level associated with the blockchain entry, wherein the certainty level reflects a likelihood that recording the blockchain entry on the primary blockchain will have harmful effects on the primary blockchain. The method assesses a classification of the blockchain entry based on the associated certainty level, wherein the classification is made a confirmation classification when the certainty level falls under a minimum threshold. The method determines whether to record the blockchain entry on the primary blockchain based on the classification, wherein the blockchain entry is recorded on the primary blockchain when the classification is the confirmation classification.

In a further embodiment, the blockchain entry is temporarily stored on a secondary blockchain associated with the list of prospective entries during the determination of whether to record the blockchain entry on the primary blockchain.

In a still further embodiment, the primary blockchain is a layer-1 (L1) blockchain and the secondary blockchain is a layer-2 (L2) blockchain.

In another embodiment, when assessing the classification of the blockchain entry, the classification is made a blocking classification when the certainty level exceeds a maximum threshold; and the blockchain entry is deleted and the transaction associated with the blockchain entry is cancelled when the classification is a blocking classification.

In a further embodiment, when assessing the classification of the blockchain entry, the classification is made a delay classification when the certainty level neither exceeds the maximum threshold nor falls below the minimum threshold.

In a further embodiment, the blockchain entry is stored on a new secondary blockchain associated with a list of prospective entries to be appended to a new primary blockchain when the classification is the delay classification.

In another further embodiment, assessing the classification of the blockchain entry is performed by a vote conducted among a plurality of parties.

In a still further embodiment, the vote is conducted through a consensus mechanism.

In another further embodiment, the vote is conducted through a quorum; and the quorum is determined through an application of digital signatures, using at least one private key.

In a further embodiment, the at least one private key is shared with the plurality of parties using a polynomial secret sharing method.

In another further embodiment, the vote is conducted such that: the classification is made the confirmation classification when a particular majority of votes of the plurality of parties have voted to record the blockchain entry; the classification is made the blocking classification when a particular majority of votes of the plurality of parties have voted to refuse the blockchain entry; and the classification is made the delay classification when there are insufficient votes for a particular majority to exist for at least one of the recording of the blockchain entry and the refusal of the blockchain entry.

In another embodiment, assessing the classification of the blockchain entry is based on at least one of: feedback from at least one entity; time elapsed from when the transaction occurred; time elapsed from when the reference to the blockchain entry was first stored on the list of prospective entries; and a result from a process evaluating the blockchain entry.

In a further embodiment, the classification is made a delay classification when no feedback is received from the at least one entity before a predetermined amount of time after the transaction.

In another further embodiment, an entity is selected from the group consisting of: a smart contract; a bounty hunter, wherein the bounty hunter provides evidence of abuse associated with the transaction in exchange for a benefit; and an oracle.

In still another further embodiment, the determination of whether to record the blockchain entry on the primary blockchain is performed by a bridge between the primary blockchain and the secondary blockchain.

In a further embodiment, the bridge between the primary blockchain and the secondary blockchain is generated at periodic intervals, within which the recording of blockchain entries referenced on the list of prospective entries are added to the primary blockchain.

In another embodiment, when the classification is a confirmation classification, the blockchain entry is hashed; and a hash value that results from the hash is logged on the primary blockchain.

In a still further embodiment, the hash is performed by at least one of: a proof of history configuration; and a Merkle tree constructed by a bridge between the primary blockchain and a secondary blockchain associated with the list of prospective entries that temporarily stores the blockchain entry.

In another embodiment, the primary blockchain is an L2 blockchain.

In a further embodiment, the blockchain entry is temporarily stored on an L3 blockchain.

One embodiment includes a non-transitory computer-readable medium storing instructions that, when executed by a processor, are configured to cause the processor to facilitate filtration in blockchains. The processor recovers, from a list of prospective entries to be appended to a primary blockchain, a reference to a blockchain entry, wherein the blockchain entry corresponds to a transaction. The processor obtains a certainty level associated with the blockchain entry, wherein the certainty level reflects a likelihood that recording the blockchain entry on the primary blockchain will have harmful effects on the primary blockchain. The processor assesses a classification of the blockchain entry based on the associated certainty level, wherein the classification is made a confirmation classification when the certainty level falls under a minimum threshold. The processor determines whether to record the blockchain entry on the primary blockchain based on the classification, wherein the blockchain entry is recorded on the primary blockchain when the classification is the confirmation classification.

In a further embodiment, the blockchain entry is temporarily stored on a secondary blockchain associated with the list of prospective entries during the determination of whether to record the blockchain entry on the primary blockchain.

In a still further embodiment, the primary blockchain is a layer-1 (L1) blockchain and the secondary blockchain is a layer-2 (L2) blockchain.

In another embodiment, when assessing the classification of the blockchain entry, the classification is made a blocking classification when the certainty level exceeds a maximum threshold; and the blockchain entry is deleted and the transaction associated with the blockchain entry is cancelled when the classification is a blocking classification.

In a further embodiment, when assessing the classification of the blockchain entry, the classification is made a delay classification when the certainty level neither exceeds the maximum threshold nor falls below the minimum threshold.

In a further embodiment, the blockchain entry is stored on a new secondary blockchain associated with a list of prospective entries to be appended to a new primary blockchain when the classification is the delay classification.

In another further embodiment, assessing the classification of the blockchain entry is performed by a vote conducted among a plurality of parties.

In a still further embodiment, the vote is conducted through a consensus mechanism.

In another further embodiment, the vote is conducted through a quorum; and the quorum is determined through an application of digital signatures, using at least one private key.

In a further embodiment, the at least one private key is shared with the plurality of parties using a polynomial secret sharing processor.

In another further embodiment, the vote is conducted such that: the classification is made the confirmation classification when a particular majority of votes of the plurality of parties have voted to record the blockchain entry; the classification is made the blocking classification when a particular majority of votes of the plurality of parties have voted to refuse the blockchain entry; and the classification is made the delay classification when there are insufficient votes for a particular majority to exist for at least one of the recording of the blockchain entry and the refusal of the blockchain entry.

In another embodiment, assessing the classification of the blockchain entry is based on at least one of: feedback from at least one entity; time elapsed from when the transaction occurred; time elapsed from when the reference to the blockchain entry was first stored on the list of prospective entries; and a result from a process evaluating the blockchain entry.

In a further embodiment, the classification is made a delay classification when no feedback is received from the at least one entity before a predetermined amount of time after the transaction.

In another further embodiment, an entity is selected from the group consisting of: a smart contract; a bounty hunter, wherein the bounty hunter provides evidence of abuse associated with the transaction in exchange for a benefit; and an oracle.

In still another further embodiment, the determination of whether to record the blockchain entry on the primary blockchain is performed by a bridge between the primary blockchain and the secondary blockchain.

In a further embodiment, the bridge between the primary blockchain and the secondary blockchain is generated at periodic intervals, within which the recording of blockchain entries referenced on the list of prospective entries are added to the primary blockchain.

In another embodiment, when the classification is a confirmation classification, the blockchain entry is hashed; and a hash value that results from the hash is logged on the primary blockchain.

In a still further embodiment, the hash is performed by at least one of: a proof of history configuration; and a Merkle tree constructed by a bridge between the primary blockchain and a secondary blockchain associated with the list of prospective entries that temporarily stores the blockchain entry.

In another embodiment, the primary blockchain is an L2 blockchain.

In a further embodiment, the blockchain entry is temporarily stored on an L3 blockchain.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
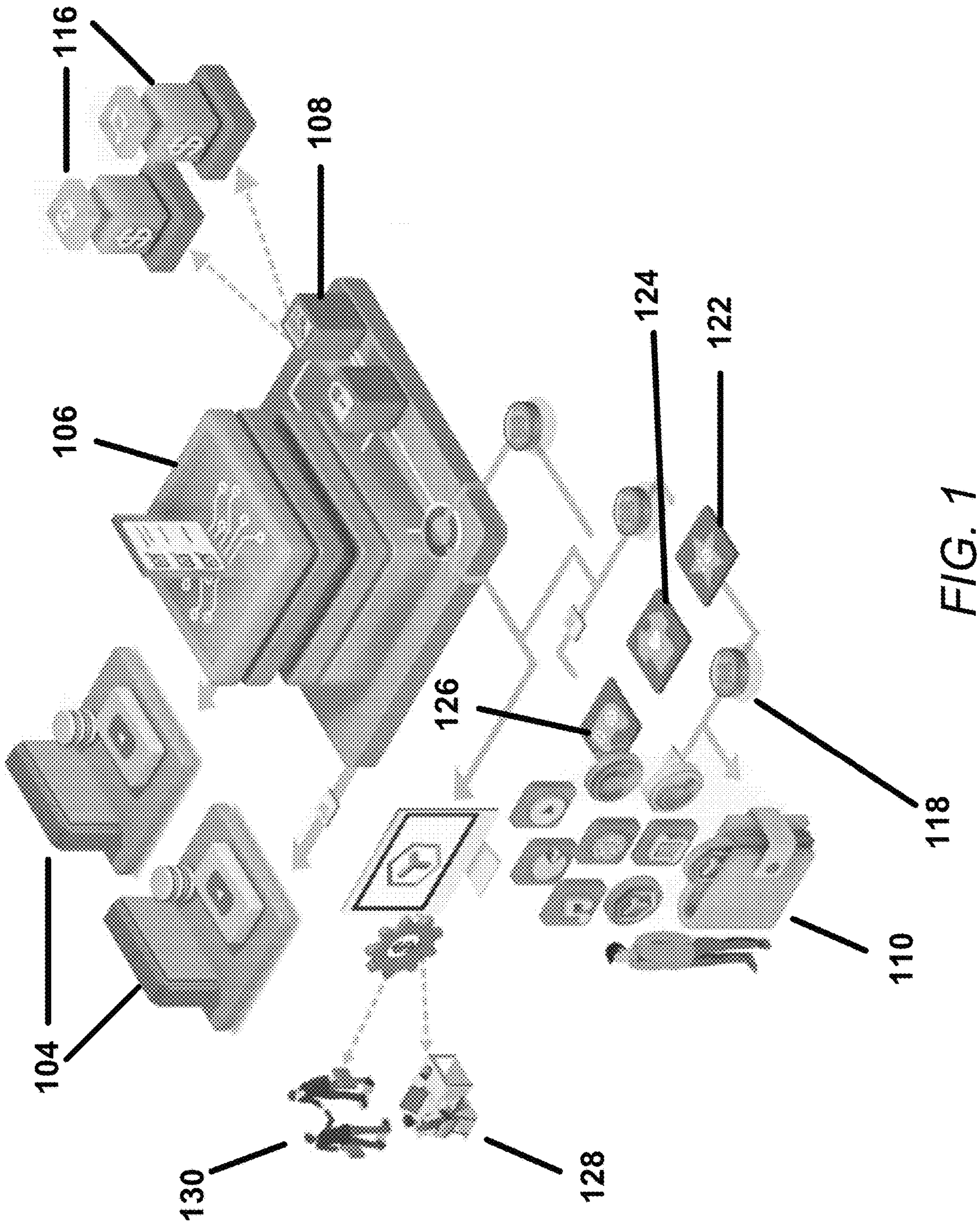
FIG. 1 is a conceptual diagram of an NFT platform in accordance with an embodiment of the invention.

Systems and methods for incorporating abuse prevention-directed functionalities into non-fungible token (NFT) platforms, in accordance with many embodiments of the invention, are described herein. Abuse prevention-directed functionality may include, but is not limited to configurations enabling the analysis of blockchains to identify fraudulent token-based transactions.

NFT platforms in accordance with a number of embodiments of the invention may implement various bridge configurations to enable L1 blockchains to decrease the risk associated with recording entries. Such mechanisms may enable systems and/or users to selectively confirm, block, and/or delay prospective blockchain entries subject to abuse inquiries conducted on L2 blockchains. Systems and methods in accordance with various embodiments may perform such analyses through entities including but not limited to bridges and consensus mechanisms.

Systems in accordance with various embodiments of the invention may associate individually-minted NFTs with other NFTs at the time of minting. In accordance with some embodiments, collections of unique NFTs may be combined into "sets" that, when completed, enable systems to utilize additional functionality. Such functionality may include but is not limited to access to unique content. In accordance with some embodiments, membership in a set may be determined at the time of minting, establishing set associations on blockchains even when metadata is stored off-chain.

Policies configured in accordance with certain embodiments of the invention may enhance authentication protocols to access user credentials. In accordance with many embodiments, these protocols may include but are not limited to pre-established user notification mechanisms and temporary delays for the purpose of ensuring user identity.

While various blockchain and token arrangement configurations are discussed above, recording functionalities that can be utilized within NFT platforms in accordance with various embodiments of the invention are discussed further below.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g., one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g., contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g., transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger.

In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g., Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users 128. In addition, content creators can directly issue NFTs to the media wallets of specific users (e.g., by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
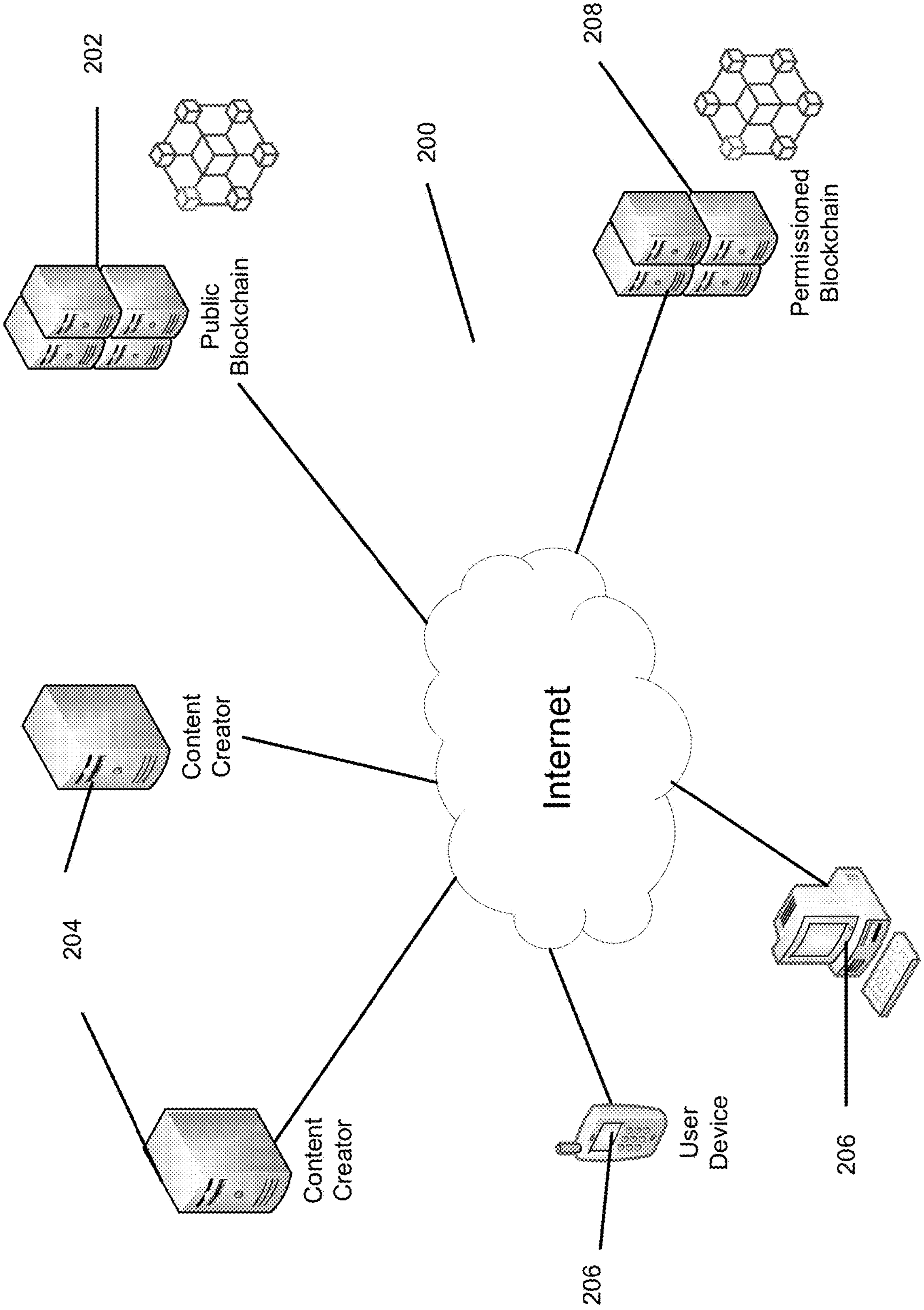
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
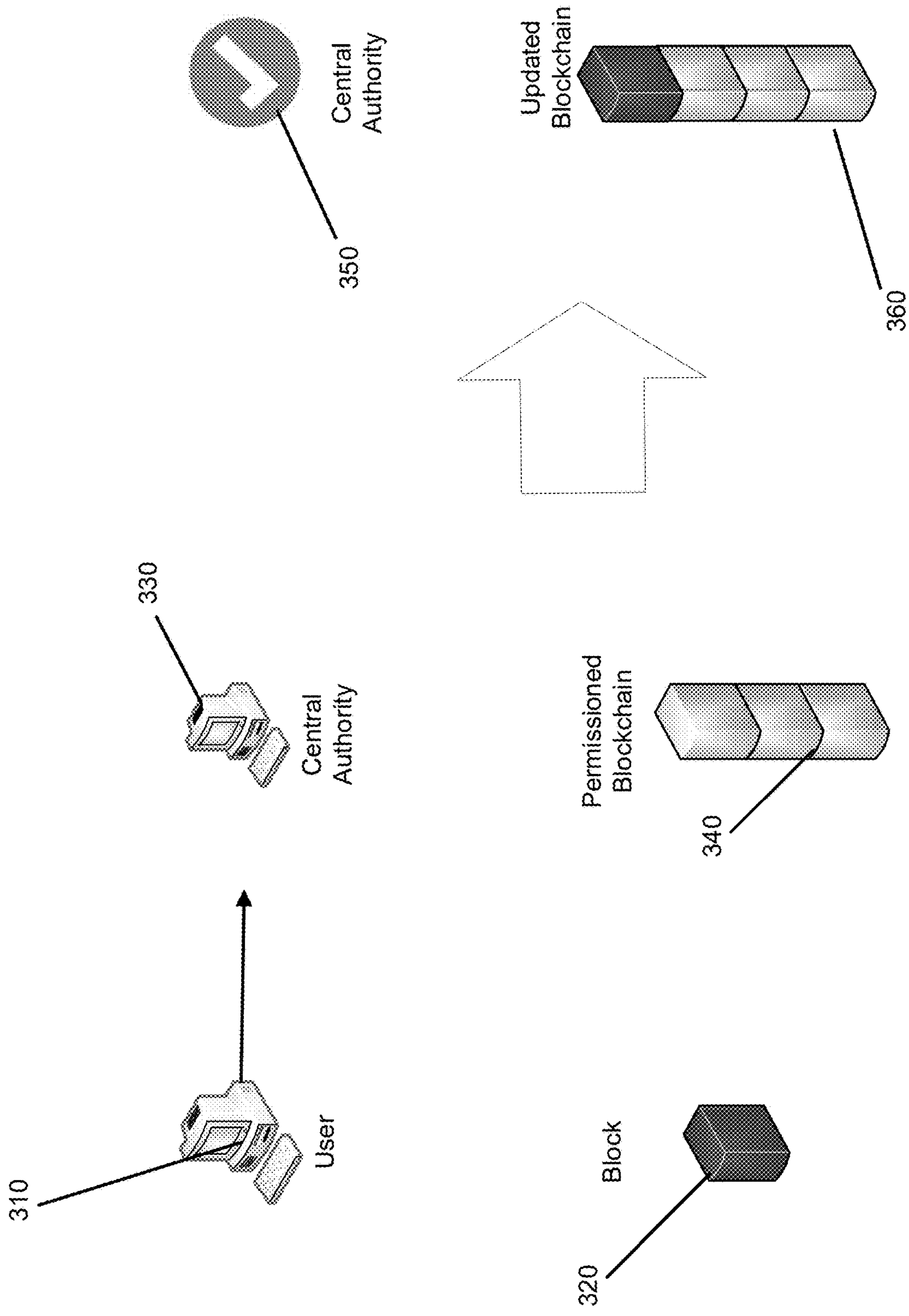
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
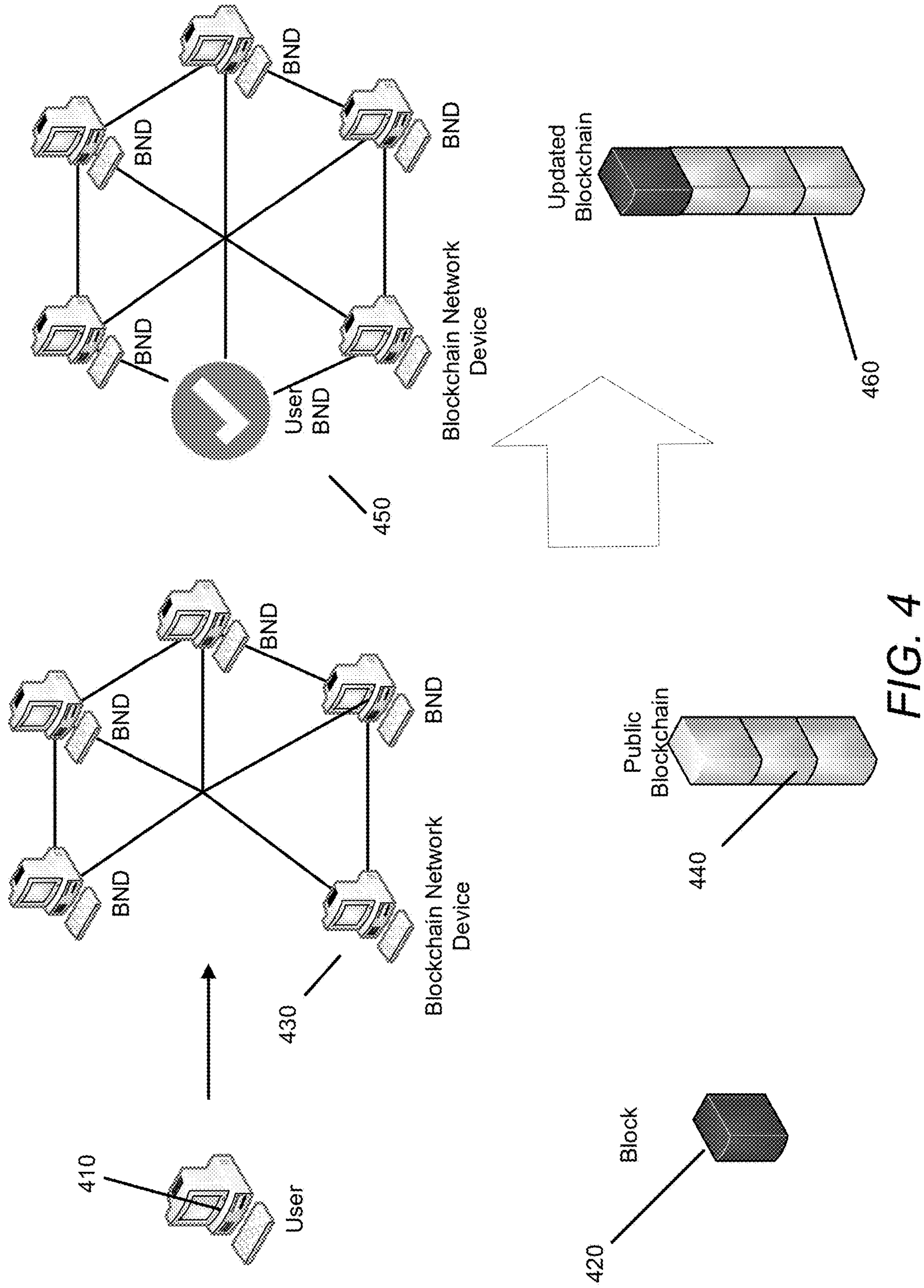
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
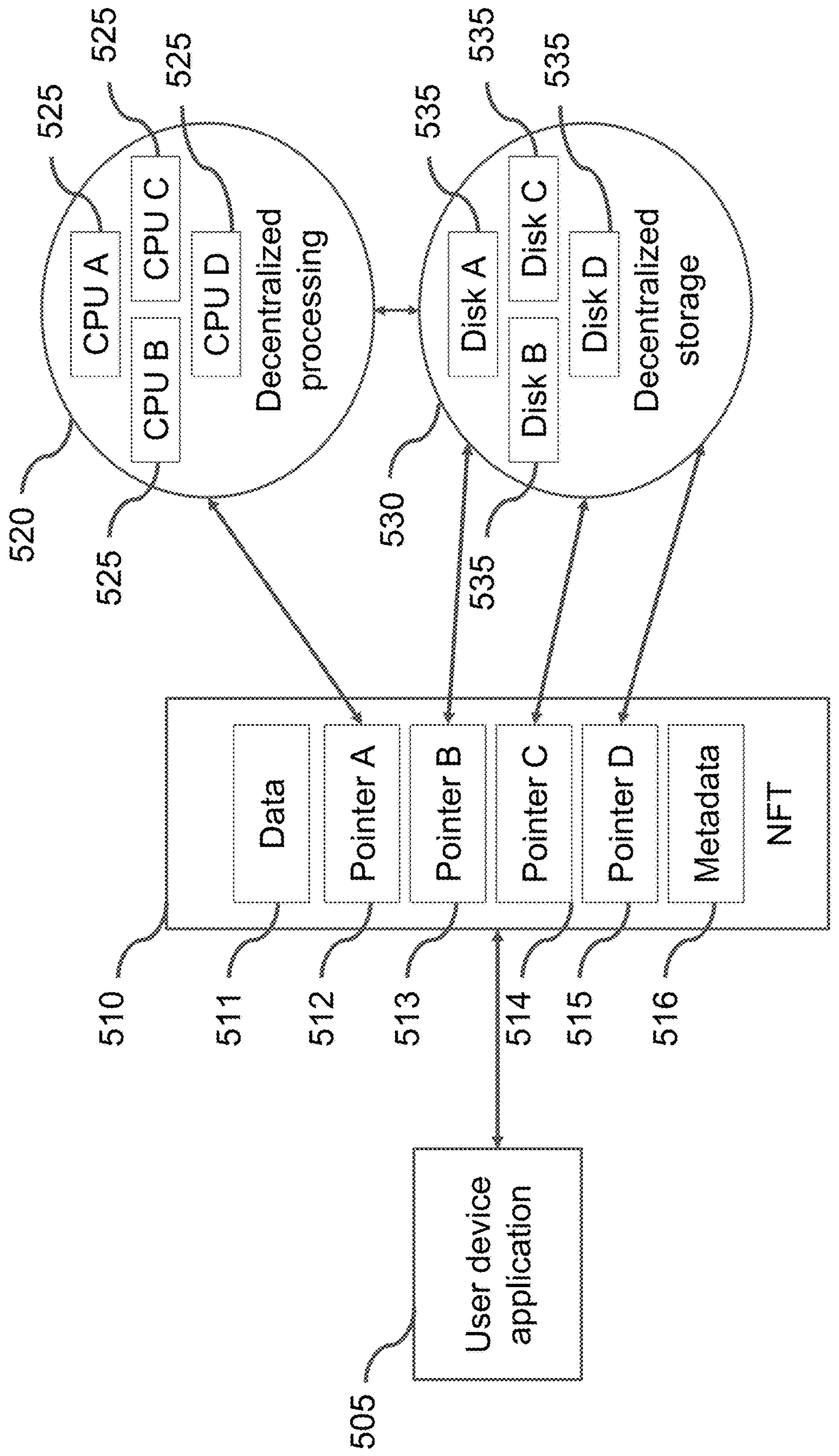
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g., URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
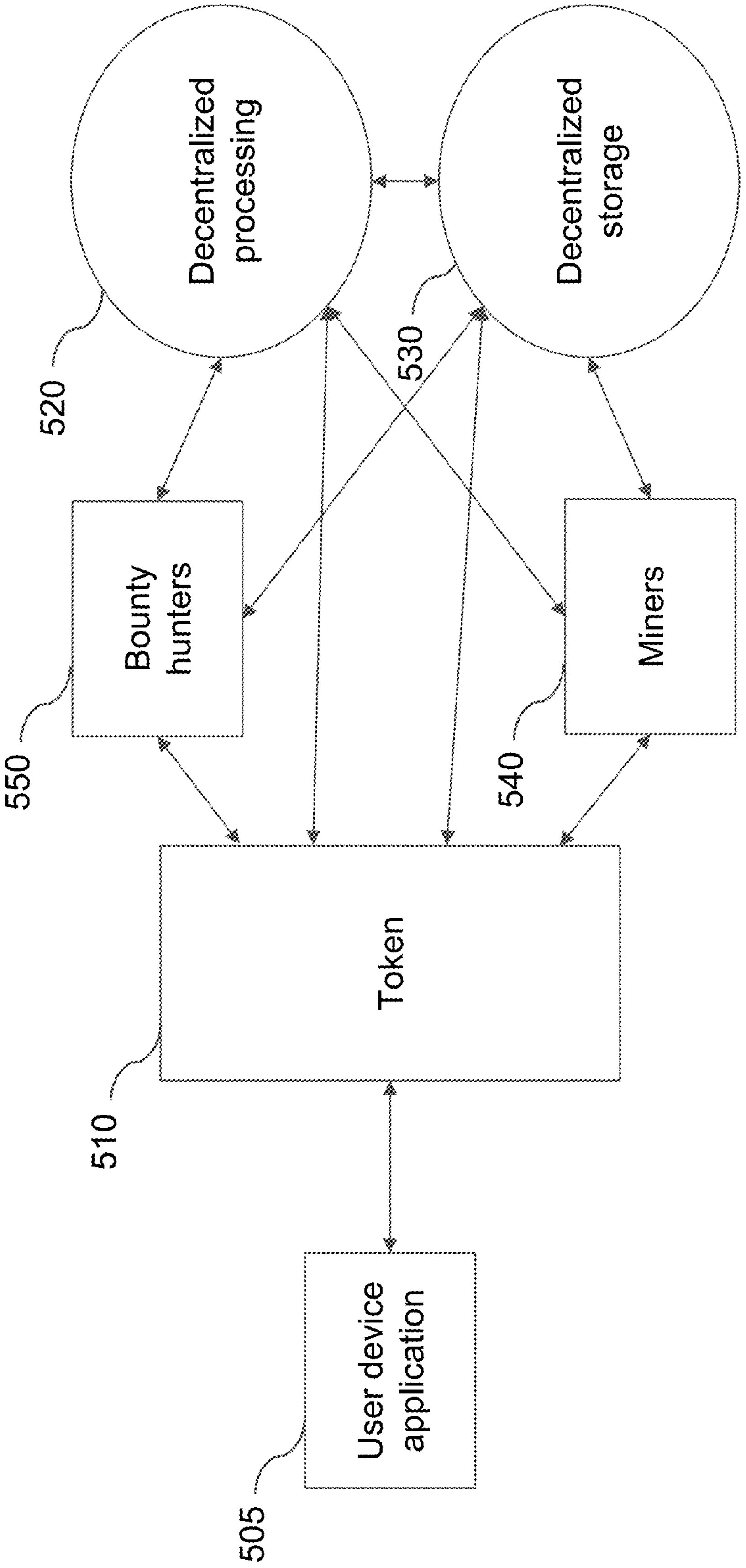

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (POS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
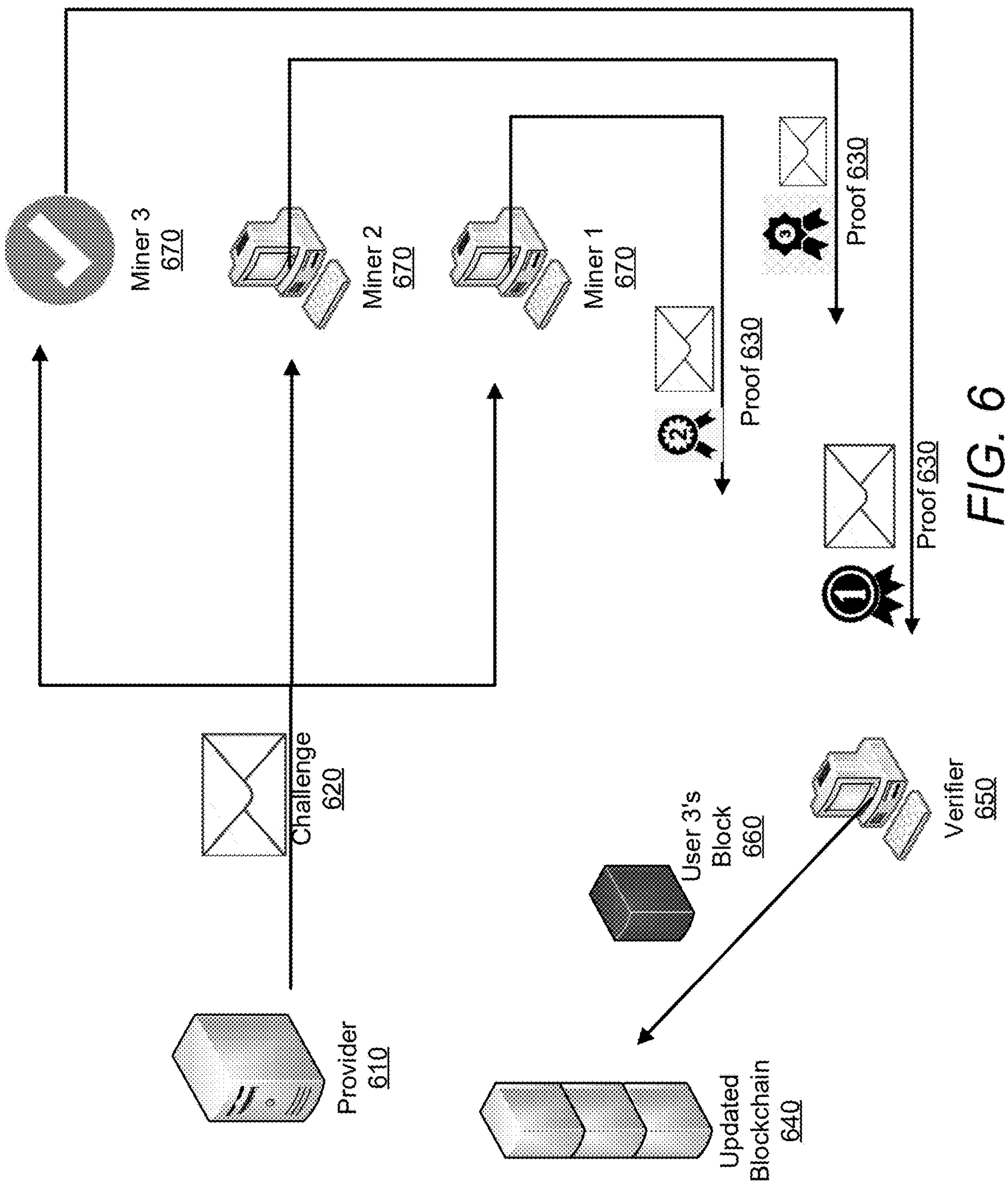
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
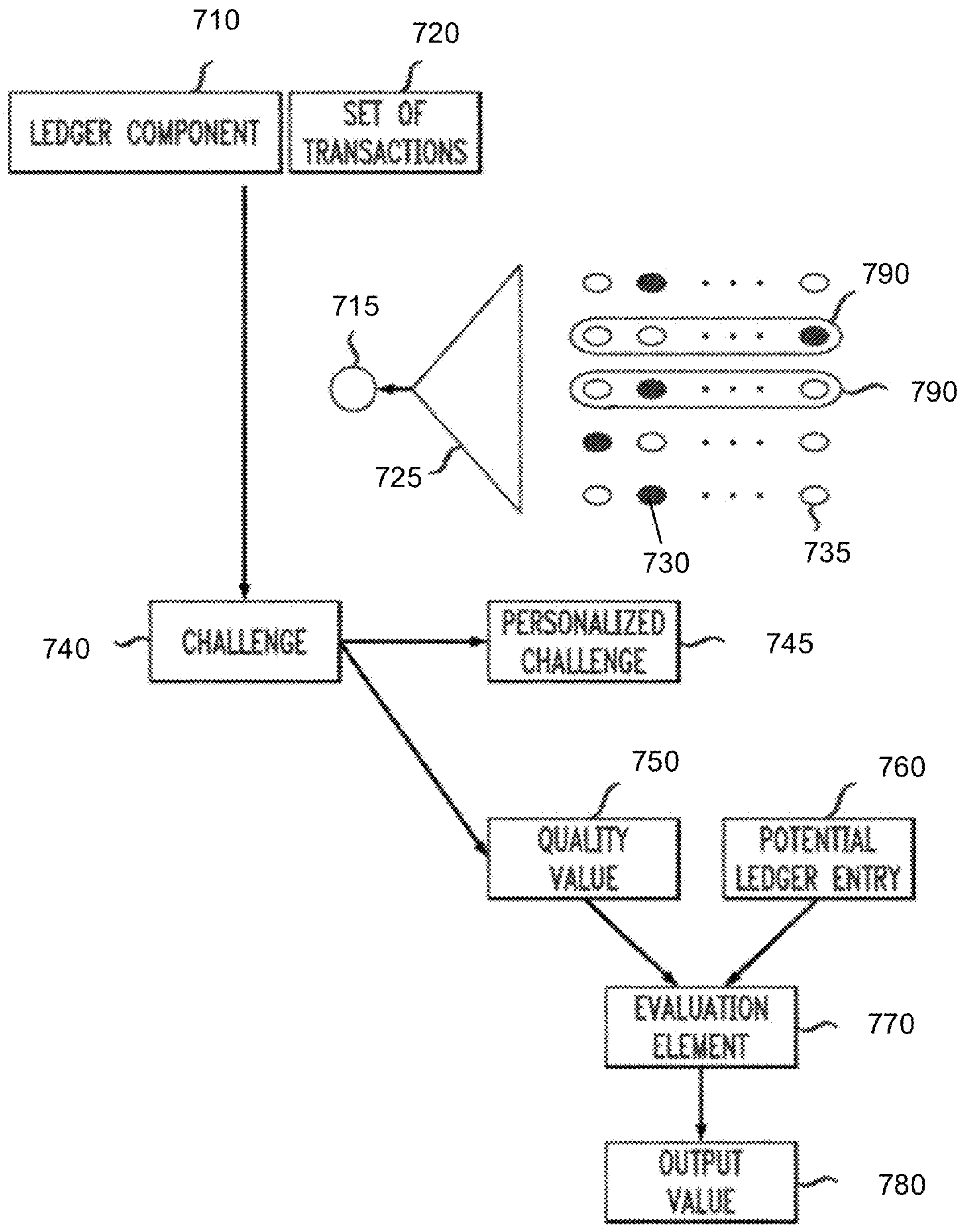
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
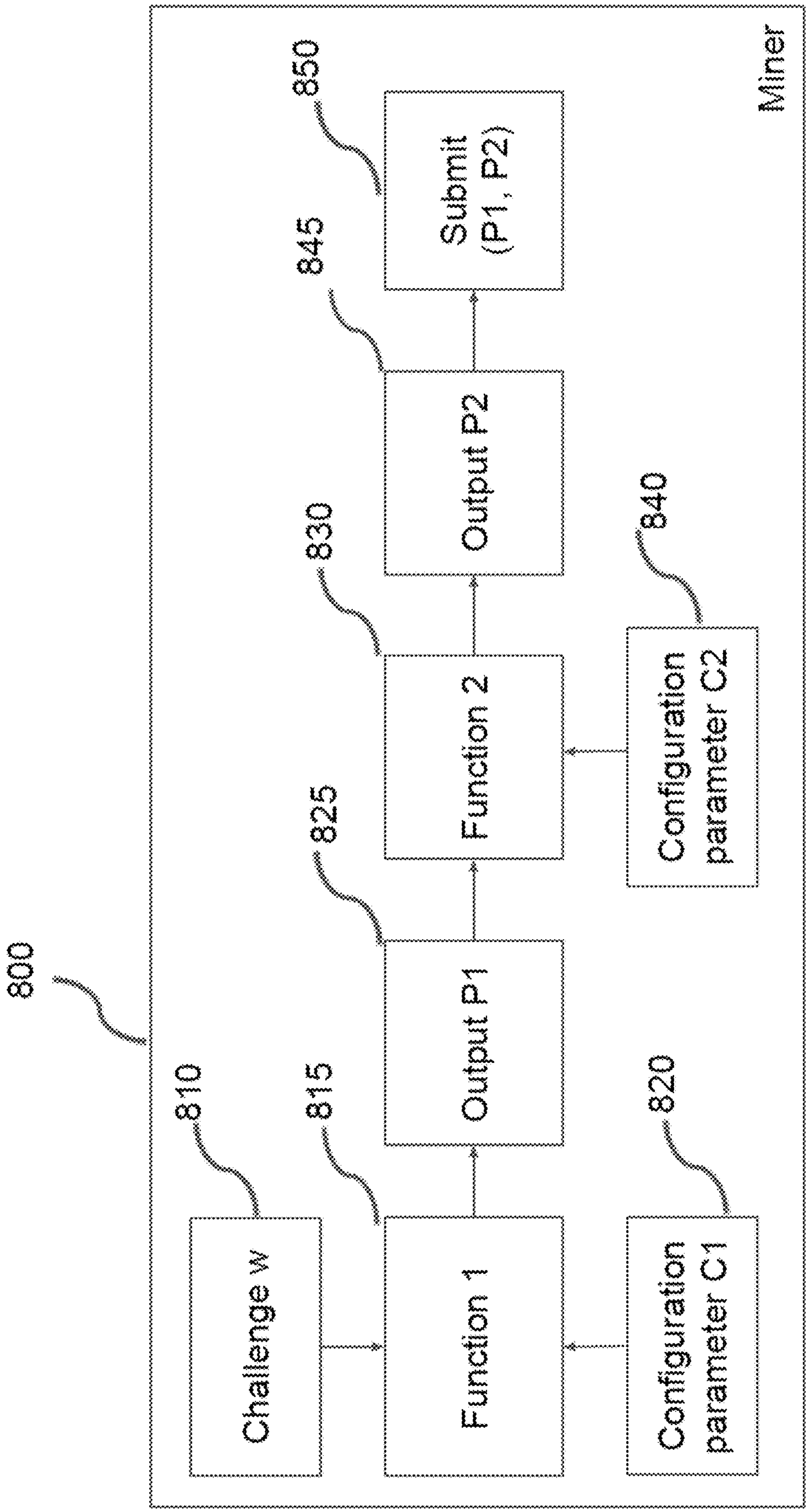
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
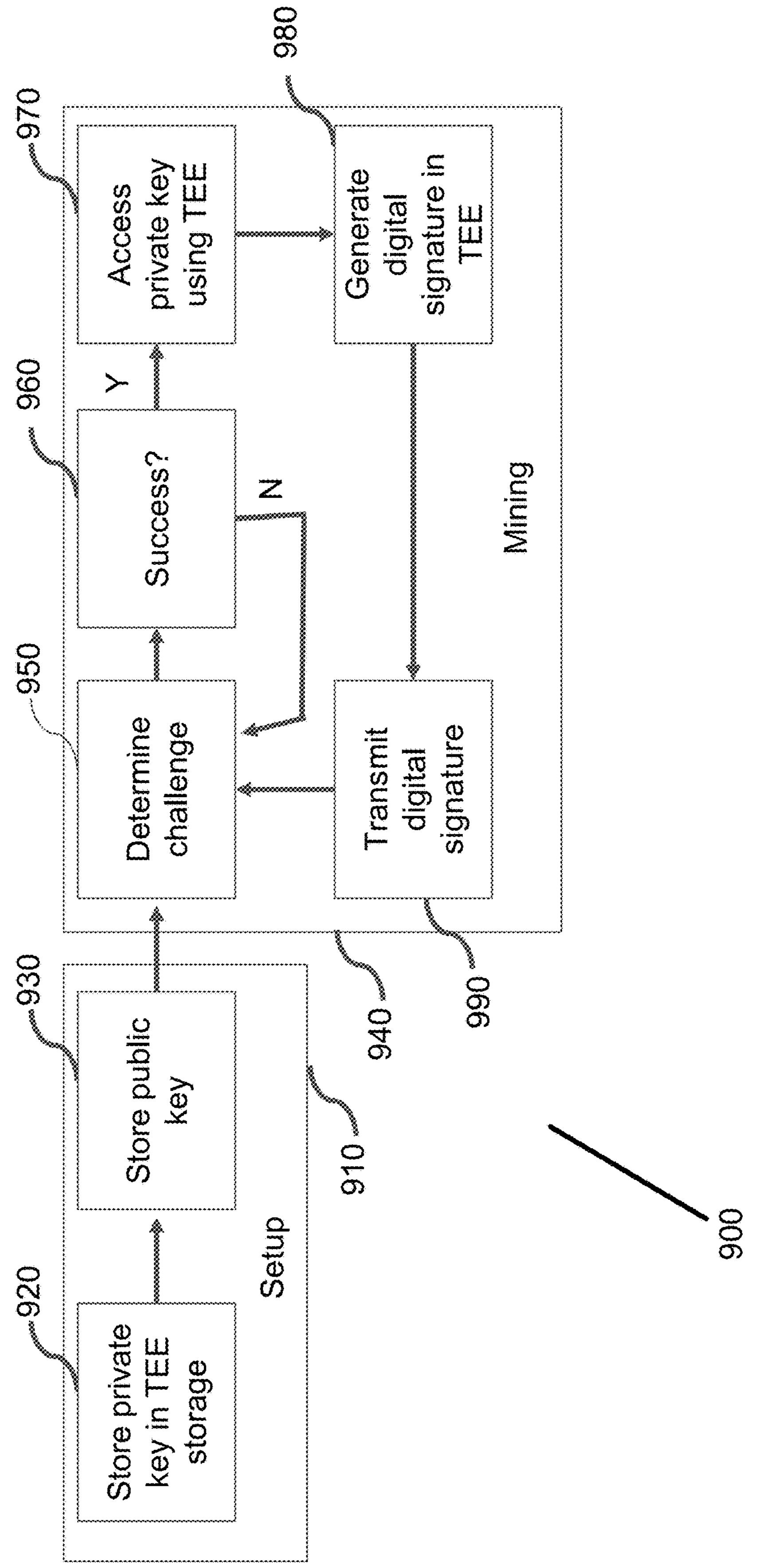
FIG. 9 illustrates a process followed by a Trusted Execution Environment-based consensus mechanism in accordance with some embodiments of the invention.

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g., the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
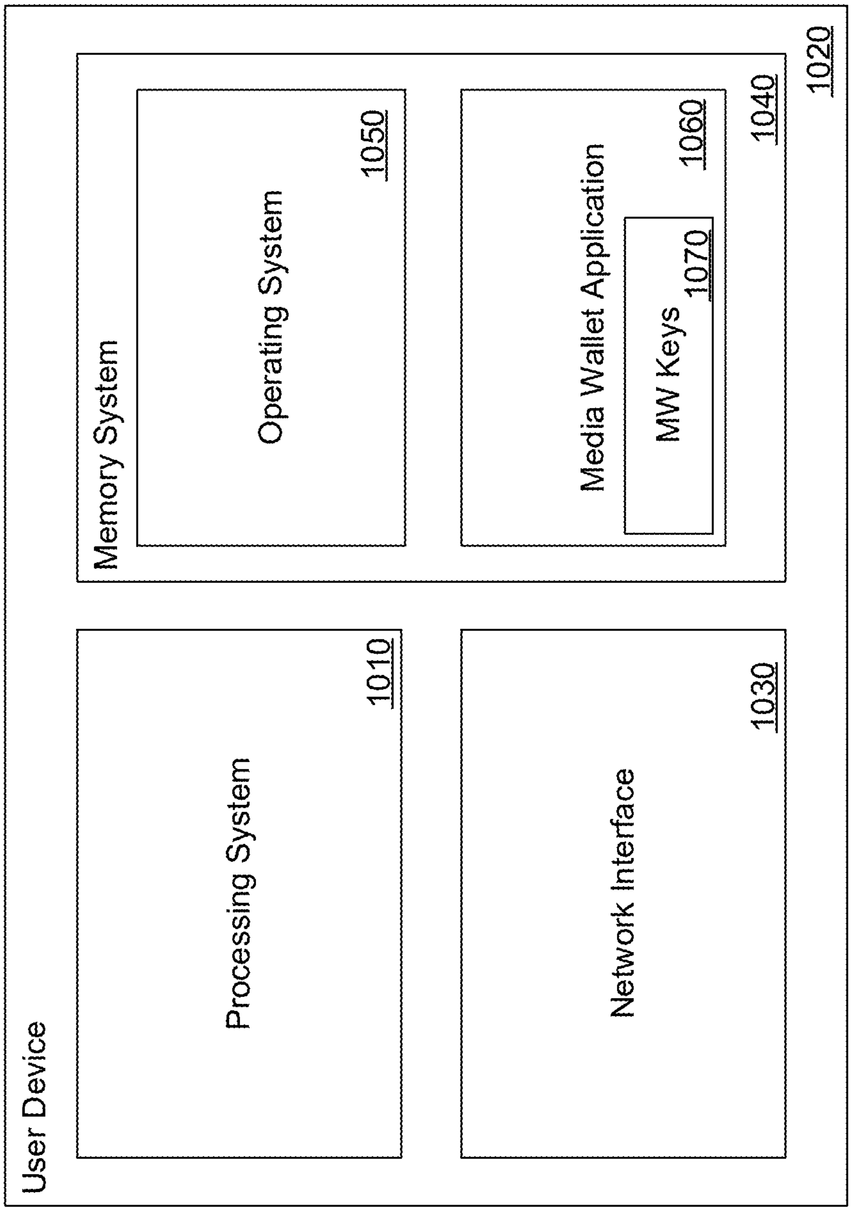
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
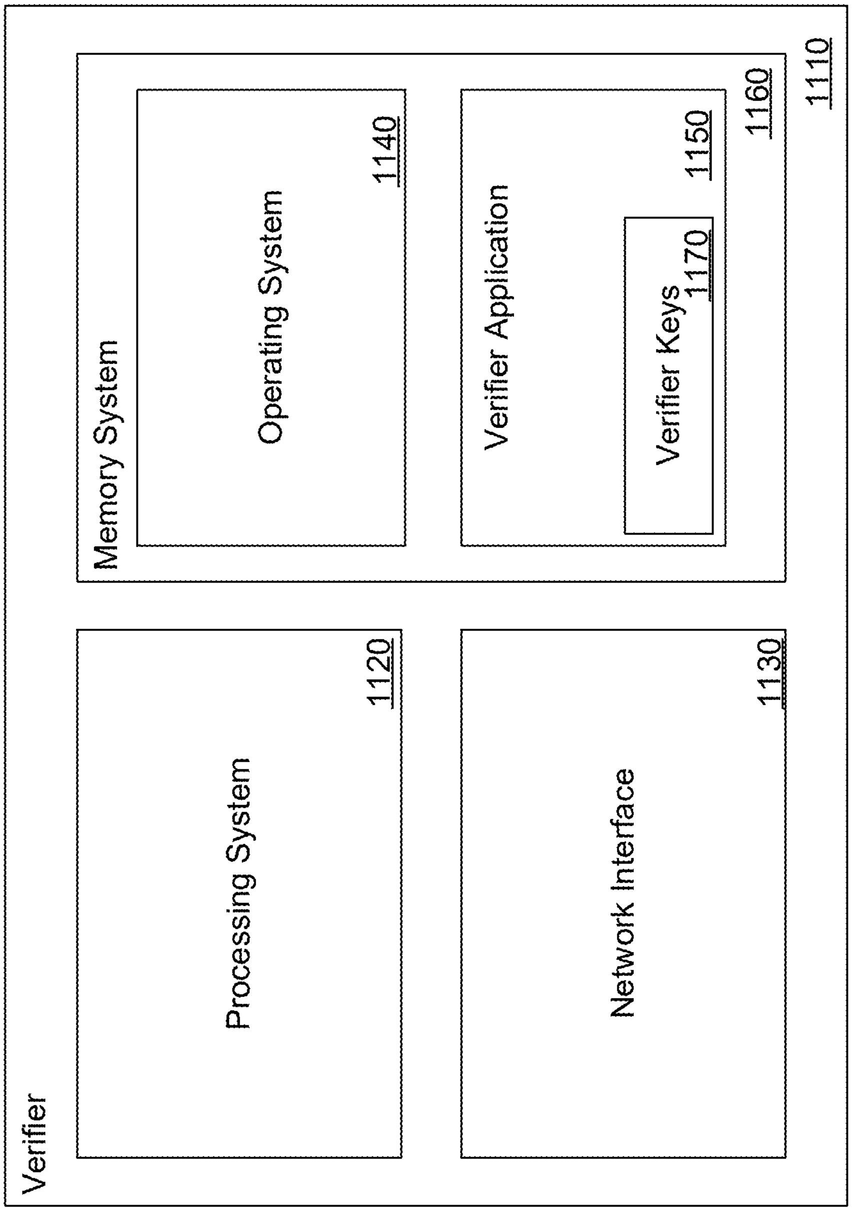

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
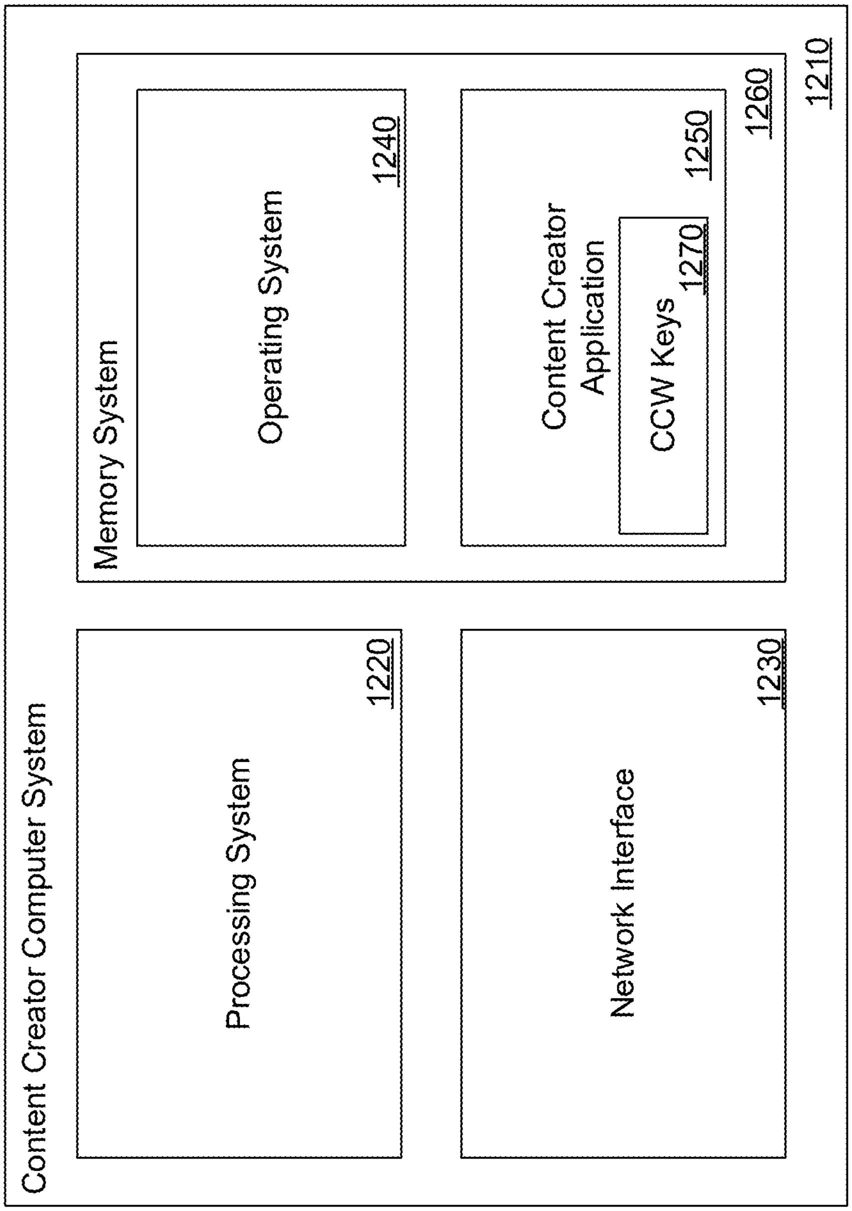

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
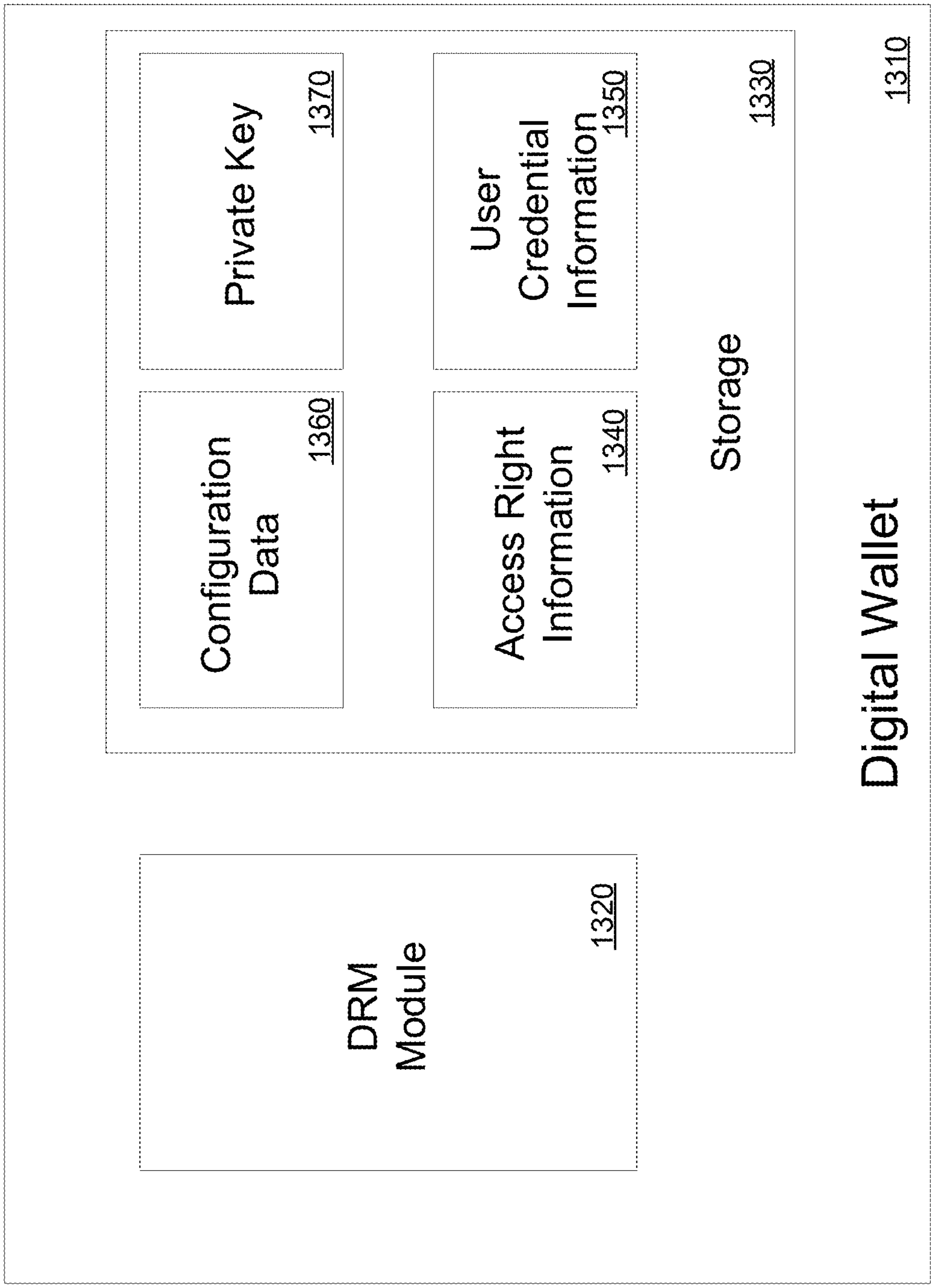
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14A:
FIGS. 14A-14C depicts user interfaces of various media wallet applications in accordance with a number of embodiments of the invention.
Figure 14B:
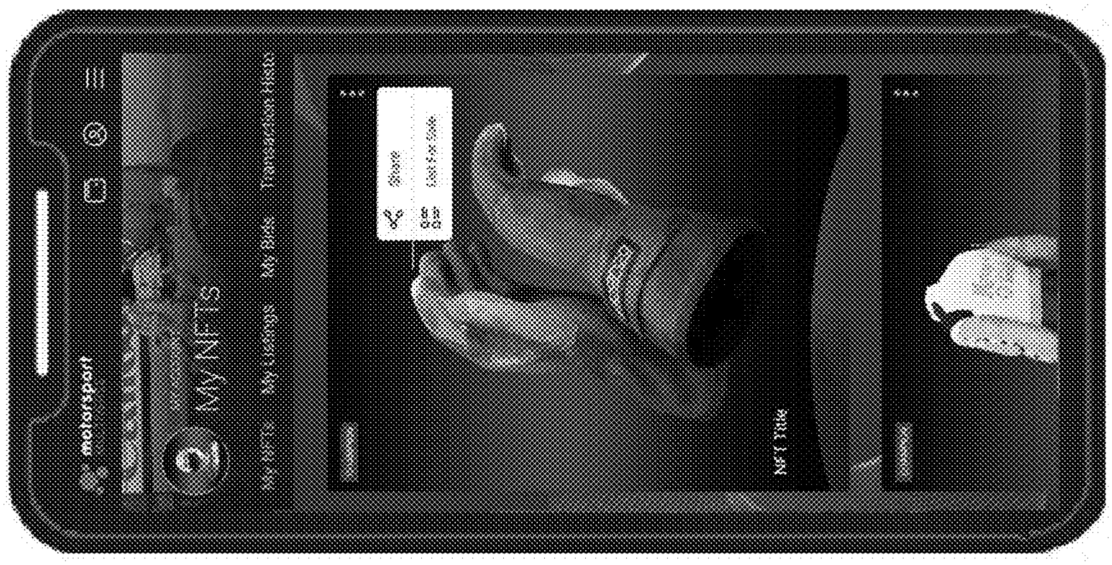
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the IOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
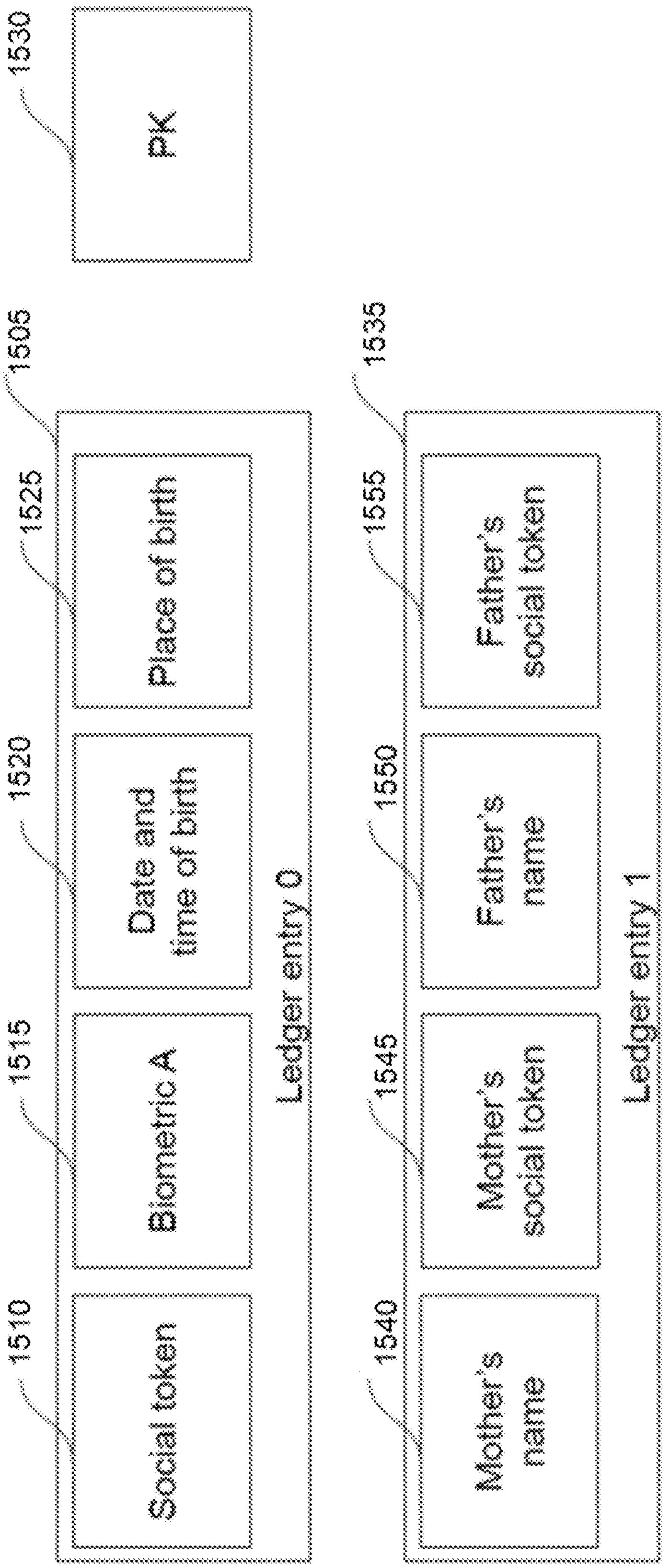
FIG. 15 illustrates an NFT ledger entry corresponding to an NFT identifier in accordance with some embodiments of the invention.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race, gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future off-spring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horsex wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g., script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
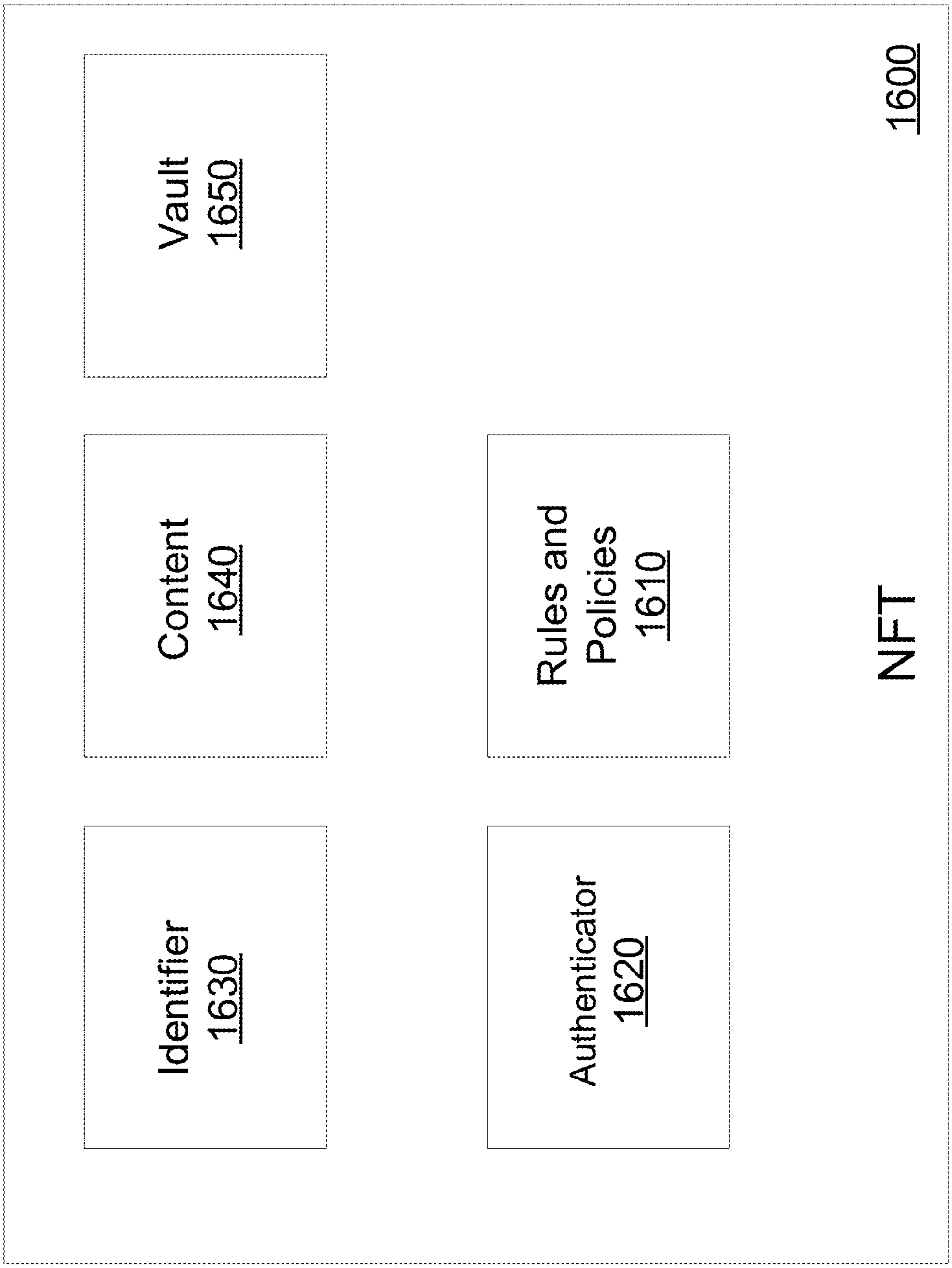
FIGS. 16A-16B illustrate an NFT arrangement relationship with corresponding physical content in accordance with an embodiment of the invention.

An example NFT which may be associated with specific content in accordance with several embodiments of the invention is illustrated in FIG. 16A. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

Figure 16B:
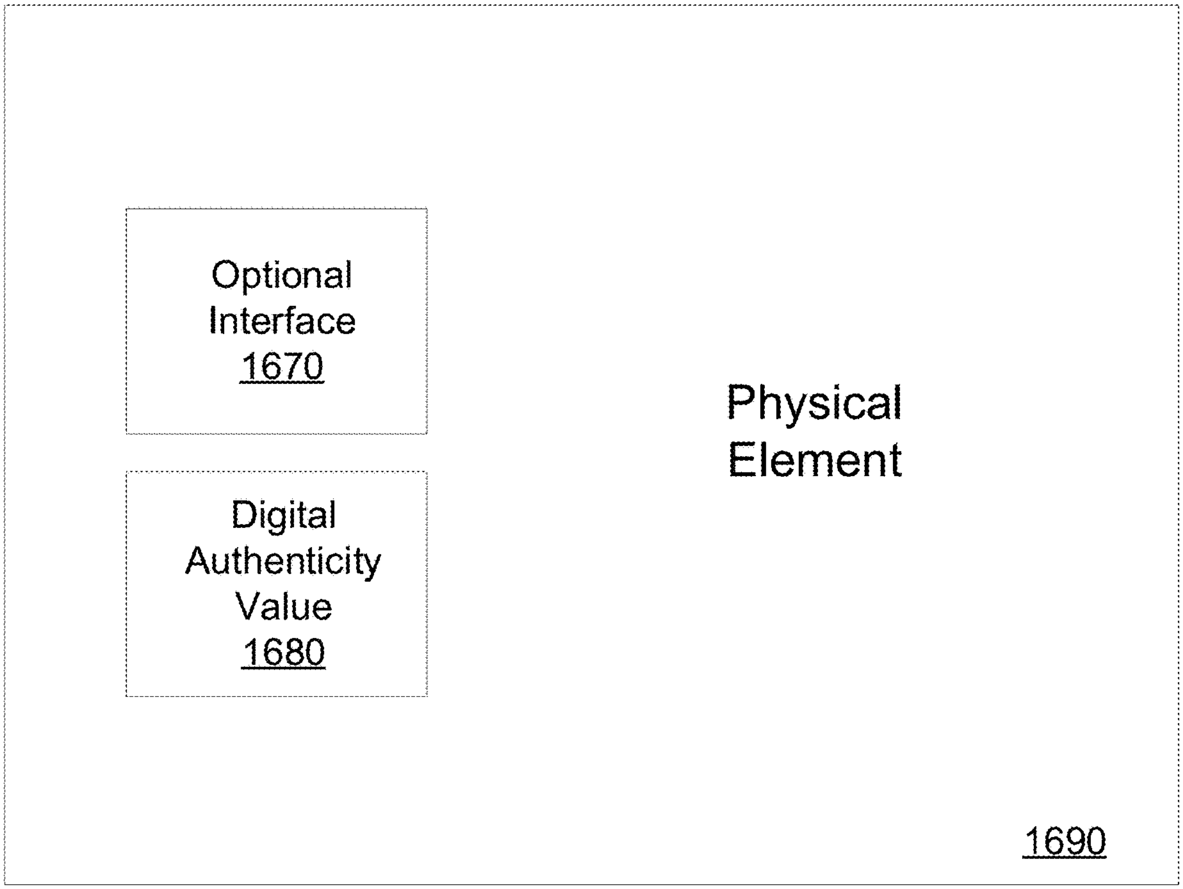

An example of a physical element 1690 corresponding to an NFT, in accordance with some embodiments of the invention is illustrated in FIG. 16B. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
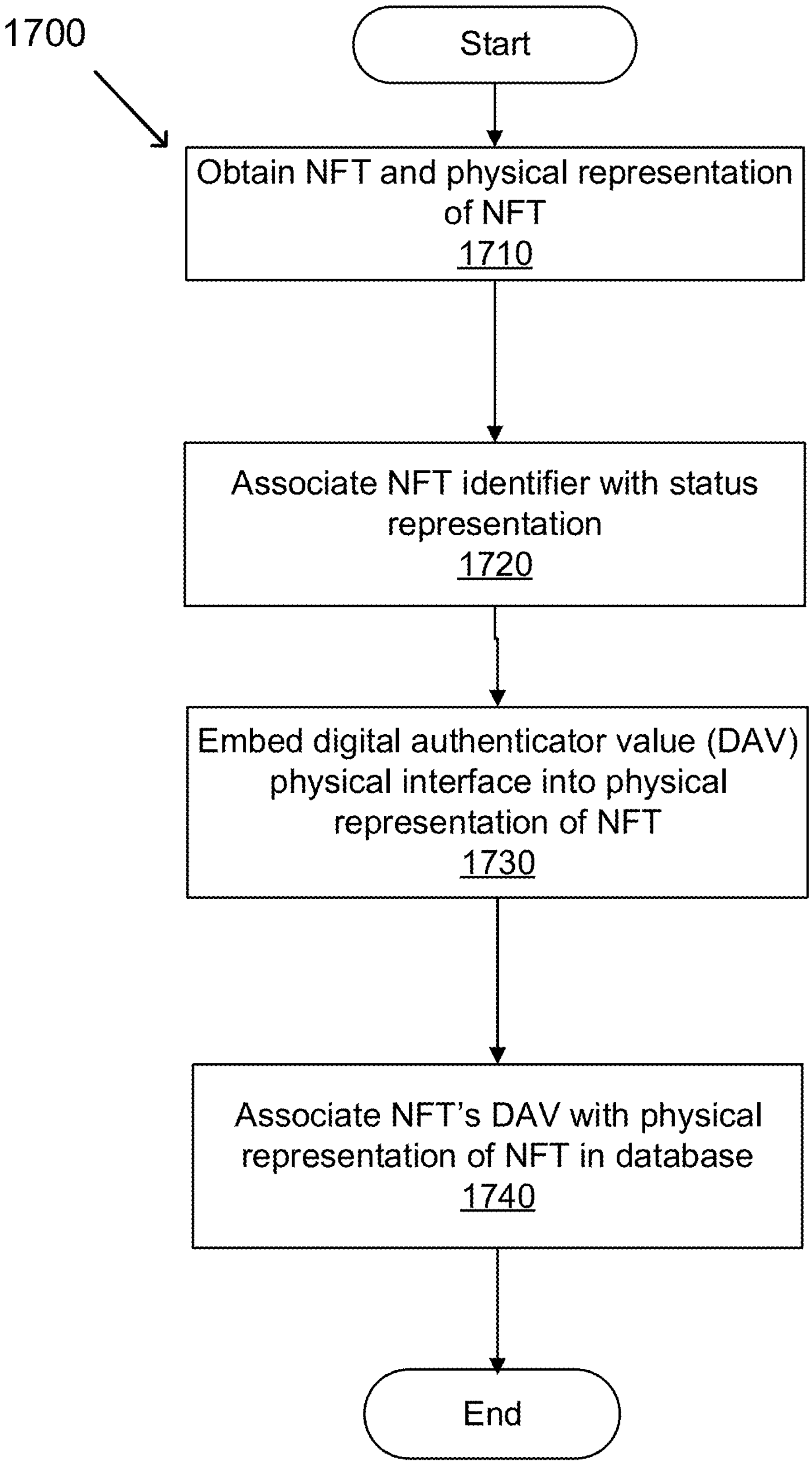
FIG. 17 illustrates a process for establishing a relationship between an NFT and corresponding physical content in accordance with an embodiment of the invention.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Abuse Safeguards on NFT Platforms

NFT platforms in accordance with many embodiments of the invention may implement systems directed to abuse safeguards. Abuse safeguards can be applied to establishing connections within layered blockchains, utilizing blockchain consensus mechanisms to enable protection, grouping NFTs, and implementation of second factor authentication systems.

A. Layered Blockchains

NFT platforms in accordance with many embodiments of the invention may implement systems directed to abuse safeguards in the context of layered blockchains. In particular, such mechanisms may be directed to the transfer of tokens including but not limited to NFTs from one blockchain layer to another.

1. Implementation

In accordance with a number of embodiments of the invention, layered blockchains may be used to implement undo operations and avert system abuses including but not limited to malicious contracts, wallet credential phishing, and ransomware. As such, these blockchain security problems may be addressed by watchful bridging between L1 blockchains and L2 blockchains.

In accordance with many embodiments of the invention, watchful bridging may include but is not limited to, processes for establishing connections between the L1 and the L2 blockchains (bridging) in a selective manner and/or while analyzing for the possibility of system abuse. Using a first (or primary) bridge, time-stamped states of L1 blockchains may be used as a starting point for segments of L2 blockchains. In accordance with many embodiments, time-stamped blocks of the L1 blockchains may be used as the input to the L2 blockchains; doing so may be used to create seed ledgers for later adding events recorded on the L2 blockchains to the L1 blockchains.

The use of L2 blockchains generated in accordance with some embodiments of the invention may be temporary, ending by bridging with the L1 blockchains following a temporary period. This temporary ("challenging") period may allow systems the opportunity to challenge the validity of entries before addition to the L1 blockchains are confirmed. In some cases, L2 blockchains may be generated for pre-specified amounts of time. Additionally or alternatively, L2 blockchains may be set to last until they include a pre-specified number of recorded entries. Additionally or alternatively, L2 blockchains may be associated with functions determining when to bridge based on various factors including but not limited to time and the number of ledger entries. In accordance with some embodiments, L1 and L2 blockchains may operate fully independently outside of bridging.

In accordance with a number of embodiments of the invention, following the temporary period, entire segments of the L2 blockchains can be recorded on the L1 blockchains using second (or secondary) bridges. In accordance with several embodiments, recordation through second bridges may be done by recording the last ledger entry in the L2 blockchains as a subsequent entry of the L1 blockchains.

Secondary bridges, in accordance with certain embodiments of the invention, may be configured to be watchful. Watchful bridges may selectively identify what entries on L2 blockchains to block from and/or register (e.g., cause to be registered) on the L1 blockchains. In accordance with many embodiments of the invention, primary bridges may, additionally or alternatively, be configured to be watchful. Additionally or alternatively, in addition to selective confirmation, blocking and/or delaying of blockchain entries, watchful bridges configured in accordance with some embodiments of the invention may include other entry categories. In accordance with a number of embodiments, the category of blocked entries may have multiple subcategories, including but not limited to entries that were blocked because they were malformed, and entries blocked because of identified abuse. Additionally or alternatively, another prospective category may be a category of challenged entries, referring to delayed entries that can be either confirmed and/or blocked once responses are received to challenges. In such cases, challenges may include requests for additional contextual information from the party that submitted particular entries to be recorded. Additionally or alternatively, the "confirmed" category may include multiple sub-categories, including but not limited to a category where the confirmation follows a classification of the party that submitted the entry, and/or a category where the confirmation is made due to system analysis of the contents of the entry.

In addition to the capability of recording L2 events to the L1 blockchains, watchful bridges can block and/or delay entries based on, but not limited to, any concerns of system abuse. In accordance with many embodiments of the invention, recording L2 elements (i.e., blocks) on L1 blockchains may correspond to confirmation of the associated event. The recording of L2 elements may involve but is not limited to including the L2 event in a hash to be added to L1 ledger entries. In accordance with some embodiments, L1 and L2 blockchains may operate fully independently outside of bridging.

As mentioned above, watchful bridges may implement a number of additional features, including but not limited to security features like blocking entries. Blocking entries from being registered on L1 blockchains may cause the associated events (e.g., transactions) to be canceled. Blocking entries may have the capacity to cancel events, enabling systems configured in accordance with some embodiments to identify and address concerns of abuse. In accordance with numerous embodiments of the invention, entries may thereby be canceled within limited periods of time prior to the registration of the corresponding entries onto the L1 blockchain.

Additionally or alternatively, systems in accordance with various embodiments of the invention may be configured to delay the registering of events. Delays may be performed by, but are not limited to, canceling events during the bridging from L2 blockchains to L1 blockchains and/or automatically adding yet-to-be-confirmed events to subsequent L2 blocks to be created. Additionally or alternatively, the selective avoidance of confirmation may not correspond to blocking the associated event in cases when excluded elements are automatically re-introduced on the next L2 blockchains. When delays are prompted, the determination of whether to confirm and/or block events may become a security decision. In accordance with some embodiments, such decisions may be performed by, but are not limited to, nodes.

In accordance with some embodiments, watchful bridges may, additionally or alternatively, obtain feedback from one or more other entities, including but not limited to bounty hunters, oracles, agents, and/or other smart contracts. Bounty hunters were disclosed in co-pending application U.S. patent application Ser. No. 17/806,065, titled "Systems and Methods for Maintenance of NFT Assets," filed Jun. 8, 2022, incorporated by reference in its entirety. The watchful bridges may make security determinations based on the presence of, absence of and/or content of such feedback. In accordance with certain embodiments, when no bounty hunters have provided any feedback, watchful bridges may determine that events should be confirmed. In such cases, confirmation may be established after a particular time duration (e.g., five seconds) has elapsed since the last recording of an event on the L2 blockchains. Additionally or alternatively, when a certain number of entities (e.g., at least two bounty hunters) have provided warnings for and/or evidence of abuse surrounding a given event, watchful bridges configured in accordance with numerous embodiments may determine that the event should be blocked. As indicated above, events that have neither been confirmed nor blocked may be automatically moved over to subsequent L2 blockchains (i.e., delayed) when the specific bridging operation is performed.

In accordance with certain embodiments, when recorded events are delayed, they may nevertheless still be associated with their original L2 time stamp. In such cases, when events are recorded on L2 blockchains, delayed by a watchful bridge (one or more times), and/or finally confirmed on the L1 blockchains by the watchful bridge, the events can still be associated with their original time (of being recorded on the L2 blockchains). In accordance with many embodiments, maintaining these timestamps may involve, but are not limited to, recording on the L1 blockchain, by the watchful bridge, entries to be delayed, with indicators (e.g., a flag) that identify that the entries can be not yet determined as possible to confirm. Once such entries are confirmed, systems configured in accordance with several embodiments may refer back to the recorded entry on the L1 blockchains, and add another indicator identifying that the entry is now confirmed. Additionally or alternatively, delayed and later blocked entries can be referred to and flagged as blocked. Additionally or alternatively, delayed and later blocked entries can be removed from the state of still-pending events maintained by the watchful bridge(s), and therefore effectively forgotten.

As watchful bridges delay events, systems in accordance with many embodiments may be configured to identify risks that malicious agents may attempt to influence the systems through the blocking functionality. Influencing attempts may include but are not limited to using the blocking functionality to repeatedly delay given transactions to cause inconvenience to another party, and/or to perpetrate scams such as "double spends." In accordance with some embodiments, such behavior may be mitigated by verifying entities (e.g., bounty hunters and/or bridge verifiers) to provide stakes to operate as agents capable of reporting information that may result in a delay and/or cancellation of events/transactions. Stakes may include but are not limited to cryptocurrency and/or digital assets of commercial value. When the information submitted by verifying entities is deemed to be false and/or submitted maliciously, some or all of the stake provided may be slashed (i.e., confiscated and/or not returned to the staker). In accordance with certain embodiments, other parties may report that the reported information is false, and the malicious agent may be banned from supplying further information. Financial penalties in the form of slashed stakes may be transferred to submitters of transactions that were falsely blocked and/or canceled. Further mitigation strategies are disclosed in co-pending U.S. patent application Ser. No. 17/810,085, titled "Distributed Ledgers with Ledger Entries Containing Redactable Payloads," filed Jun. 30, 2022, incorporated by reference in its entirety.

In accordance with some embodiments, watchful bridges may take as input L2 blockchains including some entries that have yet to be bridged back onto the L1 blockchains ("N entries"). Systems in accordance with many embodiments can generate orderings of N entries, including but not limited to the order in which they were recorded on the L2 blockchains. Additionally or alternatively, systems may associate the N entries with certain N-bit vectors ("confirmation flag arrays" or "confirmation vectors"). In accordance with several embodiments, Confirmation flag arrays may be used as a shorthand signal of which entries should be bridged. Vectors configured in accordance with a number of embodiments may have a bit (e.g., ith bit) set to 0 when the ith entry of a set is not to be bridged back to the L1 blockchains, and to 1 otherwise.

In accordance with some embodiments, confirmation vectors may not be vectors of binary entries. Instead, entries may include information about classifications (e.g., that a given entry may be blocked) and/or may include information about the reason(s) underlying the classification, including but not limited to descriptions and/or references to descriptions. Such descriptions may include but are not limited to log entries, indicative components, and names of abuse types and/or abuse campaigns.

In accordance with some embodiments, the primary bridging may be performed periodically and/or in a manner synchronized with secondary bridging using algorithms as described above. Primary bridging may be done in a manner that is synchronized with secondary bridging. As suggested above, primary bridging may be done by taking state(s) from the L1 blockchains and adding that as entries onto the L2 blockchains. Doing so may be used for synchronizing the L2 blockchains to the L1 blockchains by proving that the events already recorded on the L1 blockchains took place prior to the events not yet entered on the L2 blockchains.

Additionally or alternatively, states of L2 blockchains can be entered on L1 blockchains during secondary bridging. States may be entered through modes including but not limited to hashing one or more L2 elements and/or confirmation vectors while logging hash values as entries on the L1 blockchains. Logging the hash values may be used to prove that already-logged entries on the L2 blockchains took place prior to yet-to-be-logged entries on the L1 blockchains.

Watchful bridges can determine selections of entries from the L2 blockchains to be included in the hash to be logged (on the L1 blockchains). Additionally or alternatively, watchful bridges may provide selections identifying which of the logged entries can be confirmed. Additionally or alternatively, watchful bridges may appoint unconfirmed entries implicit time-stamps but can be not yet officially in existence since they have not yet been confirmed. Systems configured in accordance with numerous embodiments of the invention may enable selective confirmation of entries made on the L2 blockchains. Selections may be performed based on what associated events and transactions can be determined, by the watchful bridge, to satisfy system criteria (that may be) specified to govern the security requirements of the system. Additionally or alternatively, the watchful bridges can block entries determined to be undesirable according to some criteria known at least by the watchful bridge. The criteria used by watchful bridges may, additionally or alternatively, correspond to publicly accessible criteria corresponding to undesirable behavior.

Systems configured in accordance with numerous embodiments may incorporate additional mechanisms for identifying and/or classifying entries. In accordance with many embodiments of the invention, entries may be concatenated with and/or hashed (via the corresponding strings of the transaction corresponding to the entries) with adjacent entries. In accordance with a number of embodiments, the result of the hashes may be recorded on L1 blockchains. Additionally or alternatively, the reason for blocking specific entries ("B entries") may be logged through mechanisms, including but not limited to making records for each blocked entry. Logging can take place by recording the blocking event on new specific L2 blockchains, for example. The remaining entries to be delayed ("D entries") can be entered on the specific L2 blockchains, through processes including but not limited to copying the D entries onto the newly created L2 blockchains; and/or providing the D entries, which L2 blockchains they originated from, and/or their timestamps as input to specific functions used by blockchains to designate delayed entries.

In accordance with several embodiments, watchful bridges may take, as input for Merkle trees, sequences of blocks from L2 blockchains that have not yet been bridged, including multiple blocks of N entries and/or transactions. In accordance with several embodiments, the entries may be sorted in chronological order and/or used to construct the Merkle trees. Leaves of the Merkle trees may identify references to a kth transaction. In accordance with multiple embodiments, Merkle trees may be configured such that transaction 1 may be concatenated with transaction 2 and hashed to produce output hash H1, transaction 3 may be concatenated with transaction 4 to produce output hash H2, and in general (for every k that is even, where $k \in (0, N)$), transaction k may be concatenated with transaction k−1 to produce output hash H (k/2).

In accordance with many embodiments of the invention, transactions corresponding to B and/or D entries may be replaced with empty strings, the strings representing the non-inclusion of a transaction (e.g., "00000000"), and/or strings indicating a reason why the transaction was not confirmed. Subsequently, pairs of hash outputs can be pairwise concatenated to produce a Merkle tree root hash, with the root hash recorded on the L1 blockchains. Other information may be recorded along with the root hashes including but not limited to a beginning block number and an end block number indicating a range in which transaction 1 to transaction N may be found.

Figure 18:
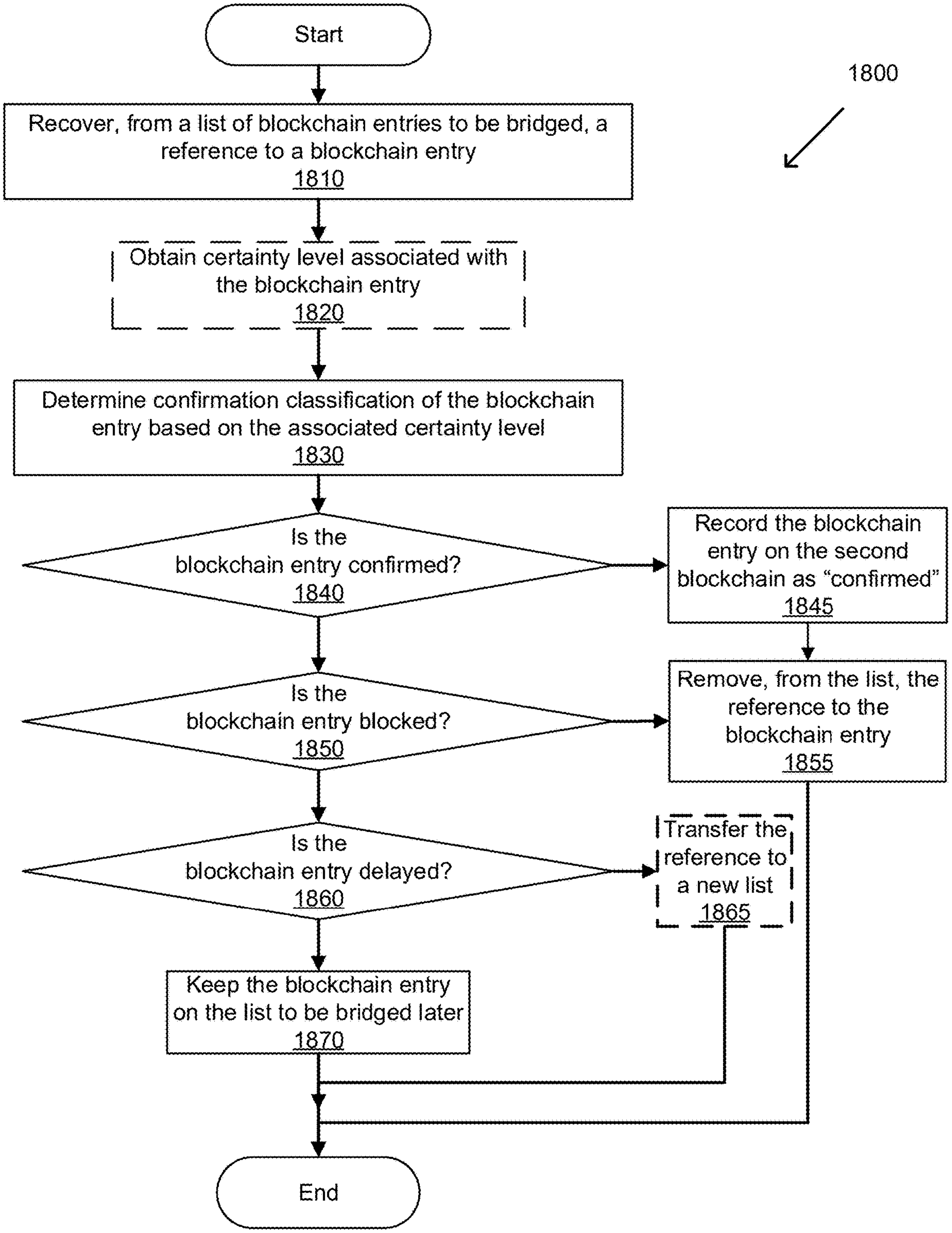
FIG. 18 illustrates a process for bridging a first blockchain to a second blockchain in accordance with several embodiments of the invention.

A process for bridging a primary blockchain to a secondary blockchain in accordance with several embodiments of the invention is illustrated in FIG. 18. As disclosed above, primary blockchains may include at least one entry. Process 1800 recovers (1810), from a list of blockchain entries to be bridged to a primary blockchain, a reference to a blockchain entry. The blockchain entry may originate from a secondary blockchain and/or correspond to at least one event. The list referenced by the watchful bridge may refer to, but is not limited to, literal lists of entries, the capability to flag entries, and/or any capability to indicate that entries are not eligible for being bridged to the secondary blockchains. Thus, when an entry no longer is eligible for being bridged to the secondary blockchains, it may be removed from the list, have a flag changed etc. Process 1800 optionally obtains (1820) a certainty level associated with the entry. Certainty levels may be based on but are not limited to information pertaining to whether the entry is associated with problems, irregularities and/or abuse. A certainty level may additionally or alternatively be associated with a certain amount of time having to pass after the occurrence of the event.

Process 1800 determines (1830), based on the certainty level, a confirmation classification of the entry. In accordance with certain embodiments, watchful bridges may determine the classifications and/or certainty levels by receiving and/or reading them from the primary blockchains that actually decide them. Additionally or alternatively, watchful bridges may obtain the certainty level and independently use the certainty level to determine the classification. Additionally or alternatively, watchful bridges may determine the confirmation classification and/or certainty levels in tandem with primary blockchains. In determining (1830) the confirmation classification of the entry, the classification may indicate whether the at least entry may be confirmed, delayed and/or blocked.

When the classification indicates that the entry is confirmed (1840), process 1800 records (1845) the entry on the secondary blockchain as confirmed. In this manner, the event associated with the entry may be confirmed on the secondary blockchains. Additionally or alternatively, regardless of whether an entry in the entry is confirmed (1840) and/or blocked (1850), process 1800 removes (1855) the reference to the entry from the list of entries to be bridged. Whether the entry is confirmed and/or blocked, there is no further need for the entry to be considered by the watchful bridge again.

When the entry may be classified as delayed (1860), process 1800 optionally keeps (1870) the blockchain entry on the list for the current primary blockchain, to be bridged at a later date; records the entry to a new similar primary blockchain; and/or transfers (1865) the reference to a new list, allowing process 1800 to determine suitability for a later blockchain. In some instances, the delays may be used when there is insufficient certainty of whether to confirm and/or block an entry. Additionally or alternatively, delays may depend on the aforementioned temporary period between bridging; in such cases, delays may happen when insufficient time has passed from the recording of the associated event on the L2 blockchains.

Watchful bridges configured for bridging from primary blockchains to secondary blockchains may include but are not limited to: input/output means for the watchful bridges to receive information and transmit and/or provide information to other units, devices and/or entities; processing means; and memory means including instructions which, when executed by the processing means may cause the watchful bridges to perform methods configured in accordance with a number of embodiments of the invention.

Figure 19:
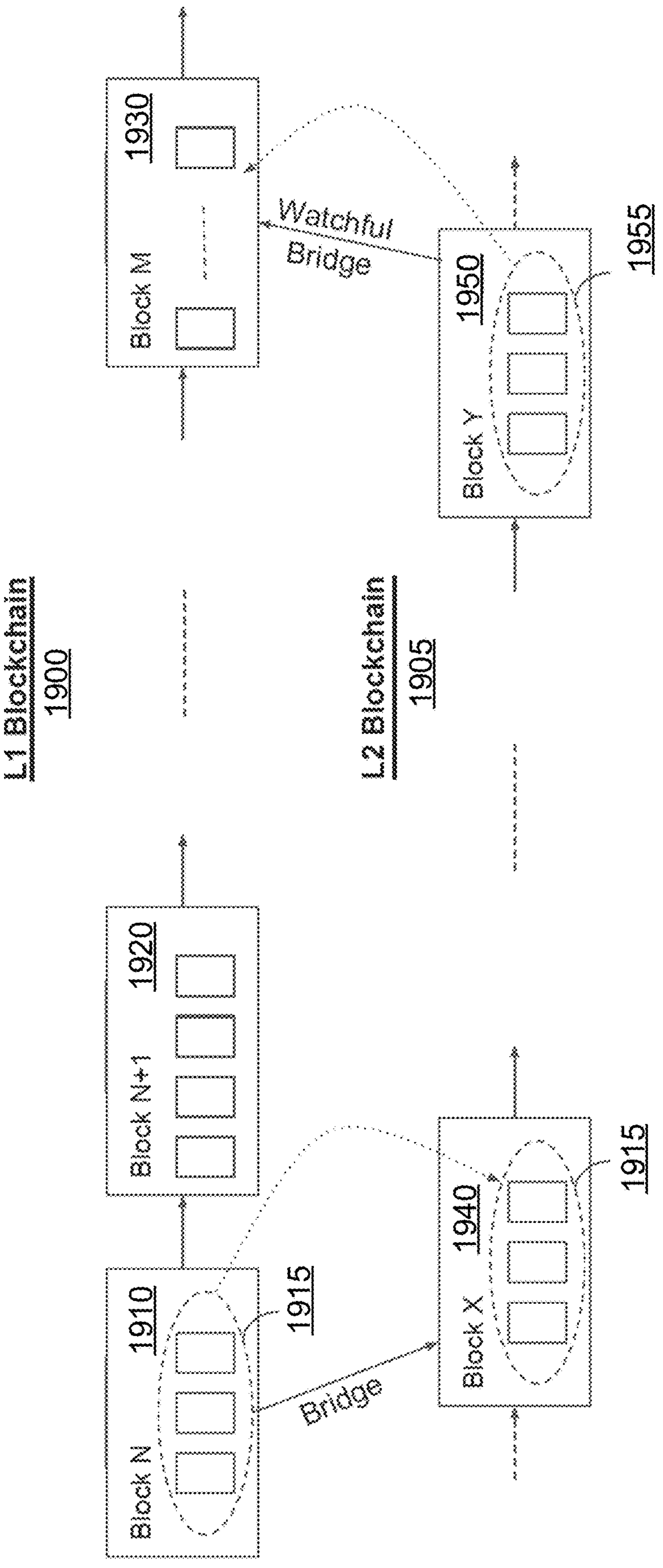
FIG. 19 conceptually illustrates the action of bridging in accordance with an embodiment of the invention.

A conceptual diagram of bridging conducted in accordance with certain embodiments of the invention is illustrated in FIG. 19. The figure schematically illustrates an L1 1900 and L2 blockchain 1905. At a point in time, a block N 1910 includes some entries 1915 associated with events that have taken place. A (first) bridge establishes a connection between the L1 blockchain 1900 and L2 blockchain 1905. Using the first bridge, a time-stamped state of the L1 blockchains provides a starting point for a segment (e.g., Block X 1940) of the L2 blockchain 1905. Additionally or alternatively, bridges may be used to copy over one or more entries 1915 from L1 blockchains 1900 to L2 blockchains 1905, while canceling them from the L1 blockchains 1900. Cancellation in such cases may occur by assigning the ownership of the L1 entries 1915 to the L2 blockchains 1905, NULL values, and/or one or more entities without private keys.

At a later point in time, a watchful bridge activates between a block Y 1950 of the L2 blockchain 1905 and a block M 1930 of the L1 blockchain 1900. Using the watchful bridge, some entries 1955 of block Y 1950 are evaluated and possibly recorded in block M 1930. the watchful bridges can, for individual entries 1955 of block Y 1950, determine a classification of the entry 1955 based on a certainty level associated with the entry 1955, wherein the classification indicates whether the entry may be confirmed, delayed and/or blocked. Watchful bridges may, additionally or alternatively, record the corresponding entry on the L1 blockchains as confirmed when the classification indicates that the entry is confirmed. the watchful bridges also maps a multiplicity of blocks, including block Y 1950 of the L2 blockchain 1905 to block M 1930 of the L1 blockchain 1900. Such mappings may be performed by processes, including but not limited to by recording hash values on the destination block (i.e., block M 1930). In accordance with numerous embodiments of the invention, hash values may be computed from the multiplicity of blocks; systems may additionally or alternatively what entries of the blocks to record by including them in the computation of the hash value.

In accordance with numerous embodiments of the invention, watchful bridge components may include but are not limited to one decision component and one logging component. The decision component may determine, based on security assessments and other assessments, whether a given entry should be confirmed, delayed and/or blocked. The logging component may establish records of these assessments.

In accordance with some embodiments, the decision component of watchful bridges may include but is not limited to machine learning (ML) and/or artificial intelligence (AI) elements. Such elements may be used to assess inputs, perform classifications, and/or engage in analyses using algorithms and/or sets of parameters. In accordance with a number of embodiments, some or all of the algorithms and/or parameters may be public or secret. In accordance with some embodiments, algorithms trained to categorize an entry as confirmed, delayed and/or blocked may include but are not limited to neural networks, support vector machines, and/or AdaBoosts.

Additionally or alternatively, decision components can be trained to output decisions that influence the routing of further decision-making to other processes. In accordance with various embodiments, binary decision components may take on the role of categorizing each entry as "approve" and/or "process further"; in the latter case, other analyses may be performed to ascertain the proper assessment for entries.

Additionally or alternatively, machine learning algorithms can be used to predict the risk level for particular entries (e.g., "low", "medium", and/or "high" risk) and/or apply regression models that assign risk probability and/or real-valued risk scores. Risk level assessments can be used to assign differential delays to entries: in accordance with some embodiments, systems may enable higher-risk entries to have longer challenging periods (before confirming) than lower-risk entries. Additionally or alternatively, risk level assessments can be used by subsequent processing to ultimately assign a decision to entries.

Machine learning and/or AI techniques in accordance with many embodiments of the invention may draw on a variety of properties of the L1 blockchains, L2 blockchains, smart contract contents, entities involved in entries (including but not limited to purchase histories of wallets), and/or other values as inputs and/or "features" for informing such decision-making. Machine learning models trained to perform tasks may be trained in advance by trusted authorities including but not limited to subsystems and/or sub-parties managing the watchful bridges. Machine learning models may, additionally or alternatively, be trained online to account for entries and phenomena on particular sets of one or more bridges. Machine learning models may, additionally or alternatively, be configured through the use of transfer learning techniques, including but not limited to fine-tuning pre-trained models on data particular to a given bridge and/or set of bridges, and/or particular sets of entries. Multiple machine learning and/or AI algorithms may work together. For example, one algorithm may model the risk associated with a given contract and another algorithm may model the risk associated with the contracting parties. In accordance with some embodiments, risk assessments may be considered by, but are not limited to downstream processes, machine learning processes, and/or AI-based processes.

Decision components may be distributed and operate according to consensus principles, wherein multiple parties make assessments regarding classifications and form a consensus using consensus mechanisms. Additionally or alternatively, distributed decision components utilize quorum-based solutions, in which participants agreeing with each other apply a digital signature. In such cases, participants may use private keys that they share using polynomial secret-sharing methods. Decision components may, additionally or alternatively, be run by single parties, including but not limited to marketplaces, escrow authorities, and/or algorithms. Algorithms utilized by decision components may be protected using digital rights management (DRM) techniques and/or run in certified trusted execution environments (TEEs).

In accordance with some embodiments, confirmed and/or unconfirmed entries alike may be logged on L1 blockchains using logging components. For instance, hashing may be limited to elements that are confirmed, with their associated hash value logged on the L1 blockchains. In accordance with several embodiments, other entries may be logged on the L1 blockchains. Additionally or alternatively, logged entries may be accompanied by labels indicating whether the entry may be confirmed, what the reason may be for it to be blocked, where applicable, etc.

In accordance with some embodiments, the L2 blockchains may be continuously run parallel to the L1 blockchains, while being bridged at periodic intervals. In such cases, the length of given intervals may be determined by, but is not limited to the number of entries on the L2 blockchains that have not been bridged onto the L1 blockchains yet; the period of time since the last bridging to the L1 blockchains; and/or any heuristic algorithms determining when to bridge back to the L1 blockchains.

In accordance with some embodiments, watchful bridges may implement bridging processes (P) to further facilitate transfers, as disclosed in co-pending U.S. patent application Ser. No. 17/810,741, titled "Systems and Method for Providing Security Against Deception and Abuse in Distributed and Tokenized Environments," filed Jul. 5, 2022, incorporated by reference in its entirety. By incorporating bridging processes in watchful bridges, systems operating in accordance with numerous embodiments of the invention may associate tokens with being transacted on specific L2 blockchains. These associations may be implemented through modes including not limited to utilizing one or more marketplaces that can be configured to transact on specified L2 blockchains. In such cases, the bridging process may be used to verify that terms of service associated with the transacted token(s) can be satisfied. By tying tokens to be transacted onto specified L2 watchful bridges, the bridges can verify that terms of service and/or security constraints are satisfied. Additionally or alternatively, the bridges may be able to block disallowed transactions.

In accordance with a number of embodiments, verified tokens may be bridged onto associated L1 blockchains, where they may reside until subsequent ownership transfer transactions, which again would place the token onto the L2 blockchains. To avoid private transfers and require the use of the watchful bridges to facilitate transfers, bridging processes used to verify terms may possess parts of the keys used to transfer ownership, as disclosed in the U.S. patent application Ser. No. 17/810,741, titled "Systems and Method for Providing Security Against Deception and Abuse in Distributed and Tokenized Environments," filed Jul. 5, 2022, incorporated by reference in its entirety.

In accordance with many embodiments, watchful bridges may include collections of bridging processes ($P_1 \ldots P_n$), associated with individual originators $O_1 \ldots O_n$ of underlying transaction. Bridging processes ($P_i$) may be used for, but are not limited to addressing security needs associated with the associated originators ($O_i$). Watchful bridges may determine, from tokens, what the originator was and, based on this, determine an appropriate bridging process ($P_i$). When the selected bridging process ($P_i$) allows and/or agrees to a transaction, then the transaction may be confirmed; otherwise it may be blocked and/or otherwise stopped from being recorded on L1 blockchains.

Watchful bridges may, additionally or alternatively, include and/or communicate with processes performing tasks as disclosed in U.S. patent application Ser. No. 17/810,741, titled "Systems and Method for Providing Security Against Deception and Abuse in Distributed and Tokenized Environments," filed Jul. 5, 2022, incorporated by reference in its entirety.

Refusals to confirm transactions on L1 blockchains may involve but are not limited to classifying them as "in violation", causing the party requesting the transaction to have to remedy specific problems associated with the identified violation and possibly receive later confirmation. In accordance with some embodiments, L1 blockchains may be operated to receive signals that indicate tokens recorded on them have one or more problems. Systems operating in accordance with some embodiments, when such signals are received, may initiate the automated transfer of the "problem" tokens to associated L2 blockchains. L2 blockchains may receive the tokens and cause them to be rerouted back to the L1 blockchains, via watchful bridge; where the rerouting may involve the tokens being filtered out and optionally modified, blocked and/or delayed. In accordance with several embodiments, the above filtering may be performed directly on/by the watchful bridges.

Non-limiting examples of modifications of tokens may include but are not limited to: changing the terms of the tokens, changing the content associated with the tokens, changing the reference to content associated with the tokens, and changing access rights associated with the tokens. Additionally or alternatively, examples of problems may include but are not limited to the association of malware with tokens, abusive use and/or transfer of the tokens including failure to pay royalties and circumvention of DRM mechanisms, loss of tokens in a scam, and identification of the tokens having malicious and/or illegal content.

Tokens may, additionally or alternatively, periodically be transferred from L1 blockchains to L2 blockchains in response to non-problem events, including but not limited to transfers of ownership rights, and/or pending transfers. In accordance with several embodiments, the tokens can be received on the L2 blockchains and evaluated to determine whether filtering actions should be taken. Some marketplaces may operate on L2 blockchains, therefore requiring the transfer of tokens to be put up for sale from L1 blockchains (where they reside) to L2 blockchains on which marketplaces operate. In accordance with certain embodiments, subject to jurisdiction, marketplaces may be required to operate on L2 blockchains exclusively and/or to otherwise channel tokens through watchful bridges as part of transactions and/or pre-transaction preparation. The modification of tokens may result from circumstances including but not limited to tokens being transacted in jurisdictions where escrowing content may be required; in such cases, the modification may involve the adding to tokens of references to an escrow database. Escrow techniques were disclosed in co-pending in U.S. patent application Ser. No. 17/821,444, titled "Systems and Methods for Management of Token Interactions," filed Aug. 22, 2022, incorporated by reference in its entirety.

The modification of tokens may, additionally or alternatively, cause some content to undergo modifications including but not limited to being into ciphertext, being converted into plaintext, being modified to require tracking by DRM modules, and/or being modified to not allow tracking by DRM modules. Tracking by DRM modules and associated trusted third parties is disclosed in co-pending in U.S. Provisional Patent Application No. 63/476,352, titled "Cross-Device Digital Rights Management," filed Dec. 20, 2022, incorporated by reference in its entirety.

In accordance with some embodiments, proof of stake mining operations may operate on L2 blockchains, therefore requiring assets to be transferred to the L2 blockchains to be used for staking. This may enable forfeiture of stakes in cases of abuse by having watchful bridges cancel tokens and/or modify their value in response to detections of abuse.

In accordance with certain embodiments, watchful bridges may include multitudes of entities and operate using consensus mechanisms. In accordance with several embodiments, the watchful bridges may involve but are not limited to centralized parties and parties with quorums of participants, wherein each one has a share of a private key used for bridging operations.

For systems operating in accordance with several embodiments, watchful bridges may be utilized to enable the distribution of equity. In such cases, systems can include pluralities of processes wherein at least one stake is held by each process owner ("bridge stakeholder"). In accordance with a number of embodiments, process owners may be identified by a given signing key and/or hold their stake in shared resource pools where the resources can be received from and distributed to non-stakeholders. Example resource pools may include but are not limited to automated market maker pools (AMM) and/or liquidity pools where traders (non-stakeholders) can submit resources to smart contracts on blockchains (e.g., L2 blockchains) in order to receive distributions of resources on paired blockchains (e.g., L1 blockchains) through distributable transactions. In accordance with many embodiments, stakes may include distributable portions and non-distributable portions (including but not limited to earned interests and fees). In accordance with some embodiments, bridge stakeholders can be rewarded for monitoring resource pools and submitting distribution transactions when resources are received from traders on the paired blockchains. Resource pools may be controlled by smart contracts restricting distribution amounts to stakes held by the bridge stakeholder submitting the distribution transaction. Transactions submitted by bridge stakeholders can be ordered by consensus and/or blockchained in Merkle trees.

As stakeholders distribute their stakes they may eventually no longer be able to fulfill distributions. In such cases, other stakeholders can be allowed to submit distribution transactions, lengthening the transaction blockchains and associated Merkle tree. Lengthening transaction blockchains may increase confidence that prior distributions can be legitimate. Each subsequent submission may be weighted in the form of pool percentages. As the confidence level increases for a given distribution, the corresponding stakeholder may regain relative percentages of stake available for distribution.

Additionally or alternatively, subsequent distributions may reflect votes against prior distributions. For example, votes of no confidence may be cast in response to harmful stakeholder behavior, in order to exclude distributions from transaction blockchains and the Merkle tree(s). When subsequent distributions by other stakeholders continue to vote in favor of no confidence, the stakeholder may lose their entire stake. Stakeholders may also be required to fulfill pending distributions and participate in votes of confidence (and/or “no confidence” to prevent locking up other stakeholders’ distributions). In such cases, requirements may be enforced by the risk of automatically losing portions of their stake to the shared pool.

In accordance with many embodiments, the signed transactions submitted by all actors, including but not limited to traders and bridge stakeholders, may be included in complete proofs of history. Proofs of history may be used to allow each smart contract to determine the legitimacy of given transactions prior to any subsequent release of funds. Additionally or alternatively, bad actors may end up improperly disbursing percentages of their own stake without the capacity to cause losses to the other bridge stakeholders any losses. Systems configured in accordance with various embodiments may add other simple rules including but not limited to withholding funds in escrow in order to cover any illegitimate transactions ensuring that traders can be fully compensated for losses incurred in the illegitimate transactions.

In accordance with various embodiments of the invention, a plurality of entities may communicate with each other to determine when an entry of an L2 blockchain can be identified to be recorded on an L1 blockchain. The identification of particular entries may be done by one entity declaring what entry will be bridged (i.e., recorded) to the L1 blockchains, enabling the others to vote on the declaration. Vote distribution may vary through systems including but not limited to each entity having one vote and/or individual entities having several votes. In accordance with some embodiments, entities need not have the same number of votes. Additionally or alternatively, some entities may have a non-integer number of votes (e.g., 3.721 votes). In accordance with a number of embodiments votes may be determined by the resource(s) staked. In some examples, the majority of votes (not necessarily the majority of entities) may vote for the entry to be confirmed, leading the watchful bridge to then record the entry on the L1 blockchain as confirmed.

In accordance with certain embodiments of the invention, in addition to casting vote, entities may add to the proofs of history and/or the Merkle tree proofs. Such additions may include and/or exclude the specific contested transaction. In accordance with numerous embodiments, a single inclusion with the contested transaction signed by the corresponding trader may be considered sufficient proof that the transaction is valid and that any proofs that excluded the transaction are false. In situations where stakeholders are required to sign authorizations for a trade may be used to provide proof to traders the trader proof that transactions are valid, allowing the involved smart contracts to verify the transaction history.

A wide variety of security techniques may be implemented using the disclosed filtering techniques in accordance with many embodiments of the invention. Nevertheless, for purposes of clarity, this disclosure will describe some illustrative but non-limiting examples of such techniques, some of which can implement security techniques and/or other types of desirable functionality:

- Systems in accordance with some embodiments may be used to block transactions that can be determined to be associated with fraud, including but not limited to when it can be determined that a transfer of ownership was performed in response to a phishing attack and/or a malware attack. Evidence of fraud can be collected by anti-virus software units associated with the wallets of the victims of the abuse. Additionally or alternatively, fraud may be determined based on users filing requests to undo transactions. In such cases, requests may include indications of why the transaction(s) should be reversed.
- Systems in accordance with various embodiments may be used to modify and/or augment recorded entries, in order to perform actions including but not limited to providing additional details and/or correcting typos. The systems may receive requests for modification from external parties associated with the submission of the original entry. Systems may save timestamps of the original entries and/or the modifications; content describing both the original entry and the modified version, and/or content describing both the final version and the modification made from the original entry. The use of modifications can also be employed to annotate previously recorded data with comments, where these comments may be provided by parties different from the originator of the entry.
- In accordance with several embodiments, systems may require that certain transactions have a tracking feature enabled, as disclosed in U.S. patent application Ser. No. 17/821,444, titled “Systems and Methods for Management of Token Interactions,” filed Aug. 22, 2022, incorporated by reference in its entirety. In accordance with many embodiments, once users (creating sets of ciphertexts) can provide evidence that the ciphertexts can be well-formed and enable tracking, watchful bridges may make determinations that associated transactions are confirmed; otherwise the associated transaction(s) may be kept in "delayed" state on the L2 blockchains.

Mechanisms in accordance with numerous embodiments may enable tiered minting, wherein low-cost minting operations associated with the recording of events and/or transactions on the L2 blockchains may be permitted. In such cases, the confirmation of the event (s) and/or transaction(s) may be performed subject to a larger payment being offered. This tiered minting method can enable very large numbers of tokens to be minted at a very low cost. Additionally or alternatively, associated entries may be selectively logged on the L1 blockchains after a second payment is performed, the second payment causing the watchful bridges to confirm the associated entry. Other techniques for delayed minting are disclosed in U.S. Provisional Patent Application No. 63/362,880, titled "Instant NFTs and Protection Structure," filed Apr. 12, 2022, incorporated by reference in its entirety; these methods can be compatible with the current application.

In accordance with some embodiments, transactions recorded on the L2 blockchains may be reversed by escrow authorities. Associated approaches, which can be compatible with the instant invention, are disclosed in the U.S. patent application Ser. No. 17/810,085, titled "Distributed Ledgers with Ledger Entries Containing Redactable Payloads," filed Jun. 30, 2022, incorporated by reference in its entirety. The disclosed methods are also compatible with the technology disclosed in the co-pending application in U.S. patent application Ser. No. 17/810,741, titled "Systems and Method for Providing Security Against Deception and Abuse in Distributed and Tokenized Environments," filed Jul. 5, 2022, incorporated by reference in its entirety.

In accordance with many embodiments, the use of delay classifications may permit the enforcement of policies including but not limited to blocking the resale of NFTs within specified periods of time (e.g., 30 days). Systems operating in accordance with a number of embodiments may enforce such policies by determining, through watchful bridges whether specific NFTs may be resold, based on terms of service (ToS) associated with them. When the systems determine the NFT may not be resold, they may respond by blocking the recording of the resale. When the resale is allowed, the resale may be automatically allowed. Additionally or alternatively, the watchful bridges can delay the resales when not allowed according to the ToS, and require the owner to re-initiate the sales once they are allowable.

Systems in accordance with a number of transactions may enable marketplaces and/or creator wallets to recall, repossess, and/or burn NFTs in cases of fraud (e.g., a fiat card chargeback event), so long as the NFTs have not already been resold. Such systems may be used in instances where the capacity to claim the NFTs are delayed (e.g., auctions where the NFT may be not claimable by the winning wallet for a certain period).

Watchful bridges configured in accordance with many embodiments can ascertain that royalties be paid properly, and/or that other terms of service are abided by, only enabling acceptable transactions. Such mechanisms are also described from another perspective in U.S. patent application Ser. No. 17/933,659, titled "Systems and Methods for Token Content Unlocking, Biometric Authentication using Privacy-Protecting Tokens, Ownership-Based Limitations of Content Access, Policy-Based Time Capsule Technology, and Content Lock Mechanisms," filed Sep. 20, 2022, incorporated by reference in its entirety, the methods of which are compatible with the current invention.

Watchful bridges configured in accordance with various embodiments may determine that transfers of ownership were performed by malware agents. Malware agents may be identified from circumstances including but not limited to commands having been performed by individuals other than the owner of an associated wallet and/or commands indicative of abuse that resulted in the transfer of ownership. Abuse may be determined from transactions performed by a script that the user of the wallet did not intentionally run, for example.

Watchful bridges configured in accordance with some embodiments may toggle rules, setting rules to be active or inactive. An example rule may cause tracking of IP addresses of any party accessing content associated with a certain token. Tracked IP addresses may be processed locally in DRM modules and reported to authorities when conditions are met. Additionally or alternatively, tracked IP addresses may be encrypted and transmitted to authorities to decrypt and review. Other rules may govern how content can be used, including but not limited to restrictions to view content, share content, resell content, resell content within a given period of time, etc.

In accordance with some embodiments, actions taken by smart contracts can be unwound, reversed, and/or refunded. For example, creators may specify smart contracts for 10,000 NFTs to be minted by anonymous users. The creators may offer guarantees that the users will receive their mint funds back when the project is found to be fraudulent (such as when the NFTs are not minted 100%), and/or when the NFTs fall below valuation thresholds determined by the creator(s). In accordance with many embodiments of the invention, guarantees may be coded in smart contracts. The capability to refund in such scenarios may be coded in the smart contracts and/or assigned to authorities including but not limited to the specific creator. Additionally or alternatively, marketplaces and/or other verifying entities, including but not limited to bounty hunters and/or insurance agents, may be assigned the responsibility for determining refunds in full and/or partial. Such policies may require proceeds to be held for pre-specified periods of time.

Watchful bridges configured in accordance with certain embodiments may enforce token locks. Token locks are disclosed in U.S. patent application Ser. No. 17/933,659, titled "Systems and Methods for Token Content Unlocking, Biometric Authentication using Privacy-Protecting Tokens, Ownership-Based Limitations of Content Access, Policy-Based Time Capsule Technology, and Content Lock Mechanisms," filed Sep. 20, 2022, incorporated by reference in its entirety.

Watchful bridges configured in accordance with numerous embodiments of the invention can be used to implement refundable mints. Refund assurance can be associated with conditions that can be related to factors including but not limited to time periods and/or the (in) occurrence of events. When the watchful bridges determine that the conditions are satisfied, minted tokens, on the L2 blockchains, may be transferred to the L1 blockchains. Until this occurs, the tokens can be delayed to remain on the L2 blockchains. There can be many examples of why a refundable mint may be desirable, including but not limited to, that launching a project with a claim that the mint may be refundable can help alleviate misinformation attacks, concerns, and/or trepidation. Examples of this may include but are not limited to the ability to make guarantees that a mint sells out or all money can be refunded; the ability to make guarantees that a project achieves a specific valuation and/or popularity on-chain in a given time window or all money can be refunded; the ability to create an assurance that when a contract has an error that may be problematic and/or fatal, all money can be refunded; and the ability to generate assurances that when a project is found to be immoral/illegal/unethical, all money can be refunded.

Watchful bridges configured in accordance with many embodiments can be used to enforce token repossession. For example, when buyers do not make the requisite payments for a token sale, sellers may report the breach of contract to the watchful bridges and/or entities communicating with the watchful bridge, generating requests that the token(s) be repossessed. Before this takes place, verifications can be performed that the payments were indeed not performed.

Systems operating in accordance with some embodiments of the invention may exist outside interfaces between L1 and L2 blockchains, within interfaces between other blockchains, including but not limited to L2 and L3 (i.e., "tertiary" or "level-3") blockchains, and/or between two or more distinct L2 blockchains. One or more of the blockchains may be private blockchains, wherein databases implemented by the blockchains are not publicly viewable. Additionally or alternatively, one or more of the blockchains in which systems operating in accordance with various embodiments of the invention are implemented may be permissioned.

Systems operating in accordance with many embodiments of the invention may, additionally or alternatively, be used to implement layered blockchains of bridges. For example, systems may implement bridges including but not limited to primary bridges between first (L1) blockchains and second (L2 or level-two) blockchains, secondary bridges between the L2 blockchains and third (L2 and/or L3) blockchains, up to nth bridges between nth blockchains and (n+1)th blockchains. Watchful bridges at given ranks (k, k>0) may monitor actions performed by bridges at higher ranks (k+i, i>0). In accordance with some embodiments, higher standards of verification may exist for lower-ranked watchful bridges. For example, watchful bridges of rank 3 may simply regularly transfer all transactions from fourth blockchains to third blockchains. Additionally or alternatively, watchful bridges of rank 2 may require a suitable waiting period to have passed without challenges from bounty hunters before transferring transactions from the third blockchains to the second blockchains. Additionally or alternatively, watchful bridges of rank 1 may require active validation by a validator before transferring all transactions from the second blockchains to the first blockchains.

Watchful bridges operating in accordance with certain embodiments of the invention may additionally or alternatively be implemented within partitioned blockchain components, including but not limited to shards of sharded blockchains.

Using systems configured in accordance with many embodiments, users may have access to various additional functionality. Such functionality may include the capacity able to view content that has been transferred away for set periods of time (e.g., one week). The content may be totally inaccessible; unowned, but still renderable; renderable at a lower quality than when the user (and their wallet) owned the associated token; and/or viewable, at least in part after it has been sold. Additionally or alternatively, users may have the capacity to report illegitimate sales through modes including but not limited to using reporting buttons associated with and/or physically close to the rendered content. In accordance with a number of embodiments, user wallets may store degraded versions of sold content, may buffer the content of sold tokens for limited periods of time, and/or may cause optional degradations of content associated with sold tokens upon rendering.

Additionally or alternatively, users may have the capacity to make modifications to cause overlays of buttons for users to report abuse, including but not limited to "I was scammed to sell this NFT", "Malware caused me to sell this NFT", "I did not know that this NFT was sold", "This NFT was sold by somebody I know who had access to the wallet", etc. By selecting one or more of the appropriate buttons, users may generate reports, corresponding to complaints of abuse, which can be processed by user wallets and/or associated software agents. In accordance with some embodiments processing following abuse complaints may involve but is not limited to collecting evidence supporting reports, when applicable, and transmitting information including but not limited to assurances and/or evidence to adjudicating parties. Such adjudicating parties may be part of watchful bridges and/or in communication with them. Additionally or alternatively, the determinations of adjudicating parties may include but are not limited to whether to undo the reported transaction, whether to destroy and/or degrade the token, whether to turn on tracking and/or toggle other functionality, etc.

Some tokens may have content with multiple modes of presentation, where the modes have different levels of quality. For example, one mode may have higher resolution and enhanced audio, and/or additional content not provided in the other mode. Modes of presentation may be determined based on where the tokens reside, with higher-quality modes of presentation being associated with the tokens as that reside on one blockchain (e.g., L2 blockchains), and/or lower-quality modes with another blockchain (e.g., L1 blockchains). In accordance with some embodiments, switches between presentation modes may be made by one or more watchful bridges with access to decryption keys. The decryption keys may enable access to plaintext data that allows modification of content, including but not limited to the inclusion of enhanced quality data with the tokens. Additionally or alternatively, watchful bridges may simply toggle one or more data switches that can be read by DRM modules that determine the manner (e.g., quality level) in which to present the content associated with the tokens.

In accordance with some embodiments, the classifications of blockchain entries may be based on characterizations of nodes associated with the entries. Characterizations of nodes may be disclosed in U.S. Provisional Patent Application No. 63/367,206, titled "Node Characterization and Scoring Method," filed Jun. 28, 2022, incorporated by reference in its entirety.

In some contexts, transactions can be evaluated and selectively reversed using the techniques described herein, and/or combined with the techniques disclosed in U.S. patent application Ser. No. 17/810,085, titled "Distributed Ledgers with Ledger Entries Containing Redactable Payloads," filed Jun. 30, 2022, incorporated by reference in its entirety; this application described technically distinct methods achieving related goals, some components of which can be related with each other and which can be compatible.

In accordance with some embodiments, watchful bridges include, but are not limited one or more hardware components configured with instructions to perform the tasks disclosed herein. Operation of watchful bridges may occur in distributed processes involving a multiplicity of entities, each one of which may be represented by hardware entities that may be configured with instructions. Some of the hardware entities may use the same hardware, including but not limited to circumstances where the watchful bridges include components that run in cloud environments. In accordance with several embodiments, watchful bridges may be software units, including but not limited to apps, DRM modules, and/or other programs. Such programs may run in trusted execution environments (TEE), and/or environments that may be otherwise secured against malware attacks, including but not limited to using high-quality anti-virus software, and/or software-based attestation technologies.

Systems and techniques directed towards the implementation of layered blockchains, in accordance with many embodiments of the invention, are not limited to use within NFT platforms. Accordingly, it should be appreciated that applications described herein can be implemented outside the context of an NFT platform network architecture and in contexts unrelated to abuse protection for fungible tokens and/or NFTs. Moreover, any of the systems and methods described herein with reference to FIGS. 18-19 can be utilized within any of the NFT platforms described above.

2. Consensus Mechanisms

In the present disclosure, we describe technology to associate ToS with a context, based on any form of consensus mechanism. Examples of context include a given content originator or a request from such a content originator, as applied to any token created by said content originator; a given token having an indication of the ToS incorporated in its description or associated with it; a given owner of a token; a jurisdiction; or an authorized message such as a complaint generated by at least one recent owner, a content creator, a law enforcement representative, a government authority, or other trusted party. The token may be a non-fungible token ("NFT") or it may be a fungible token, such as a cryptographic digital asset ("Crypto Asset(s)"). It may also include two or more tokens that are associated with each other, e.g., by a first token being assigned as an owner of a second token and/or a third token, and in which the first token may express, incorporate or reference a ToS descriptor. The ToS descriptor may also be embedded in a smart contract. The method described herein is applicable to all entries or Elements of an entry, but not limited to those defined herein. An entry may include one or more Elements.

In a prior art consensus system, a party ("First Party") identifies the most recently closed ledger of the blockchain, and also identifies zero or more entries of a new ledger of the blockchain, where the new ledger has not yet been closed. The First Party then asserts a collection of the entries to be placed in the new ledger, where this assertion corresponds to an attempt to close the new ledger. The closing succeeds if a collection of other parties agree with the First Party that the collection of entries is correct, i.e., that they are not too many to be contained in the new ledger, that they were submitted to the open ledger, and that the First Party correctly identified the most recently closed ledger. If a sufficient number of them agree, then the ledger is closed. What includes a sufficient number may depend on the type of consensus mechanism. For example, in a proof of work scheme, where the First Party is referred to as a miner and the set of second parties are referred to as verifiers ("Second Party" or "Second Parties"), the ledger is closed if a future collection of participating parties which may include parties not represented among the first and Second Parties, agree that this is valid, in contrast to another potential closed ledger that is different, and where this collection is represented by greater computational power than competing collections with a different view. In a proof of stake context, the second collection may simply be a majority of parties that have staked resources. If different parties stake resources of different size they may get different numbers of votes, and the ledger is considered closed if a majority of votes agree. This is a somewhat simplified description. The collection of parties including the First Party and the collection of Second Parties may sometimes be referred to as a quorum.

The prior art approach does not enable watchfulness of the consensus operation, nor does it enable any of the benefits described herein, such as revoking ownership transfers that correspond to thefts, or implementing a fair exchange.

The disclosed technology enables a host of benefits and functionality by making the determinations, both by the First Party and the Second Party, depending on not only the previously closed ledger and the observed submissions to the open ledger, where these submissions may be referred to as entries or Elements. Instead, the instant invention associates one or more ToS statements with at least some of the entries. The First Party uses the ToS statements to (a) identify what entries to include in the ledger to be closed; (b) identify what entries not to include in the ledger to be closed, and (c) determine whether any of the entries that are included needs to be modified-if so, the First Party preferably but not necessarily identifies what these modifications should be. The Second Parties use the ToS statements in a similar manner as what the First Party did, thereby (a) identifying what entries to include in the ledger to be closed; (b) identifying what entries not to include in the ledger to be closed, and (c) determining whether any of the entries that are included needs to be modified, and if so, what this modification should be. If the Second Parties agree with the assertion made by the First Party, in light of the ToS statements associated with the entries, then they support the assertion of the First Party. In a proof of work context, that means they decide to operate on the newly closed ledger as being the most recently successfully closed ledger of the associated blockchain, as opposed to an alternative ledger on the blockchain, where the alternative ledger corresponds to a potential branching, as is common in power of work-based blockchains. This causes a reporting of history that is based on the ToS statements associated with the entries submitted to the open ledger. The ToS statements may be expressed as part of these entries; in reference to the creators of content associated with these entries; with jurisdictions or other boundaries, such as corporate or geographical boundaries, associated with parties related to the entries; and more. Some ToS statements may be in conflict with each other, in which case the First Party and the Second Parties need to resolve the conflicts before determining what actions (such as the actions labeled (a) to (c) above) to take. An example of a conflict resolution may be to determine the relative priority of conflicting ToS statements based on who originated these statements, the age of the statements, and more.

ToS statements may be associated with entries on an open ledger and be used for purposes of a fair exchange, e.g., by creating collections of related tokens or other entries such that these together satisfy one or more criteria. By open ledger, we mean a collection of entries submitted to a blockchain for recording, where these have not yet been time-stamped. Once they are time-stamped, the associated blockchain ledger is referred to as being closed. These criteria may be associated with one or more rules associated with or expressed by the ToS statements, and may be used to identify a collection of events that need to be reported before any of the transfers associated with these are initiated. Thus, a first token transfer request may state, in a ToS statement, that it is conditional on the existence of a second token transfer to occur. The second token transfer request may likewise specify that it is conditional on the first transfer to be made. This can be used by two mutually mistrusting token owners who wish to exchange tokens with each other, to ensure that either both transfers take place or neither takes place. One of the transfers may be a transfer of ownership of an NFT, and the other may be a transfer of ownership of a specified value associated with a fungible token such as an ETH token. A person of skill in the art will recognize that this technique enables the creation of trust using the consensus mechanism (which already has to be trusted to not allow double-spending, among other things), which is a vast improvement over the state-of-the-art approach of today's marketplaces where a centralized and single party needs to be trusted with performing the requested transfers in an honest manner. The use of the disclosed technology therefore vastly improves on the capability of implementing a fair exchange in a distributed setting, using the improvement of the traditional consensus mechanism.

The consensus mechanism is associated with one or more entities that perform the task of closing blockchain ledgers including one or more entries. In some contexts, this collection of entities may be referred to as a quorum. A quorum corresponds to a sufficiently large group of agreeing participants, where "sufficiently large" commonly refers to a majority. The closing of ledgers with entries may be done, for example, using a proof of stake (POS) approach in which one entity declares what entries are to be included in the ledger to be closed, and one or more other entities vote on the declaration, wherein declarations supported by a sufficiently large quorum (such as a majority) are declared valid. The votes in the POS environment may only be cast by entities that have staked a resource of sufficient size, where this resource may be Crypto Assets, NFTs of a sufficiently large value, other valuable resources, or a combination of such resources. The voting may be weighted where the weights associated with each vote depend on the value of the type of the associated staked resources. The participants in the POS implementation of the disclosed technology associate the ToS, when applicable, with the tokens being submitted to the blockchain, and evaluate what actions to take on each submitted token based on the ToS. Such an evaluation can also be applied to non-token information, enabling the consensus mechanism to enable the timestamping of desirable information and the blocking of the time-stamping of undesirable information. The determination of what is valid and what is not may depend, at least in part, on TOS associated with a given blockchain, a jurisdiction, an originator of information, etc. This can be used to block insufficiently verified news, fake news, racist material, pornography, etc., using the ToS associated with the consensus mechanism and a determining entity (which may be distributed and which may be part of the consensus participants) that determines, for example, whether a given post corresponds to certified information, pornography, etc. This can be done not only for PoS consensus mechanisms, but also other consensus mechanisms, such as Proof of Work (PoW) mechanisms, Proof of Space mechanisms, and hybrids. For any consensus mechanism considered, the participants (e.g., miners) would use a software unit that obtains information about the applicable ToS for a given one or more Elements in a blockchain entry and determines the actions for these.

Available actions may be to allow the time-stamping of an Element, which may correspond to transferring the ownership of a token; prevent the time-stamping of an Element (e.g., block a transfer or certified publication); modify an Element before recording it (e.g., revert an ownership assignment of a stolen token that has been proven to have been stolen, and which may later be resold); initiate the evolution of content by replacing a reference to a first content Element with a reference to a second content Element in a statement associated with a token; and more. The Element may describe or include an event, or may relate to a token, e.g., to cause the minting of the token from content information; to transfer ownership of a token (e.g., sell the token, use the token to pay, or revert the ownership of the token); to express a modification of a token (e.g., perform evolution, or to degrade the token), etc. An example event may be the time-stamping of a cryptographic hash that relates to a text document, an image document, or an audio document, where such time-stamping may be used to later assert ownership, origination, or establish the order of two events. An example of such publication of data or its underlying cryptographic hash is an inventor that determines their invention is worthy of preventing others from patent protecting the concept so that the general public is able to use the "art" as is often done by those that are unwilling to patent a concept but wish to create prior art such that nobody else can patent the invention either. In another example, a journalist or whistleblower may elect to post data to a publicly accessible blockchain in an anonymous manner whereby they may later add source information, or even transfer the data to another non-anonymous wallet thereby proving they hold the secret key to the original data.

If abuse is detected long after it occurred, it can still be remediated, e.g., by selectively canceling previous transactions. This can be done by invalidating assets assigned to criminals, e.g., the next time they are placed in an open ledger. One example of such invalidation is to modify payment transactions in a way that either pays a victim, a victim fund, or which burns the payment by assigning the value to a NULL entity. This provides a long-term discouragement against abuse, such as phishing, malware-driven thefts, thefts based on malicious contracts, ransomware, and more. One or more security organizations, which may be distributed and operating using a consensus mechanism, may provide guidance to parties associated with consensus mechanisms, such as proof of stake participants having staked some resources, in order to identify users whose acts should be penalized. This also applies to users who have changed identities or who use multiple identities in order to evade penalties, e.g., by correlation of such identities by the security organizations. Abuse detection and remediation methods may include, but are not limited to, algorithmic-including machine learning and artificial intelligence solutions, victim claims, bounty hunter assessments, consensus voting-whether automated or manually initiated such as with a DAO vote. Here, DAO is short for Decentralized Autonomous Organization.

We use the term "watchful" to refer to the actions of the entity or entities that are used to police a given set of ToS requests or requirements after having verified that these are valid and apply to tokens handled by these entities. Watchful functionality was disclosed for bridges in U.S. Provisional Patent Application No. 63/365,269, titled "Using Watchful Bridging for Blockchain Fraud Prevention," filed on May 24, 2022, incorporated by reference in its entirety. The present disclosure expands the functionality associated with watchfulness beyond fraud-protection scenarios such as those described in the co-pending application, and shows how to apply the new form of implementation of watchful behavior beyond bridging, describing its use associated with any blockchain mechanism used to select blockchain entries and close a blockchain ledger. One example of that is in the context of consensus mechanisms. We describe in detail how this can be done, and illustrate this with a PoS consensus mechanism.

One manner in which a token can be modified is to associate, with the token, a descriptor that identifies what portion(s) of the token to be removed or modified, and an additional optional descriptor that details a modification. This can be done by wrapping the input tokens, where the wrap includes the one or more descriptors mentioned. Wrapping can be performed by generating a new token that includes the input token and the descriptor(s). The new token may include a digital signature, e.g., associated with the watchful entity performing the operation. It can also be done simply by approving, using the consensus mechanism, the input token and the associated descriptor(s). A modification may correspond to a modification of ownership, where the first descriptor identifies the public key of the registered owner of the token and the second descriptor identifies the public key of the preferred owner of the token, where the preference is in the view of the watchful entity, based on the ToS and optional auxiliary information, such as a theft determination. As another example of a modification, the first descriptor may identify a portion of the content associated with the input token and the second descriptor a URL identifying new content to be associated with the input token; this can be used to implement evolution of a token. Evolution was disclosed in U.S. patent application Ser. No. 17/929,894, titled "Methods for Evolution of Tokenized Artwork, Content Evolution Techniques, Non-Fungible Token Peeling, User-Specific Evolution Spawning and Peeling, and Graphical User Interface for Complex Token Development and Simulation," filed Sep. 6, 2022, incorporated by reference in its entirety.

The application of the watchfulness in the consensus mechanism is preferable to the application of it in the bridge in some scenarios. One reason is that this enables the application of the functionality obtained from the watchfulness even in contexts where there is no movement of tokens from one blockchain to another. Another related reason is that it extends the applications of the technology to information that is not ever transferred between blockchains. Whereas tokens may be transferred, e.g., for purposes of reassigning ownership of them, many operations simply involving timestamping of information do not have any such need, and so, would not have the benefit of screening by a watchful bridge. These operations can still be protected or improved by a watchful consensus mechanism.

A ToS descriptor may be embedded in a token, e.g., at the time of mining. It may be an aspect of the smart contract of the token, for example, or it may be an element of the content portion with a tag identifying it as being a ToS descriptor. The descriptor may be a reference to a known ToS clause; it may include a URL at which the ToS data is stated; it may include a cryptographic hash of the ToS data; or it may be the ToS data. The ToS data may, in turn, include one or more rules. One example of a rule is that the associated token can only be transferred in terms of its ownership after a positive second-factor authentication (2FA) has been performed, relative to a 2FA address or indicator specified in the rule. Another example of a rule is a statement that the associated token is not allowed to be resold. Yet another example of a rule is that the associated token can only be resold after it has remained in ownership of a party for at least 10 days. ToS rules may also state royalty requirements associated with the transfer of ownership, where the watchful entity may be required to facilitate the payment of the royalty payment from one of the transacting parties to a party identified in the ToS, such as the content originator. Other example rules may identify content associated with the token as being adult content, with a potential classification, and where the token is only allowed to be transferred to users in jurisdictions where content of such classifications are permitted. A digital rights management (DRM) system association with a wallet used to access or render content may verify that the tokens and associated content has classifications that the user of the wallet is authorized to access. Thus, the ToS are useful beyond the evaluation of determinations made by watchful entities.

A ToS descriptor may also be an aspect of a consensus mechanism, e.g., associated with the executable instructions used by the entities (such as miners) including the consensus nodes. For example, such a ToS descriptor may identify the conditions under which a token ownership will be reverted to a previous owner, e.g., when the previous owner provides evidence of a phishing attack. Such evidence may be machine-readable and in the form of a mathematical proof related to the attack, e.g., a digital signature generated by a trusted entity stating that the attack took place; it may alternatively include logs identifying the abuse. The evidence may also be human readable and assessed by admins associated with the one or more entities including the watchful mechanism. This may enable the determination of contexts that are not easily quantified in machine-readable manners, and may take as input a request from the content originator associated with the contested token, the request including an indication of how ownership should be modified, including that the content be assigned to a NULL entity, which has the effect of burning the token.

The ToS descriptor may be implicit in that it is associated with any transaction involving an entity within a geographical, jurisdictional or political boundary to which the ToS applies. Such ToS rules may be stored in databases, whether centralized or decentralized, and accessed by the entity or entities closing the blockchain ledger containing the token of relevance, where this token becomes associated with the ToS descriptor of a given geographical, jurisdictional or political boundary by virtue of a party associated with the transaction associated with the token and the entry on the blockchain being associated with the boundary. Such associations may be determined to hold based on location functionality (such as GPS hardware/software, or IP-to-geolocation mappings) or by databases storing the registered locality of a given entity, e.g., a wallet. This may be a voluntary or mandatory registration, and may be used also to determine local sales taxes. Such sales taxes may also be assessed using the disclosed technology, wherein the sales tax may be expressed using one or more ToS rules that are associated with a location, an entity type, a tax classification of the entity, and more. This is another example of the desirable benefits that can be implemented using the watchful consensus mechanisms. Just like the parties performing the consensus operations may demand, receive and forward royalty payments associated with ownership transfer operations, they may demand, receive and forward sales tax payments. These payments can be paid by a seller, a buyer, or a third party such as a sponsor. An example sponsor is a brand associated with content referenced by an NFT, for example. The ToS rules indicated by the token, the locality of entities related to a transaction, or other pertinent parties, may be evaluated by the consensus-performing entities and the appropriate financial transactions performed as a condition for the completion of an ownership change of an NFT. Similarly, the posting of or timestamping of information may require a payment, such as a usage tax, which may be collected by and funneled to the appropriate party/parties as a prerequisite for the posting or timestamping to be permitted.

The acceptance of a blockchain entry may be conditional on the identities of at least one of the parties associated with the entry. The entry may be a recording of a statement by one party, for example, or the transfer of ownership from a first group of parties to a second group of parties. The acceptance of the entry may result in a transfer of ownership. It may also result in another desirable action, such as evolution. The rejection of an entry may correspond to not recording the entry, to not facilitating a transfer of ownership, to modifying the content associated with the token in a manner that constitutes a penalty, etc. The identity or identities associated with a blockchain entry may be based on the distributed identity information of such an entity or such entities; distributed identity information is described, for example, in the Jul. 1, 2022 Avast blog entry titled "Independence Day: W3C strikes a blow for digital freedom" by Drummond Reed, available at https://blog.avast.com/dids-approved-w3c. The identity or identities may also be associated with identity tokens, disclosed in U.S. patent application Ser. No. 17/808,264, titled "Systems and Methods for Token Creation and Management," filed Jun. 22, 2022, incorporated by reference in its entirety.

ToS can be associated with a wallet, e.g., by a configuration process initiated by an authorized user of the wallet. For example, a user may turn on theft protection for a given token using a user interface (UI) of the wallet. The UI may for example display a switch for each icon describing a token, where flipping the switch to "on" turns on theft protection for the token. When this happens, the wallet publishes a statement that the token has theft protection on, e.g., on a blockchain or in another database accessible by the consensus mechanism parties (e.g., stakers, miners, etc.) The statement may be digitally signed by the wallet, where the digital signature can be verified using a public key associated with the wallet, and where the statement identifies one or more tokens that are theft protected. This status is detected by the consensus mechanism parties. If the token is requested to be transferred from the wallet to which it belongs to a new owner, the consensus mechanism parties determines that this is not allowed without an authorization that may be specified or indicated in the statement, and where one example authorization is a 2FA authentication related to the statement or wallet, e.g., in which the consensus mechanism parties will send an SMS message with a code to a phone number associated with the wallet and request a response over a secure channel indicated in the SMS message, e.g., using a URL. After the response is received, the transaction is allowed, but not otherwise. The URL may include the code and be unique to the given transaction. Alternatively, the user of the wallet may be required to use an authenticator, such as Google™ Authenticator and input a code in an interface associated with the request from the wallet when the transfer request is initiated on the wallet. The code is verified and an assertion, such as a digital signature produced by the verifier is obtained. This assertion is included with the request to transfer ownership, and is verified by the consensus mechanism parties before these allow the transaction to take place, i.e., by having it recorded on the blockchain. This requirement can be bypassed for tokens that are not labeled as being theft protected. The theft protection feature may require the user of the wallet to perform a payment to have the theft protection statement to be recorded in a database. This statement is the ToS, or an aspect of the ToS. When a theft is prevented, the party or parties preventing it (e.g., the entities blocking the transfer) may be given an award, where the award is paid from funds paid to register theft protection. A person of skill in the art will recognize that this feature is just an example of functionality that can be implemented using the disclosed technology.

A set of parties corresponding to the consensus mechanism may be notified that any transaction in which a token of a given type is transferred to/from a wallet within a given boundary requires a verification of content, a payment of sales taxes, a registration with an escrow authority, or another action. This requirement is the ToS associated with said boundary, and may be publicized by a representative of the boundary. An example of a boundary is a state, a country, a commercial entity, a family, etc. Escrow technology is disclosed in U.S. patent application Ser. No. 17/821,444, titled "Systems and Methods for Management of Token Interactions," filed Aug. 22, 2022, incorporated by reference in its entirety.

A first token may own a second token, whether directly or in multiple steps, as disclosed in U.S. Provisional Patent No. 63/365,269, titled "Directed Acyclic Token Structure" by Markus Jakobsson and filed on May 23, 2022. The first token may associate with itself or with the second token a ToS statement, e.g., by incorporating the ToS data or reference in a portion of the first or second token; by publishing a statement with ToS information and including an identifier associated with either the first or the second token, where such an identifier may be a public key or a hash of a public key. This way, the first token associates the ToS with itself and all the tokens it owns, or with a specific token such as the second token. That ToS may specify that the token(s) to which the ToS applies can only be transferred under certain conditions, e.g., only on a Wednesday; only together with an associated token; only after a commission is paid to an identified party (such as the wallet in which the first token resides); or after an authorization has been received, where the authorization may use a 2FA technique.

As briefly described above, a token may be associated with one or more ToS statements. These may be complementary or may have contradictions. In the latter case, the parties implementing the watchful consensus mechanism may have access to one or more rules that are used to identify actions to be taken in case of a contradiction, i.e., the quorum employs one or more rules that identify which ToS statements to consider in order to make the decision. These actions may include to not perform actions associated with the contradiction; to prioritize one ToS statement over another, e.g., based on the origin of the ToS statements, based on their associated time-stamp, or based on a hierarchy of power, where law enforcement may have the highest priority, local rules may have a lower priority, and preferences expressed by a company or a family may have the lowest priority.

The disclosed technology can be used to ensure payment of royalties, which is not a guarantee using today's technology. Today, marketplaces collect royalties and pay them to content originators, e.g., as an NFT is sold. However, if a non-compliant marketplace were to be used, or an NFT is sold in a private sale, there may be no collection of or payment of royalties. This could become a big problem for content creators, were non-compliant marketplaces to become common. (This is plausible, especially if these are set up in jurisdictions where there is little recourse offered to content creators that file complaints; such non-compliant marketplaces may offer users reduced rates as incentives to use them, and cheat the content creators of their royalties.) This is elegantly addressed using the disclosed technology, as the watchful consensus mechanisms will block transfers of ownership without the proper collection of royalties. This will take place even for private sales, and non-compliant marketplaces cannot skirt the royalty rules. The watchful consensus mechanism would verify that each transfer requiring a royalty payment is associated with a corresponding transfer of funds. In other words, when an NFT requiring a royalty payment is sold, then that token would be reassigned from a First party to a second party, by the First party signing a transfer request using his or her private key, the transfer request including the public key of the second party, who is the recipient. A royalty payment includes a similar transfer, from the payer of the royalty payment (who may be the second party above, who is buying the NFT) is performed by reassigning the ownership of Crypto Assets (expressed by another token) from the second party to the content creator (or any other party due to receive a royalty payment).

The watchful consensus mechanism may verify that this second token transfer, namely the royalty payment, is present when the ToS associated with the NFT specifies that this should take place. Similarly, sales taxes can be verified. Moreover, the payment for the NFT, which is a transfer of Crypto Assets from the second party to the First Party, should be done. All of these transfers may be associated with each other and made conditional on being a complete set. A complete set may be a payment for an NFT and the transfer of an NFT. A complete set may also be a triplet, such as a payment for an NFT, the transfer of the NFT, and a royalty payment associated with the transfer of ownership of the NFT. A complete set may be a quadruple, where in addition to the components of the triplet above, a local sales tax payment is verified. The watchful consensus mechanism would verify that a set of transactions is a complete set by identifying one or more ToS that are associated with the transaction. A seller of the NFT may include a ToS statement with his or her transfer of the NFT, specifying that the transfer is conditional on a payment of a specified size to him or her. The seller of the NFT may also specify that the buyer of the NFT needs to pay the royalty. These ToS statements are collected by the watchful consensus mechanism, which determines whether a complete set of transaction requests has been received, and if it has, then allows these associated entries. Otherwise, the watchful consensus mechanism may refuse the recording of the transfer, or make it pending one or more transfers that are required to make a complete set. A pending collection may be identified in the blockchain, by the watchful consensus mechanisms, as being tentative, meaning that it has not taken effect but will do so if the missing transactions are received and recorded within a required amount of time, such as 5 minutes. If not, then the recorded set is not a transfer of ownership. Once the missing transactions are recorded, assuming this is done within the required time or under the specified conditions, then the tentative collection corresponds to valid transfers of ownership. Thus, the disclosed technology enables a fair exchange, without any trust in a centralized entity. In contrast, today's token marketplaces are centralized entities that, if they misbehave, can abuse users.

In one embodiment, multiple related transaction requests, such as those described above, are posted to a blockchain. Each of the transaction requests may include one or more identifiers. A first identifier is a semi-unique number R, which may be selected as a nonce by one or more of the parties involved in the transaction. Each of the transactions in a complete set would reference the same number R to indicate that they are associated and simplify, for the watchful consensus mechanism, the identification of the complete set. Each of the transactions may also be associated with another value, such as a counter i, where different transactions use different values. This enables reference to other transactions in the set, by these transactions. The value i may also indicate the type of the transaction, e.g., a transfer of a payment for a service may use a different value than a transfer of tax payments, which may use a different value that a transfer of an NFT, which may in turn use a different value than a statement indicating ToS, an escrow value, etc.

FIGURES

Figure 20:
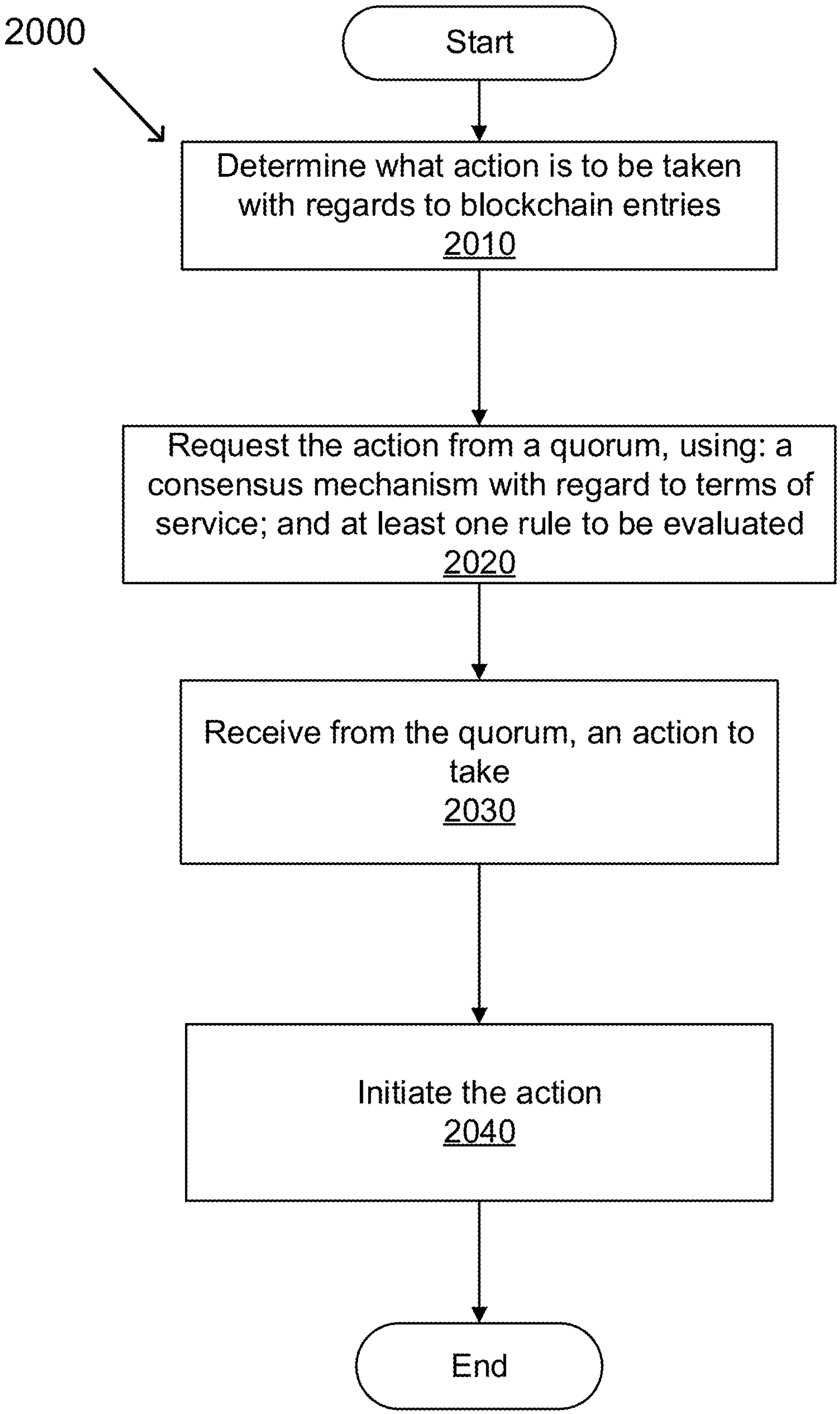
FIG. 20 illustrates a process for determining an action to take with regard to an entry on a blockchain ledger in accordance with numerous embodiments of the invention.

FIG. 20 is a flowchart of an embodiment of an example of a method 2000 for determining an action to take with regard to an entry on a blockchain. The Element is associated with ToS information, and the Element or entry is to be included in a ledger to be closed. The ToS statement includes or references at least one rule to be evaluated. The entry is to be included in the ledger to be closed if conditions associated with the ToS are satisfied. FIG. 20 illustrates the method including a step 2020 of requesting an action from a quorum with regard to the entry on the blockchain using a consensus mechanism with regard to the ToS and the at least one rule to be evaluated, and a step 2030 of receiving, from the quorum, the action to take, which may be different than the requested action. An example request may be the submission of the entry to the open ledger. FIG. 20 also illustrates the method including a step 2040 of initiating the action.

Figure 21:
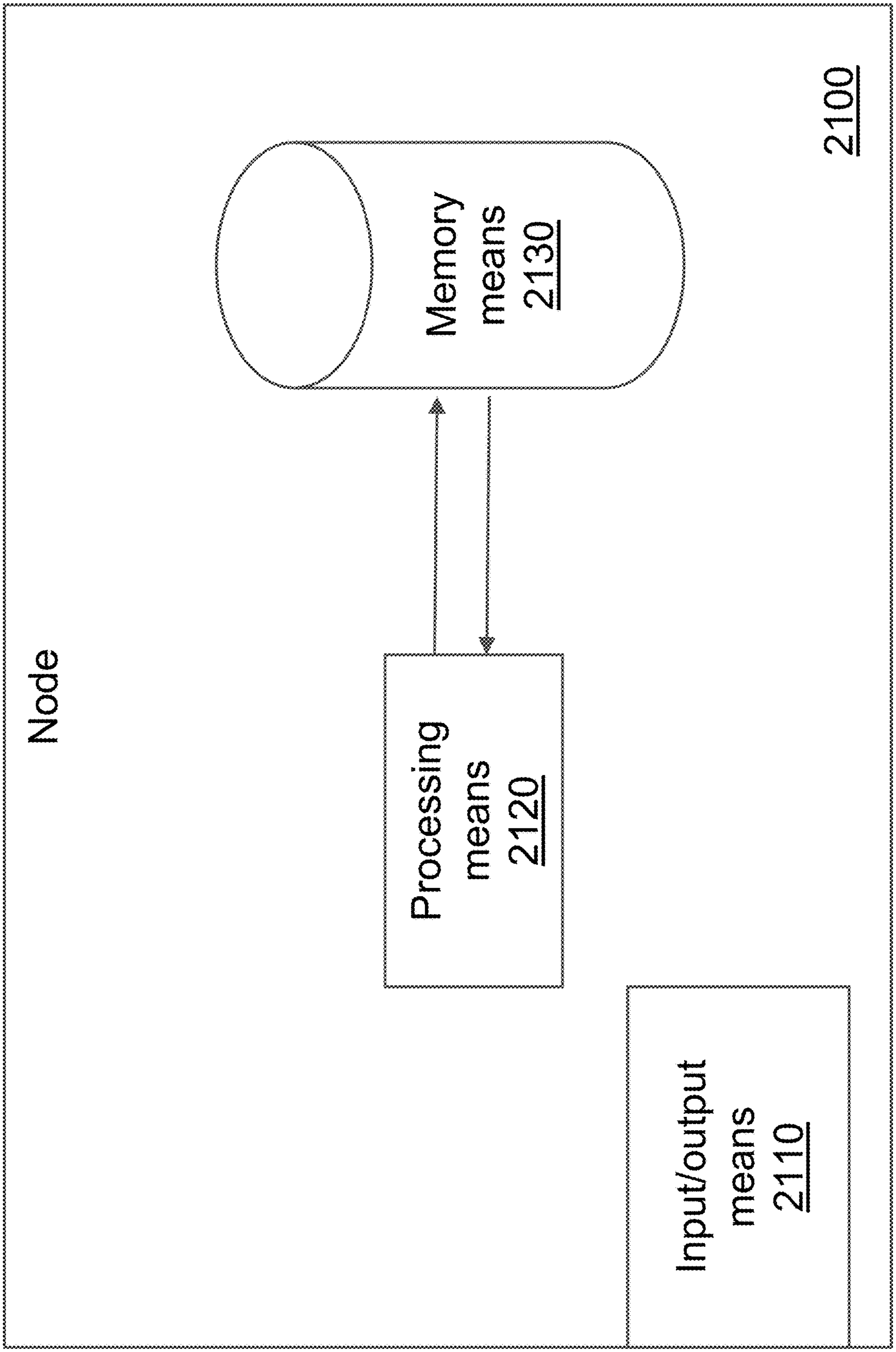
FIG. 21 illustrates a node configured in accordance with some embodiments of the invention in order to implement a consensus mechanism for determining an action.

FIG. 21 is a block diagram of an exemplifying embodiment of a node 2100 configured for implementing a consensus mechanism for determining an action to take with regard to an Element, or entry of the Element, on a blockchain. The Element is associated with ToS statement or information, and the Element or entry is to be included in a ledger to be closed. The node 2100 is illustrated including input/output means 2110 by means of which the node 2100 may receive information and transmit or provide information to other units, devices and/or entities. FIG. 21 also illustrates the node 2100 including processing means 2120 and memory means 2130, the memory means 2130 including instructions, which when executed by the processing means 2120 causes the node 2100 to perform the method described herein.

Figure 22:
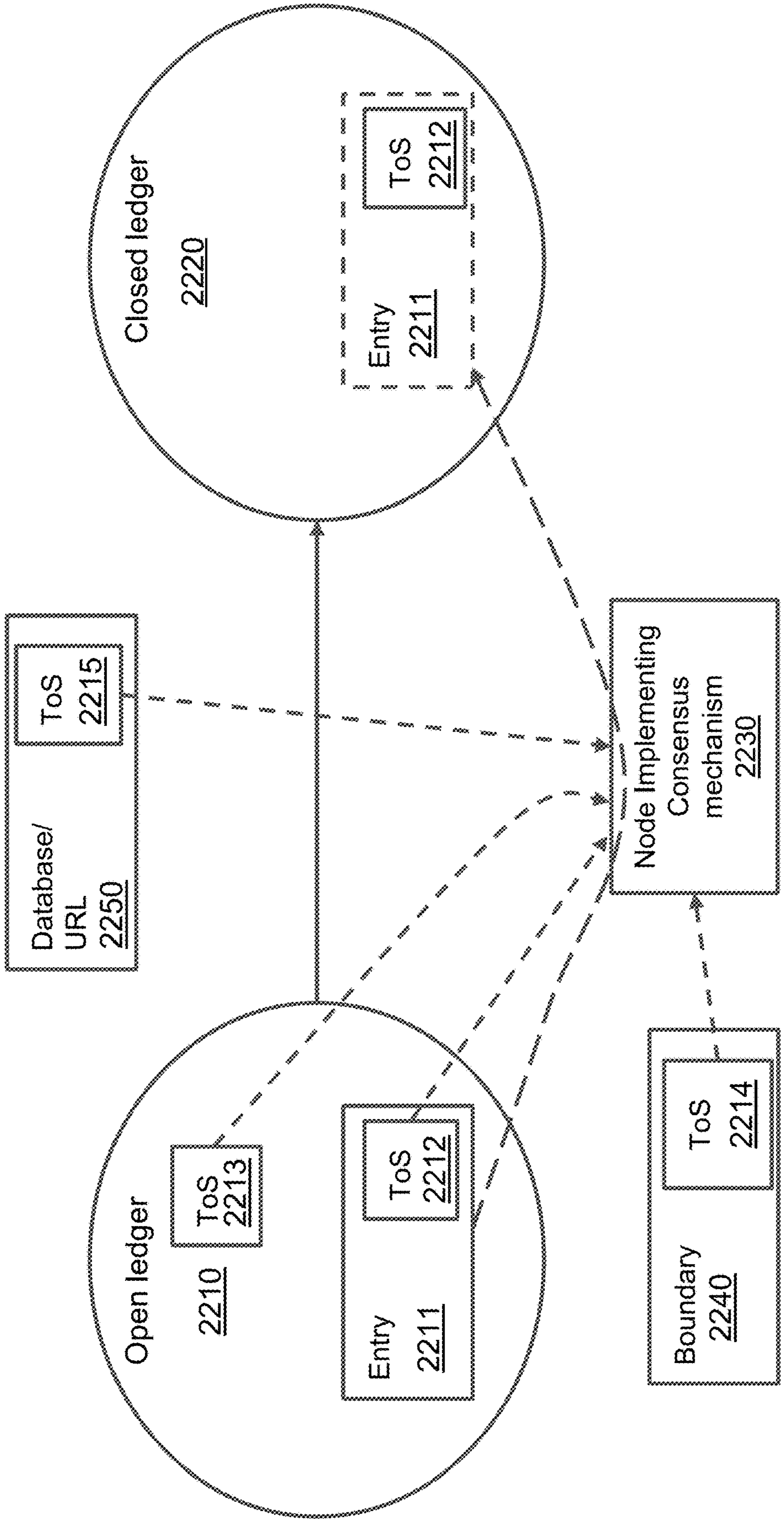
FIG. 22 conceptually illustrates an element of an open ledger blockchain added to a closed ledger in accordance with several embodiments of the invention.

FIG. 22 is an illustration of an example method in which an entry 2211 of an open ledger 2210 on a blockchain 2200 is to be timestamped, resulting in the open ledger 2210 or a version thereof becoming a closed (or "sealed") ledger 2220. FIG. 22 illustrates a node 2230 implementing a consensus mechanism. In order for the node 2230 to make the decision to include the entry 2211 in the closed ledger 2220 of blockchain 2200, the node 2230 needs the ToS as this is used as a basis for the decision. FIG. 22 illustrates the ToS being possibly located in different "locations". In one example, the ToS 2212 is located in the entry 2211 or in a smart contract of the entry 2211. In another example, the ToS 2214 is associated with a boundary 2240, which may mean that different actions are or are not allowed depending on the boundary. The boundary may be a geographical, jurisdictional or political boundary to which the ToS applies. It is pointed out that there may be several different ToS that is taken into account by the consensus mechanism as will be explained in more detail below. FIG. 22 also illustrates an example where the ToS 2215 may be found in a database 2250, which may be accessible by means of an URL, which URL may be found e.g., in the Element. It is pointed out that FIG. 22 is merely an illustrative example and does not include an exhaustive list of examples where the ToS may be found or to what the ToS may be associated.

Figure 23:
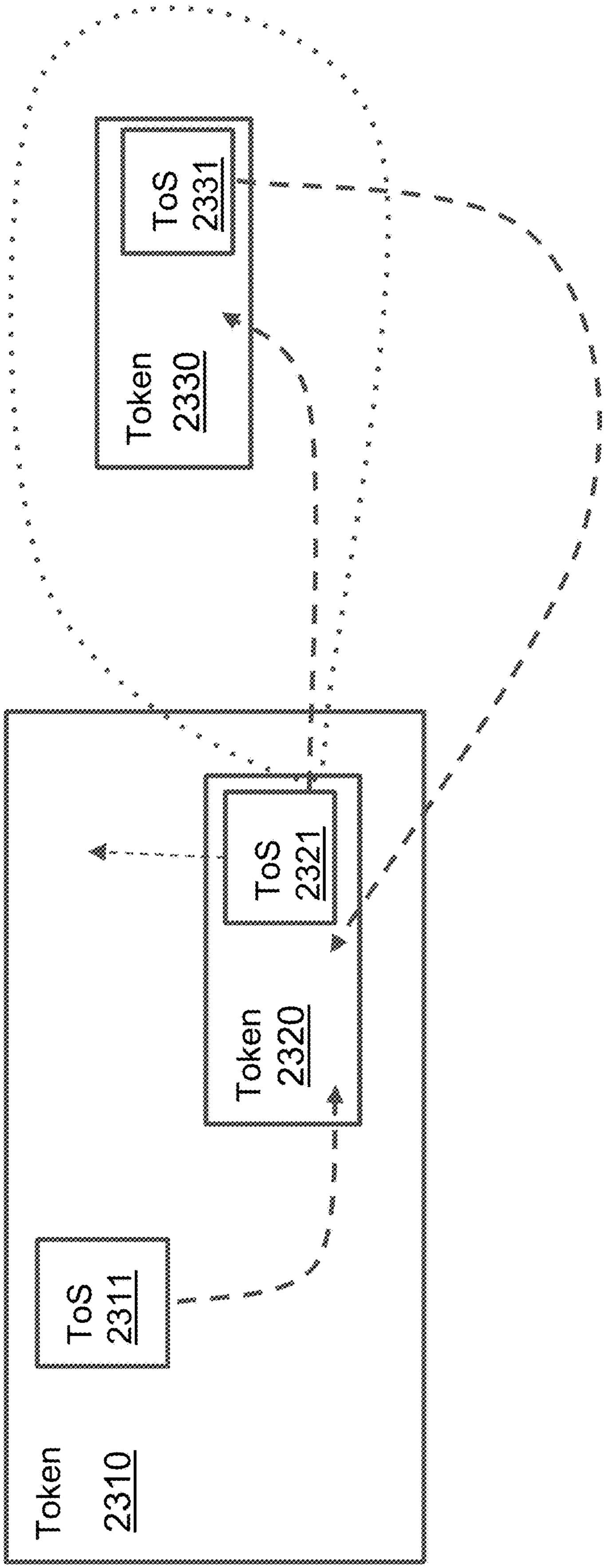
FIG. 23 is a schematic illustration of relationships between tokens and respective terms of service, configured in accordance with many embodiments of the invention.

FIG. 23 is a schematic illustration of relationships between tokens and respective ToS thereof. FIG. 23 illustrates a first token 2310 having or being associated with a ToS 2311. The first token 2310 owns a second token 2320 having or being associated with a ToS 2321. The second token 2320 is associated with a third token 2330 having a ToS 2331. The association between the second and third token may be the second token owning the third token. Each token is illustrated having its own ToS, but in some embodiments, not all tokens are associated with a ToS statement. The first token 2310 owning the second token 2320 may impose its ToS 2311 onto the second token, either replacing the ToS 2321 of the second token with its own ToS 2311. This replacement may be performed by having the dominant ToS being considered instead of the subservient ToS, where the former is associated with the owning token and the latter with the owned token. The first token may optionally combine its ToS 2311 and the ToS 2321 of the second token 2320, and this combination may be valid for either the first token 2310, the second token 2320 or both tokens. By valid means in this specific example that the original ToS is replaced or complimented by the combination of the two ToS. In this schematic illustration, the association between the second token 2320 and the third token 2330 enables a similar replacement or compliment regarding the ToS 2321 of the second token 2320 and the ToS 2331 of the third token 2330. As an example, the second token 2320 may have a combination of ToS of the second and the third token, and then by the first token owning the second token, the second token, the first token and also the third token may have a combination of ToS from all three tokens.

Figure 24:
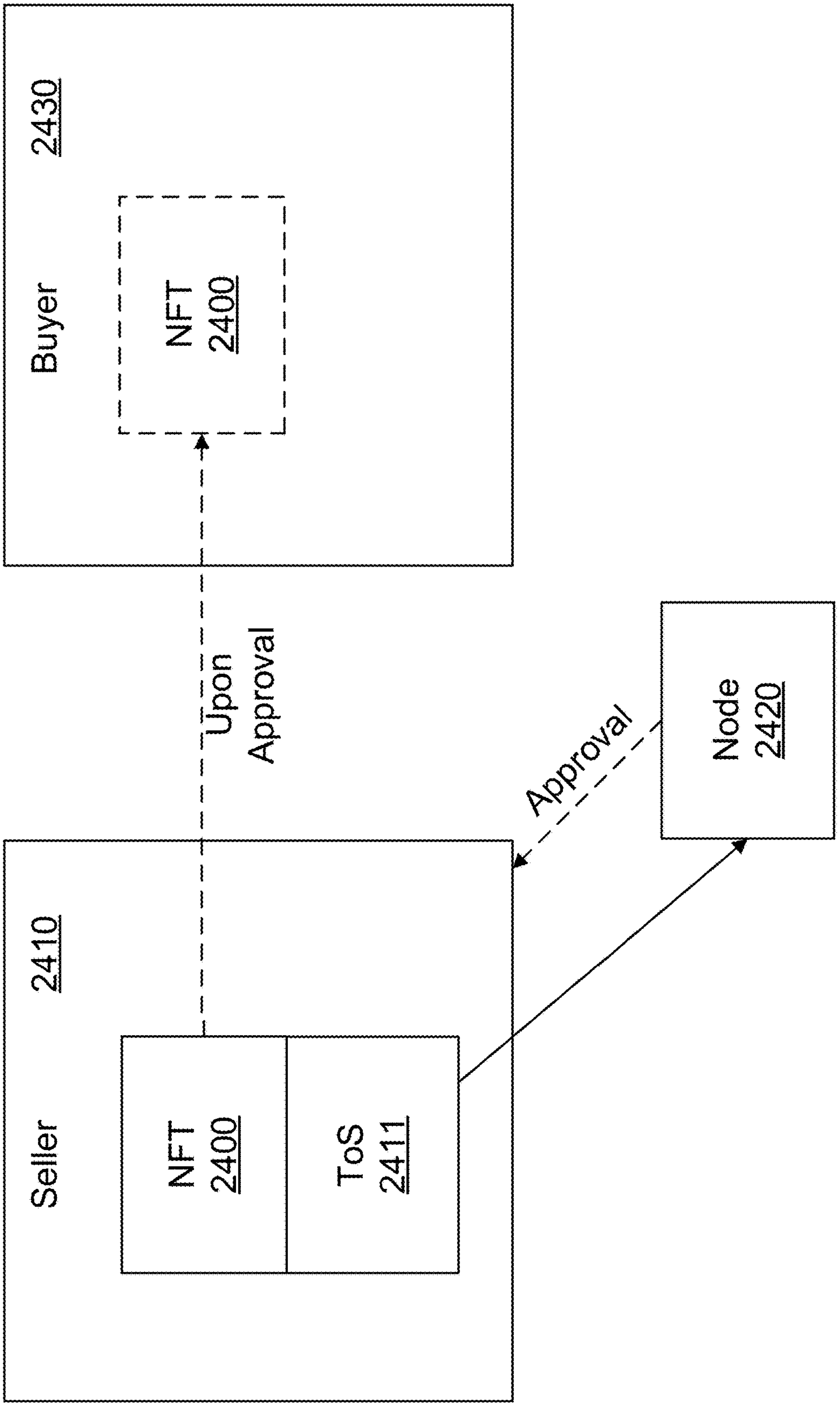
FIGS. 24-25 illustrate a transfer of NFT ownership in accordance with certain embodiments of the invention.

FIG. 24 is a schematic illustration of a transfer of ownership of an NFT 2400 from a seller 2410 to a buyer 2430. FIG. 24 illustrates a seller 2410 including a ToS 2411 statement in or with an NFT 2400 to be sold to a buyer 2430. The ToS statements includes one or more rules, e.g., as stated above that the transfer is conditional on a payment specified by the seller 2410. Another ToS 2411 that is part of the token may state a rule that requires payment of royalty for the transfer to be performed. FIG. 24 illustrates a node 2420 implementing a consensus mechanism as described herein, e.g., as illustrated in FIG. 20. The node 2420 obtains the ToS 2411 and performs the method 2000 as illustrated in FIG. 20 or otherwise described herein. The result is a decision on whether the rule or rules of the ToS 2411 statement is/are complied with, or fulfilled. FIG. 24 illustrates that once the rule or rules of the ToS 2411 statement is/are complied with the NFT 2400 is transferred from the seller 2410 to the buyer 2430.

Figure 25:
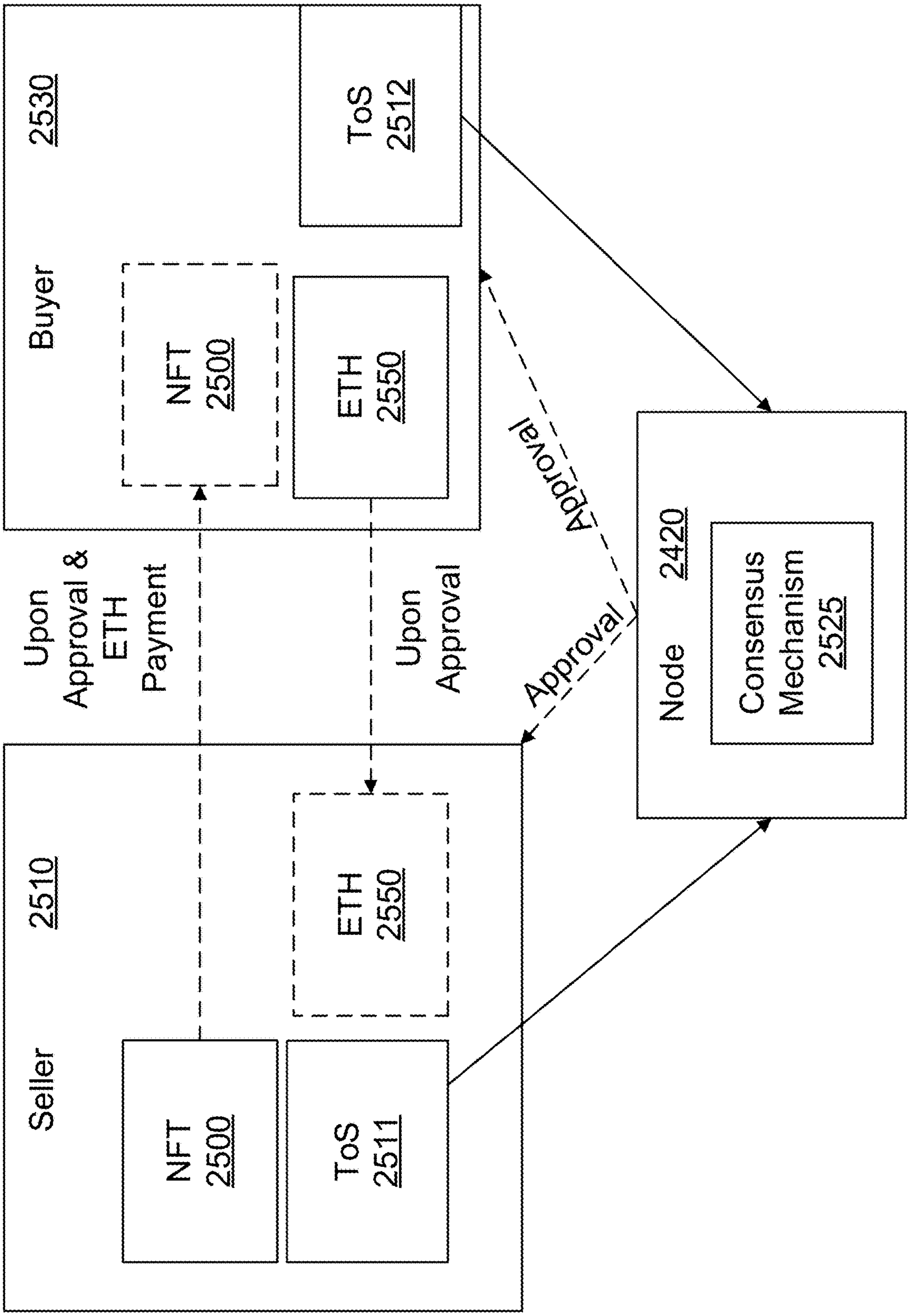

FIG. 25 is a schematic illustration of ownership of an NFT 2500 from a seller 2510 to a buyer 2530 conditional on payment of ETH 2550, wherein the payment of ETH 2550 is conditional on the transfer on the NFT 2500. FIG. 25 illustrates a seller 2510 of an NFT 2500 to a buyer 2530 associating a ToS 2511 statement with the transfer of the NFT to be sold. The ToS 2511 statements include one or more rules, e.g., as stated above that the transfer is conditional on a payment of ETH 2550. The buyer 2530 owning the ETH 2550 associates 2531 a ToS 2512 statement with the transfer of the ETH 2550 which is to be paid for the NFT 2500. The ToS 2512 statement of the ETH 2550 may include a rule that the transfer of the ETH 2550 is conditional on receiving the NFT 2500. FIG. 25 illustrates a node 2520 implementing a consensus mechanism 2525 performing a method as described herein, e.g., the embodiment thereof described in FIG. 20 below in order to make a decision that both the rule of the ToS associated with the transfer of the NFT 2500 and the rule of the ToS associated with the transfer of the ETH 2550 are both complied with in order to complete the transfer of the NFT 2500 and the ETH 2550.

Figure 26:
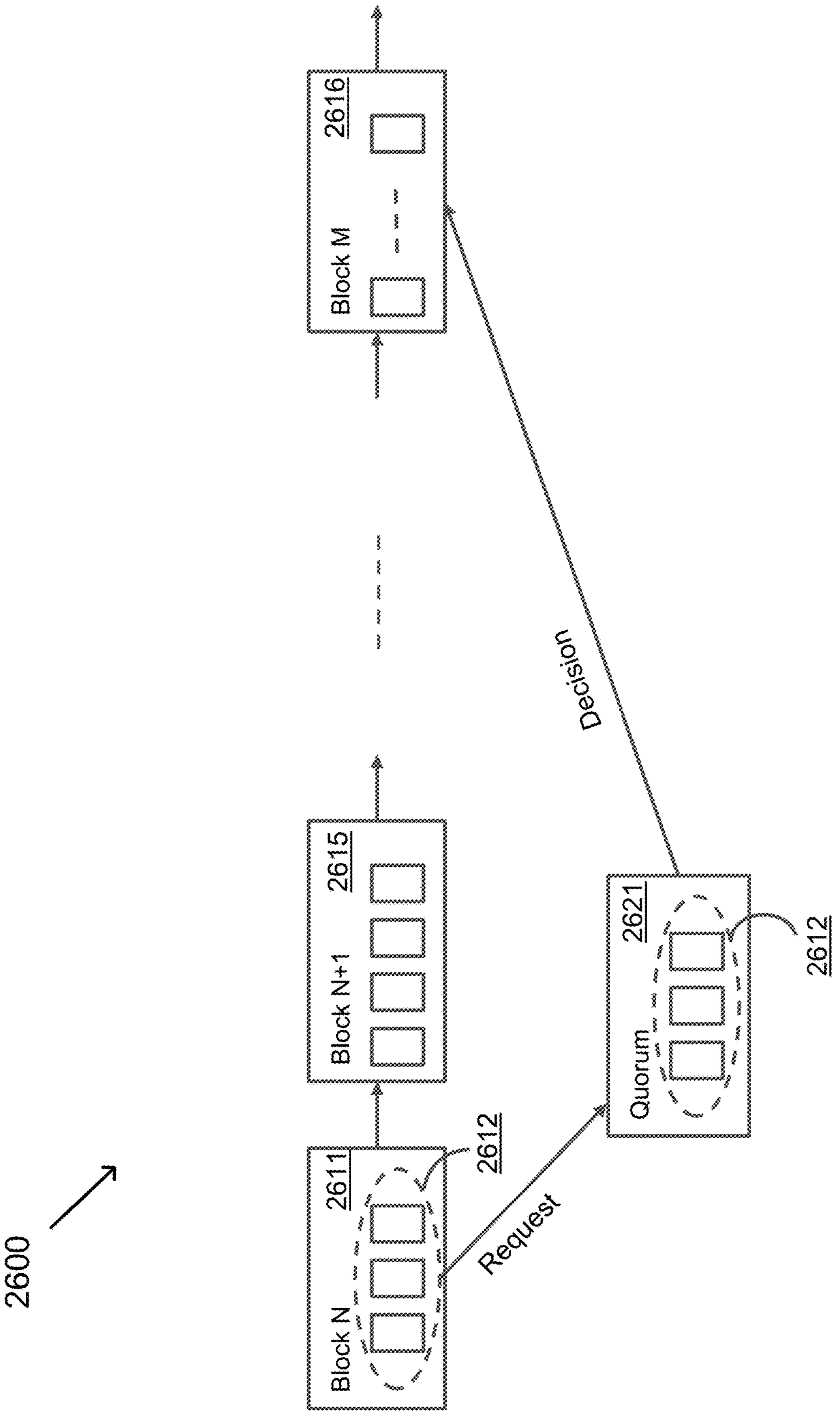
FIG. 26 conceptually illustrates the implementation of a consensus mechanism in accordance with many embodiments of the invention.

FIG. 26 is an illustration of an example of how the method described herein may operate. FIG. 26 schematically illustrates a blockchain 2600. At a point in time, a block N with reference number 2611 includes some entries associated with events that have taken place, the entries being included in an open ledger to be closed. These entries have reference number 2612. A request is sent to a quorum 2621 to take an action with regard to the entries 2612 on the blockchain using a consensus mechanism with regard to the ToS and the at least one rule to be evaluated. This request may be implicit, and be the same as the posting of the entries on the open ledger. The quorum makes a decision, in this illustrative example, the quorum 2621 makes the decision of including all the entries 2612 without any modifications in the closed ledger. The entries 2612 are then included in a closed ledger in block M with reference number 2616.

Systems and techniques directed towards the application of consensus mechanisms to abuse protections, in accordance with numerous embodiments of the invention, are not limited to use within NFT platforms. Accordingly, it should be appreciated that applications described herein can be implemented outside the context of an NFT platform network architecture and in contexts unrelated to abuse protection for fungible tokens and/or NFTs. Moreover, any of the systems and methods described herein with reference to FIGS. 20-26 can be utilized within any of the NFT platforms described above.

B. Additional Safeguards

1. NFT Groupings

The disclosed methods enable the assignment of NFTs to sets and the detection of properties associated with a set, such as detecting whether a given NFT belongs to a set, or detecting whether a user owns all NFTs in a given set. A set can be defined by a content creator, e.g., as all movies by the content creator, or all audio files with bird song, or all promotional movies created by the content creator on the subject of electronics. A set can also be defined by third parties, such as an influencer, e.g., all NFTs that the influencer endorsed; all NFTs that the influencer gave at least four stars; all NFTs with content augmented by or commented on by the influencer. A set can be defined by a group of users, e.g., all photos generated by a photography club in the year 2021, or all of these photos that got at least 10 thumbs-up ratings by members. A set may also be defined by the actions of a group of people that is not constrained to a specific membership, e.g., all NFTs for which there is a bidding war that brings up the purchase price at least by a factor 10. The set can further be defined by a content curator, which may specify what NFTs belong to the set. A given NFT may belong to multiple sets. A set may also be a collection of NFTs that correspond to a cluster in a graph that describes derivation of one NFT from one or more other NFTs. Derived NFTs are disclosed in U.S. patent application Ser. No. 17/808,264, titled "Systems and Methods for Token Creation and Management," filed Jun. 22, 2022, incorporated by reference in its entirety.

Some sets may be defined as a collection of specific, unique NFTs. We refer to such sets hereinafter as "sets of unique NFTs." For instance, a digital artist makes seven visual artworks in a series, one for each day of the week, and releases each one as a single NFT, with a single edition. In this case, the artist may choose to define a set of unique NFTs named "Days of the Week," which consists of these seven specific NFTs. This set could be described as containing seven unique NFTs, each identified through a unique combination of contract address and token identifier under the ERC-721 standard, for instance.

Some sets may be defined as a collection of NFTs where the constituent items satisfy some condition which is broader than simply matching some unique identifier. We refer to such sets hereinafter as "sets of NFT classes". A class here could correspond to an asset class for ERC1155 NFTs or to a conceptual class or category, including a conceptual category of NFTs of the ERC721 standard or other. For instance, perhaps the digital artist above releases 10 editions of her artworks for each day of the week, resulting in 70 NFTs in total. She may then wish to define her "Days of the Week" set as a "set of NFT classes" which consists of one NFT corresponding to each of the seven days. Someone who purchases one "Sunday" NFT, one "Monday" NFT, and so on, for each day of the week, should be considered as owning this complete set of NFT classes, even if their "Sunday" was minted as a first edition and their "Monday" was minted as a second edition. There are many potential combinations of unique NFTs under the ERC-721 standard, for instance, which would include a complete set.

The methods described herein may be performed by a device, a smartphone, an arrangement, a network node, a server in a cloud or a control unit in a device, an arrangement, a network node, a server in a cloud. These methods may be performed by a single such physical entity or distributed over several physical entities. Hereinafter, any of the device, smartphone, arrangement, network node, cloud server or control unit therein will be referred to as network node for sake of simplicity. In the below description of the method, some examples are given referring to other parts of this disclosure. These examples are illustrative and non-limiting and are given to clarify what may be included in a method step.

One aspect of the disclosed technology is that an individual minting an NFT can associate the new NFT with other NFTs at the time of minting. This link between NFTs would be committed by a node on Blockchain to the new NFT at the time of minting. A set of NFTs may be minted pseudo-simultaneously such that the NFTs are immutably part of a set from the time of minting.

In one embodiment, the association of an NFT with a set can be specified by a node at the time of minting through the construction of the NFT token URI itself. This carries the advantage of storing the set association and item information on the blockchain even when metadata is stored off-chain. Any changes to the set information can thus be subject to the NFT contract and any changes will leave a searchable history on chain. In cases where an NFT's URI is effectively unchangeable after minting, this approach requires knowledge of an NFT's set membership at the time of minting; in other cases where the URI can be changed after minting, this approach accommodates encoding of changes to an NFT's set membership. The below approaches to specifying set information in a URI are compatible with standards in which an NFT is minted with an association to a URI, such as ERC721 and ERC1155.

In one embodiment, the association of an NFT with a set can be encoded by a node into the NFT URI using an approach in which one substring within the token URI is used to specify the set identity and a second substring within the token URI can be used to specify the identity of the token within the set. For instance, in a simple case, an entity minting a set of NFTs could employ the same base URI for all NFT members, such as "https://lunardig.net/maps/LMP-Overlay/5/11/", which functions as the first substring; the second substring could function as the next portion of the token URI, such as "5" for the fifth NFT of a set of unique NFTs, or for all NFTs minted to correspond to the fifth item in a set of NFT classes, possibly to be followed with a standard filename such as "metadata.json". In this example, the URI for an NFT corresponding to the fifth item in a set would be "https://lunardig.net/maps/LMP-Overlay/5/11/5/metadata.json". This simple approach may suffice in some cases, and it allows naturally for the nesting of NFT sets, for instance an NFT with the above URI may be considered both the fifth member of set "https://lunardig.net/maps/LMP-Overlay/5/11/5" as well as the fifth member of the eleventh subset of set "https://lunardig.net/maps/LMP-Overlay/5/", and so on. However, there are drawbacks to this specific approach, for instance it requires all NFTs within a class to share the same metadata, because all "fifth" NFTs will share the URI for instance, and it is not always compatible with common approaches to decentralized storage of NFT metadata, such as the use of IFPS which enforces particular URI styles. In a more complicated case, the two substrings may together form a smaller part of the URI for a constituent NFT. For instance, an NFT that is the fifth member of a set called "LunarDig511" could be associated with a URI substring "SET-LunarDig511_ITEM-5". This substring could be prefixed by some arbitrary sequence, for instance a hash-based IPFS URI, and/or it could be suffixed by another sequence, such as the unique token identifier, which would allow multiple tokens corresponding to the same item in a sequence to be associated with different metadata if needed. For instance, "ipfs://et93jsdgo3lqkehg793jsh347nrx54wcubt5lgkeivez63xvivplfwhtpym/SET-LunarDig511_ITEM-5_456" could be the URI for a token whose set is "LunarDig511", corresponding to item 5 in this set, with unique token identifier 456, with "et93jsdgo3lqkehg793jsh347nrx54wcubt5lgkeivez63xvivplfwhtpym" being the hash assigned to the metadata by IPFS.

This convention of encoding set and item identifiers into an NFT URI allows for sets whose size may not be predetermined, even initially to the artist creating them. One example might be a set of works (photographs, poems, etc.) based on an election season. For each candidate entering and leaving the race for a particular political office, a particular artist might create a unique work. It is a-priori unknown how many of such works will be created, but there will come a time after the election when no more new works will be needed, thus closing the series and set. This naming convention can be extended to explicitly demarcate the completion of membership in a set, for instance, the item URI substring may simply be "ITEM-9" i for the ninth of ten minted political candidate artworks, and the tenth and final NFT in this set may be minted with an item URI substring of "ITEM-10END". As another example, a painter might start a series of paintings of flowers, and continue painting flowers until they decide that they are finished, and the set is complete, at which point they indicate the set is complete through the use of the token URI. There are also cases in which an artist might intentionally create works of a set across their entire life, with the set being closed when the artist dies. In this case, one option is to simply leave the set of already-minted NFTs without any new additions, in which case these NFTs can be recognised by wallets and other services as members of the same set. Alternatively, if the artist's estate or representative would like to formally indicate that no more members of a set will be minted, the artist's credentials could be used to mint a final token that is not associated with any artwork, whose only purpose is to close the set membership, by employing the set's URI substring along with an item substring of "ITEM-END". We discuss additional mechanisms for demarcating and testing membership in a set below.

In one embodiment, a similar URI substring convention can be used for sets whose size is known from the time of minting the first NFT(s) in the set, for instance by employing item substrings of the form "ITEM-5of30" for an item which is number 5 out of 30 total in the set.

In one embodiment, a creator may not wish to suggest an ordering of items in a set to prospective or actual purchasers. For instance, an artist may create a set of digital works and may not want to suggest anything in particular about the relative importance or chronological ordering of items in the set, preferring instead to mint and release the set pseudo-simultaneously. This can be supported using a similar approach as above, for instance by a node employing one URI substring to convey the set identity and a second URI substring to correspond to the particular item in the set. In this case, the item substring could be derived from a pseudorandom number or string, for instance generated by the software used to create the NFT work, for instance through computation of a cryptographic hash of the digital content of a work or a hash of the current Unix timestamp concatenated with the name of the individual work. Other variants for performing this step can also be performed, as will be appreciated by a person of skill in the art.

In one embodiment, set membership can be encoded by a node into the metadata of an NFT. For instance, two name-value pairs can be added to a JSON metadata string, with "set" being the name of one pair and "item" being the name of another pair. The value of the "set" pair corresponds to the name of the set and the value of the "item" pair corresponds to an identifier for the item, which could be a number or a string, and which may follow conventions described above such as providing incrementally increasing integers to number items in an ordered series, employing other strings to designate items in an unordered series, or possibly supplying additional information such as "5of10" to indicate that an item is number 5 of 10 in the set. Alternatively, in the case where membership in multiple sets is allowed, this may be specified through adding to the JSON metadata a name-value pair with "sets" being the name and the value being an array, where each object in this array contains a "set" name-value pair and an "item" name-value pair. A person skilled in the art will recognise that this approach can be extended with additional JSON attributes and that other metadata formats will also accommodate such information. Set membership can be encoded thus into an NFT's metadata whether this metadata is stored on-chain or off-chain, and this approach can be used as an approach separately from or alongside an approach that encodes the set membership information in the NFT URI. In cases where an NFT's metadata is effectively unchangeable after minting, this approach requires knowledge of an NFT's set membership at the time of minting; in other cases where the metadata can be changed after minting, this approach accommodates encoding of changes to an NFT's set membership.

In one embodiment, set membership, and item ordinality if desired, can be encoded by a node into an NFT's metadata but in a way that does not reveal the ordinality of an item in the set and/or does not reveal the cardinality of the set or identity of the set(s) to which an item belongs, even if these are known by the creator at the time of minting. For instance, a game company wishes to create an NFT collectible for each of many characters in a game series. The same company knows in advance that they will create a set called "Baddest Bosses", which contains 12 "bosses" from the game series, in order of how "bad" or "tough" each one is. However, the company will not publicly announce which bosses are members of the set, nor their order in the set; they wish for a collector to only find out whether a boss NFT is in the set, and where that boss ranks out of 12, after she purchases the NFT, in order to gamify the process of hunting for bosses to complete the set. This can be achieved for instance through the use of a single asymmetric key pair X, Y known to the creator at the time of the NFT metadata creation. Inserted into the metadata of each NFT in the set is an encrypted passphrase, encrypted with key X, where the passphrase is unique for each member of the set. For instance, this passphrase can be constructed by concatenating the set name with the item number in the set, e.g., "Baddest Bosses 3". For additional security, such a passphrase may be augmented before encryption, for instance through string concatenation or applying a bitwise XOR, with information specific to the NFT being minted, for instance its URI, its contract address concatenated with its unique identifier, or a cryptographic hash of uniquely identifying attributes; such an approach will prevent an adversary from minting new items that fake membership in a set through copying the encrypted passphrase directly into a new NFT. This encrypted passphrase can, for instance, be stored in a name-value pair within the NFT metadata where the name is specific to the set, such as "baddest bosses encrypted passphrase", or generic such as "encrypted passphrase," and the value is the encrypted passphrase value. For obfuscation of set membership, items that are not members of the set may have this same attribute added to their metadata but associated with a dummy value. Any service that knows the key Y, the list of passphrases corresponding to items in the set, and the associated encryption algorithm can verify whether decrypting this metadata field using key Y produces a valid passphrase corresponding to an item in the set. For instance, this service could be a centralized service run by the company whose software was used to create the NFT, by the marketplace selling the NFT, or by a wallet or arbitrary other software or hardware chosen by the NFT purchaser or someone else. If a centralized approach to such verification is desired, then the key Y and/or passphrase information can be kept secret. For instance, this would enable set membership and ordinality for "Baddest Bosses" NFTs to be verified only by a service provider contracted by the games company for this purpose, e.g., using an oracle or an API that can be queried by wallets or other software. Alternatively, a decentralized approach can be supported where Y and the corresponding passphrases and encryption algorithm are made publicly available, potentially written to the blockchain themselves. Some or all of this information could potentially reside within the metadata of a separate NFT, for instance as described below in the context of "collector cases." Instead of using an asymmetric key pair, similar functionality could alternatively be achieved using a symmetric key X with an appropriate encryption algorithm, where the metadata of each NFT in the set contains an encrypted passphrase, unique to the set member as above, encrypted with X. In this case, any service that knows the key X, the list of passphrases corresponding to items, and the associated encryption algorithm can verify set membership by verifying whether decrypting this metadata field using key X produces a valid passphrase corresponding to an item in the set. However, this approach does have the potential drawback that the key X cannot be widely shared to enable decentralized verification of set membership without also enabling an adversary to mint new NFTs with encrypted metadata that represents them as part of the set, so other mechanisms would be needed to prevent or mitigate such activity.

In one embodiment, an artist or creator could employ an automatic off-chain process that is triggered whenever the next NFT in an ordered set or series is purchased, and the next NFT in the series is automatically minted and the object published.

In one embodiment, an automated off-chain process could be triggered by a node whenever a collector acquires all NFTs in a particular series, whereby a collector's badge is minted and transferred to that collector. This badge could be personalized to the collector, and/or it could include information such as the date and time of issue, for instance to reward early completion of a collection.

In one embodiment, NFTs within a set may have an associated notion of relative or absolute ordering or arrangement, and this may be in more than one dimension. In the simplest case, NFTs in a set have an ordering which maps onto a one-dimensional sequence, such as a chronological order of the creation of the work, or the ordering of images which include subsequent frames in a video. In more complicated cases, items in the set may be arranged in two, three, or more dimensions, where items can correspond to coordinates in an n-dimensional space, where a notion of distance applies such that items can be considered nearer or further from each other in the space, and where items can be determined to be adjacent to particular other items. One approach to representing this possibility within NFT set members is to extend the approach described above for encoding set membership within a URI, wherein instead of reference to a single item number, the URI string includes "n" coordinates uniquely identifying that set member within the n-dimensional space. For example, a set of NFTs might be created from a single two-dimensional image by overlaying a puzzle jigsaw set over it, breaking the image in P pieces and thus minting P separate items from the single item. Each piece's 2D location, for instance the (x, y) location of the piece in pixels within the original digital image, can be used to derive the URI substring of the piece. Another approach to representing this possibility within NFT set members is to extend the approach described above for encoding set membership within an NFT's metadata, wherein a name-value pair is added to the metadata for each of the n coordinates specifying an items location in an n-dimensional space in a given set. Such information could optionally be represented in an encrypted format similar to the approach described above if, for instance, position information is desired to be verifiable for a party with a decryption key but not immediately knowable e.g., by a potential purchaser. Alternatively, or additionally, each set member could store information in its metadata about the identity and relative location of its neighbors. For instance, a puzzle piece from a puzzle created with a rectangular grid could store within its metadata, in an encrypted or unencrypted format, an identifier unique within the set of pieces of this puzzle, or it could otherwise be associated with an easily-discovered identifier such as the concatenation of the contract address and token ID. Further, each puzzle piece could store within its metadata a list of name-value pairs, where the name of each pair corresponds to "top", "right", "bottom", and "left", and the value of each pair corresponds to the identifier of the puzzle piece to its top, right, bottom, and left, respectively. A "NULL" value or functional equivalent can be used as the value in the case where there is no such adjacent piece because this piece is on an edge or corner.

The approach above enables, for instance, an artist to take a single digital visual piece and break it into 1,000,000 puzzle pieces using a user interface within the disclosed technology, and then sell each piece for 1 dollar. This way each user could own a small share of this artist's work. This has implications on the associated digital wallet. In this instance, the artist may also mint the overarching full piece as a separate token that the collector only gets once the collector owns all the N separate pieces. The wallet has the equivalent of a folder that showcases all the pieces of the puzzle that a collector has purchased and also gives information of how many they own out of the total set of unique NFTs. For example a collector may own 45 pieces of the puzzle out of 1,000,000 that exist. The wallet also knows the location of each item within the overall piece and can display the current collection using a spatially corresponding arrangement.

Another example is that an original piece can be broken into 1,000 puzzle pieces but there are 1,000 editions of each puzzle piece. This allows for up to 1,000 collectors to have the ability to own the full set of NFT classes and get the associated full token. In this example, there is potential for other tokens to be added as rewards from ownership that motivate the collector to purchase as many puzzle pieces as possible. For example, imagine a tokenized piece of the artwork with a woman wearing a dress designed by Anthropology™. If the user collects 100 pieces of the puzzle, an additional advertising token is awarded to the collector, with the utility of adding a 10 percent off coupon at an Anthropology store. If the collector gets all pieces of the puzzle they get a bonus token with the utility worth 500 dollars of store credit at the Anthropology store. This has many implications on systems implementing the method, involving a merchant that has an association with the digital artwork, purchasing tokenized advertising in associated work, allowing revenue for the artist and/or marketplace that distributes this piece. The 1,000 piece puzzle with 1,000 editions may also be useful as a contest whereby the pieces are issued randomly and blindly and a player is required to keep purchasing pieces until they have the full set, much like completing a bingo card.

Another example of this puzzle set technology can be used in the nonprofit world to create campaigns that help a specific cause. Imagine an artist who is an environmentalist who wants to raise money for climate change organizations such as World Wildlife Foundation. They create a piece of work about endangered elephants. This piece is then automatically cut into 10,000 pieces using the disclosed puzzle set technology. The artist connects with the World Wildlife Foundation and makes a donation in the form of agreeing to donate 50 percent of their proceeds. The WWF sets up a digital wallet for their organization and the smart contract is coded with 50 percent going to the artist and 50 percent to the cause. This is a new paradigm to help raise money for non-profits to make tokens convert to action for a cause.

Recognising adjacency and/or proximity in members of a set, allows people to purchase multiple adjacent set members. For example a user might desire to own the image of a particular human face composed of 7 puzzle pieces from a crowd scene. A system for purchasing NFTs could be aware of the notion of adjacency and proximity, allowing the user to purchase all 7 puzzle pieces at the same time. Or, a collector might be notified that the one remaining piece they need to complete the face image is available for sale. Another example could involve snips of a music file. A user might wish to obtain 10 contiguous snips for $10 rather than having to try to buy 10 snips individually for $1 each. Alternatively, upon the purchase of one set member, a system could suggest adjacent members for purchase.

In one embodiment, certain aspects of set membership can be verified in a decentralized manner on one or more nodes using a set of asymmetric key pairs, for NFTs whose membership in a set is known at the time of metadata creation and where all NFTs in the set are created by the same entity or by coordinating entities, or alternatively for NFTs whose metadata is changeable after minting. For instance, in the case where set items entail a relative or absolute ordering in one dimension, each item NFT can store in its metadata information that allows it to identify each of its two neighbors. For example, imagine a wide panoramic image which is chopped into 10 narrower images, ordered from left to right. Here, each item NFT stores information that allows it to verify that another item NFT sits at its left or at its right. This can be achieved through the use of an asymmetric key pair (X, Y) associated with each boundary between adjacent items. Call the NFT to the left of a particular boundary "A" and the NFT to the right of this boundary "B". Let Ai be a string that can be computed from the token A. If this is a set of unique NFTs in which only one NFT in the world can function as "A", then the concatenation of the contract address with the unique identifier of A can serve as Ai. Or, if this is a set of NFT classes in which two or more distinct NFTs can function as "A", for instance multiple editions of a single puzzle piece, then let Ai be some other identifier computable for any such "A" NFT, for instance the NFT URI or a concatenation of the contract address with the value of a metadata attribute identifying the NFT as class "A." Similarly, let Bi be a string that can be computed from the token B. A stores in its metadata a value derived jointly from X and Bi, for instance by computing the binary XOR of X and Bi, where knowledge of Bi enables a computation to recover the value of X. This value can be stored in A's metadata, for instance, in a name-value pair with the name being "secret for NFT to my right." Likewise, B stores in its metadata a value derived jointly from Y and Ai, for instance by computing the binary XOR of Y and Ai, for instance in a name-value pair with name being "secret for NFT to my right." A and B may also store explicit reference in their metadata to the associated cryptographic algorithm, e.g., RSA, and if necessary any information needed to execute the computation of Bi and Ai, respectively, from a given NFT if that NFT is in fact a valid B or A item. Any third party, such as a wallet, or a service selected by or on behalf of a user, can employ the associated algorithm to test whether A and B are indeed adjacent members of the set by (1) computing Bi, (2) deriving X given Bi and the value stored in A's "secret for NFT to my right", (3) computing Ai, (4) deriving Y given Ai and the value stored in B's "secret for NFT to my left", (5) encrypting an arbitrary string S1 using Y, (6) decrypting this using X to produce string S2, and (7) verifying that S1 and S2 are identical. Special markers (e.g., "END", "NULL") can be employed to indicate that an item is that an item does not have an adjacent neighbor in the given direction. When a user has access to all member items in a set, whether through ownership, examination of the blockchain, or otherwise, this approach enables the user to verify that these members are indeed part of a set, to verify (if relevant) the relative position of each item within the set, and to verify that the set is complete. This approach requires coordination between the processes that mint "adjacent" NFTs to ensure that key pairs are appropriately distributed to each NFT item. This coordination is trivial if all constituent NFTs are minted by the same system. Otherwise, the relevant keys for adjacent NFTs will need to be communicated amongst systems using a centralized or decentralized process. A person with skill in the art will recognise that there are many ways to store the required name-value pairs in NFT metadata in JSON or other formats.

A somewhat simplified process may be used if it is not a problem for NFTs created by untrusted third parties to be accepted as part of the set. In this case, A can merely store X in the clear as the secret for its neighbor to the right and B can merely store Y in the clear as the secret for its neighbor to the left. Such a method enables a third party to mint a new NFT compatible with the set by copying the neighbor keys for a chosen item, e.g., an existing "A" item, into the metadata of a new NFT.

This same approach to enabling decentralized verification of set properties and set completeness can be applied to NFT sets which do not have any intrinsic ordering, for instance by arbitrarily assigning a numerical identifier to each set item which places the set in a one-dimensional ordering. This same approach can be extended to NFT sets where items are arranged in a greater number of dimensions, for instance by including keys for the adjacent item to the top, right, bottom, and left of each given NFT. NFT items in such sets may or may not include additional metadata that informs where they fall in an ordering or N-dimensional space. For instance, items associated with portions of a 2D image may include unencrypted metadata specifying the row-column grid location of each item, so that it is trivial to identify which item is adjacent to the left, for instance, and keys can be used merely to verify this relationship. Alternatively, set items may be distributed in a way that is more analogous to a physical puzzle, where it is not trivial to know which pieces are adjacent to each other. For example, an artist may create a digital puzzle out of a 2D image in which each NFT item in the set is shaped like a conventional puzzle piece, and a user, group of users, or some other process must do some work to determine how to align the puzzle pieces so they "interlock." Each piece's position and/or even the puzzle shape, size, or degree of completeness may not be known until all piece's interlocking companions have been identified and verified.

In one embodiment, a set can be defined with regards to particular properties of constituent NFTs rather than being defined as a set of NFTs with specific, unique identities, i.e., creating a set of NFT types as defined above. The example above of the art piece above that is broken into 1,000 puzzle pieces but with 1,000 editions of each puzzle piece is one illustration of this phenomenon. For instance, a collector who owns 1000 pieces of the puzzle, each piece at a unique location in the puzzle, should be considered to own the complete set even if the top left corner was minted as part of the 326th edition of the puzzle and the bottom right corner was minted as part of the 18th edition of the puzzle. In some contexts, such as this puzzle example, creators may want purchasers and other people to think about certain NFTs as functionally identical; for instance, there is no reason anyone would favor the 18th edition bottom right corner piece over the 19th edition bottom right corner piece, or even know which is which. But in other contexts, a creator may wish to define sets in ways that sets can be completed using alternative pieces that are not functionally identical. For instance, a board-game company may define a "chess set" as any set that consists of eight pawns, two rooks, two knights, two bishops, one king, and one queen on a "white" side and the equivalent number of piece types on a "black" side. The company may wish to recognise any owner of 32 such chess piece NFTs as owning a complete "chess set", which brings this owner special privileges such as the ability to play with these pieces in an online environment, regardless of whether the player's pawns are of type "classic pawn" or "zoo animal style pawn" or some mixture of the two or others. In this case, each NFT that may become part of such a set can be minted with metadata that indicates its role within the set. For instance, each pawn NFT's metadata may identify it as of type "pawn" with regards to the set "chess set", regardless of what specific type of pawn it is. The same mechanisms as described above can be used to communicate and verify membership of an item in the set, and in special cases where set completion entails collecting one item of every "type", for instance one puzzle piece at every available location, no additional infrastructure is needed to verify complete ownership of a set. However, in the case that complete set ownership is defined by more complicated rules, such as the rules defining a complete chess set, this can be supported by additional approaches. For instance, a trusted central organization such as the game creator can publish on-chain or off-chain a code that can be run to check whether a given set is complete. Or, a trusted organization can provide an oracle or other service that can be called remotely such as through an API to perform such a check. Or, sufficient information to perform such a check in a decentralized fashion can be included in the metadata of each minted NFT. Or, sufficient information to perform such a check in a decentralized fashion can be included in the metadata of a separate NFT, such as a "collector's case" NFT described below. An organization that defines a relevant set can, if desired, choose and configure the set verification procedure(s) to make it possible for third parties to mint NFTs that can become part of a specified set. For instance, the board-game maker may choose to share encryption keys used in its "chess set" set with a movie franchise partner who will make chess pieces corresponding to its movie characters, or it may choose to make encryption keys used to verify set membership public or forgo using them at all in order to encourage players to create their own chess piece NFTs that will be compatible with its notion of a "set" and therefore with its online game environment.

These approaches are all compatible with common existing standards for NFTs such as ERC-721.

One aspect of the disclosed technology is the ability to represent an NFT's membership in a set even when membership in that set is not known at the time of minting. This includes the ability for people other than NFT creators to define sets, for instance influencers, curators, cultural institutions, organizations including multiple creators, and others. For instance, an influencer may do a vlog highlighting her "10 favorite NFTs of November 2022", and she wishes to offer a badge and a product discount to any follower who has verifiably purchased all NFTs in this set of NFT classes. Or, for instance, a renowned museum may curate a set of 100 digital artworks, already minted by various creators, to be exhibited in a Summer 2022 show. The museum wishes for these artworks to include a set titled "Summer 2022 Show". Perhaps each of these artworks is quite well-known and published as a single edition, so it is unlikely that a single collector would ever own all 10, but indicating that these NFTs are members of this set of unique NFTs carries other advantages. For instance, this might favourably influence the future sale price of items in this set, as future collectors can verify inclusion of the work at the show through membership in the set. Or, the set may be loaned out to other museums or collectors as a single unit, similar to a travelling exhibition in physical space.

In the case where a party, whether a creator of NFT(s) in the set or otherwise, wishes to define a set for items that have not taken into account this set membership at the time of minting, one possible approach to define a set is for this party to publish or contract with another service to publish information about set membership, for instance through an oracle or an API queryable by a wallet. Another approach is for this party or another party to publish set membership information on the blockchain using a queryable format, or as an on-chain asset which could be a separate NFT.

In one embodiment, a set can be defined through the creation by an arbitrary party of a new asset, which we shall refer to here as a "collector's case," and which may itself be an NFT. In the case in which a collector's case is an NFT, just one collector's case may be minted, or many collector's cases may be minted, or collector's cases may be minted on-demand in response to collector interest, or the minting of collector's cases may be triggered by an event such as the minting or purchase of a final NFT class associated with a set or by an oracle. These are illustrative possibilities for minting but other possibilities exist.

In one embodiment, a change in or the completion of a set associated with a collector's case can trigger an associated event. For instance, a collector's case NFT may trigger the placing of a reward NFT, such as a gift item or a coupon for a product discount, into the wallet owning the collector's case when the final item completing a set is purchased. Or, for instance, the acquisition of a new item within a set may trigger an increase in the score of a game player owning the wallet.

In the simplest manifestation, a collector's case can be thought of as analogous to a physical case with a number of slots for holding sports memorabilia, such as a hockey puck for each team in a league, or for other collectibles, such as each action figure from a popular movie franchise. This collector's case contains information which allows, at minimum, confirmation of whether a particular NFT is a member of the set. The collector's case may also be able to provide confirmation of whether a set is complete, such as whether the wallet containing the collector's case contains the complete set, and potentially other information, such as the number of missing items or the location of the present and missing items in a set that entails ordering or spatial organization.

In one embodiment, the collector's case can contain a list of identifying information for each NFT in the set, for instance, a URI, contract address, and/or token ID, or concatenations of such information. This list may be stored in the clear, or in an encrypted format, or a checksum using a method such as SHA-2 may be computed on this identifying information and then the checksum stored. This allows any third party, such as a wallet, to test whether an arbitrary NFT is a member of the set associated with the collector's case.

In one embodiment, the collector's case can be constructed so that it is easy for a human and/or a computational process to identify items that include the set or that will complete the set. For instance, it may include a human-readable description of all set items and corresponding match information for each item, for instance appearing in the collection case's NFT metadata in unencrypted form. Or, the collector's case may be constructed so that it does not explicitly reveal information about which items include the set, which items may complete the set, the size of the set, and/or other such information. For instance, for each item i in the set, the construction computes a cryptographic hash, called "checksum_i", on data that represents the identity of a corresponding NFT. For instance, this could be the contract address concatenated with the NFT token identifier, in the case of a set of unique NFTs, or for instance the NFT URI or a concatenation of the contract address with the value of a metadata attribute identifying the NFT as the specified class, in the case of a set of NFT classes. The collector's case stores checksum_i as the i-th element in a list within its metadata. The collector's case also stores in its metadata any other necessary information to facilitate set verification, such as the identity of the specific checksum method used, the selection of NFT identifiers or other fields used in computing the checksum, etc. This enables an arbitrary third party to verify whether an arbitrary NFT B is a member of the associated set, by computing whether checksum_i is equal to a checksum computed directly from the identifying data of NFT B. This approach does not preclude someone with access to, but not ownership of, the metadata in the collector's case NFT and information about the potential set item NFTs from discovering through trial and error which NFTs include a set, but the tradeoff is that this enables a decentralized and completely anonymous ability to verify set membership for a given collection.

In one embodiment, a collector's case may include more information about a set and/or its constituent pieces, to support more complex interactions and/or types of set construction. For instance, a case may include "slots" for NFT items that are yet to be minted, with information about when minting is scheduled and how an upcoming item may be purchased. A case may include human-readable and/or machine-readable information about more complicated set constructions, potentially in the form of code that can be run to determine whether an item is a member of a set or whether a set is complete. For instance, a collector's case for the "chess set" example above may include a set of logical tests that determine whether a set is complete based on the properties of constituent NFTs as well as the number of each type of NFT in a wallet, for instance based on the number of pawns, queens, and so on. A collector's case may also prevent new items from being treated as part of a set based on the properties of the set so far, for instance if the chess set case already contains eight white pawns it will not treat a purchased ninth pawn as part of the set.

In one embodiment, a verifiable association between set items and a collector's case can be embedded into the set member NFTs as well, if the set association is known at the time of minting or if the NFT metadata is changeable after minting. For instance, the software used to create the set item and collection case metadata employs an asymmetric key pair X, Y. For each item in the set, the construction computes a cryptographic hash called "checksum", on data that represents the identity of a corresponding NFT. For instance, this could be the concatenation of the contract address and NFT token identifier in the case of a set of unique NFTs, or for instance the NFT URI or a concatenation of the contract address with the value of a metadata attribute identifying the NFT as the specified class, in the case of a set of NFT classes. Another hash, called "checksumCC", is computed on data that represents the identity of the collector's case, for instance contract address concatenated with token identifier, if there is only one collector's case, or its contract address or URI, if there may be multiple issued collector's cases. Checksum and checksum2 are combined using a method such as a binary XOR to yield a string S which is encrypted using X and stored in the metadata of the item NFT. Similarly to above, Y is stored in the metadata of the collector's case. This enables an arbitrary third party who knows the method for computing the checksums and the choice of encryption algorithm associated with X and Y to verify that a given collector's case was chosen to be associated with this item NFT at the time of the item's metadata creation. Specifically, a party may verify that using Y to decrypt S, then computing the checksum for the NFT item and using it to reveal checksumCC, yields a value for checksumCC that corresponds to the hash computed on the given collector's case. Note that this method for enabling decentralized verification that an NFT was minted with an association to a collector's case may be used alongside the above method for enabling decentralized verification that a given collector's case was constructed such that a given NFT is to be recognised as a member of the case's set. A person of skill in the art will also recognise that this method may be extended to declare the membership of an NFT in multiple collectors cases, or to support collectors cases for sets with more complex membership logic, such as the chess set example.

In one embodiment, a collector's case may in some cases employ off-chain processing to determine whether an NFT is a member of the associated set. For instance, the metadata in a collector's case NFT may specify a list of associated NFTs, or may specify logic or executable code which may be applied to a given NFT or data extracted from a given NFT to determine set membership, or may specify a URI or other reference to a service or API capable of determining whether the NFT is a member of the given set. Such processing may take as input data from the NFT itself such as its contract address or token identifier, and/or it takes input data from its metadata, and/or it may take input other data associated with the NFT such as music, video, text, audio, image, or other data, for instance linked from its metadata. For instance, this processing may employ a fingerprinting algorithm to determine whether media associated with an NFT matches a target media, for instance accepting a music NFT as a member of a particular music set whenever the music associated with the NFT is a song on an artist's album or a snippet of such a song.

In one embodiment, a collector's case may in some cases employ one or more machine learning classifiers that can be applied to new NFTs to determine whether they can be considered a member of the set. This classifier may take as input data from the NFT metadata, and/or it may take as input other data associated with the NFT, such as music, video, text, audio, image, or other data associated with an NFT, for instance linked from its metadata. This classifier may employ computer vision, natural language processing, music information retrieval, audio analysis, or other analysis approaches. This classifier may exist as a central, trusted off-chain resource, accessible via a central API via a URI within the collector's case NFT metadata. Or, this classifier may be distributed so that it may be run in a decentralized manner, for instance with its code and/or executable being shared publicly for any third party to host, such as a wallet, along with a checksum associated with the classifier being written into the collector's case metadata. Or, the classifier may be written as a script or executable within the collector's case metadata itself, to be run by a wallet or in some other environment. Those skilled in the art will recognise that these are illustrative examples and there are other ways to associate a classifier with a collector's case. Using a classifier to determine set membership enables particular interesting ways of interacting with sets. For instance, this enables a game company to release a collector's case for a "treasure hunt" game in which players must collect NFTs corresponding to photos of different sea animals, where these NFTs may come from any source. A player plays the game by hunting for photos that the classifier recognises as each of the required animals. As another example, a musician may wish to reward fans to record and mint NFTs of their own "karaoke" versions of his own songs. He may do this through issuing a collector's case NFT that employs a set of classifiers, each one capable of applying machine listening to a fan's NFT and determining whether it is indeed a karaoke version of a specific song from that musician.

In one embodiment, the determination of items associated with a set is dependent on dynamically changing events or phenomena which may be off-chain. For instance, a set called "Number ones" may be defined in January 2022 as all songs that appear at number 1 in the Billboard™ Hot 100 chart in any week in the year 2022. In such cases, a set can for example be defined through the use of a central authority which provides an API or other service capable of providing up-to-date verification of set properties, such as whether a given NFT is a member of a set, the size of a set, a list of identifying information about the NFTs that are currently members of the set, and so on. Alternatively, a set may be defined with reference to a centralized or decentralized oracle. A collector's case NFT may, for instance, include reference to one or more oracles that must be consulted in order to make up-to-date determinations about which NFTs are members of the set, how big a set is, and so on. Or, an individual NFT such as a media or game item may be minted with reference to an oracle which can be consulted to determine whether it is at a given time a member of one or more sets.

The possibility for the definition of a set to change over time has implications for new use cases. For instance, a user who owns a number of NFTs may not own a complete set one day, but they may find themselves owning a complete set the next day, even though no new NFT purchases have been made. For instance, this enables the creation of a lottery-type game in which a player can purchase some number of NFTs representing different objects, such as numbers between 0 and 100, and each week an off-chain process selects a new set of five objects as the winning set for the week. Any player who at that time owns the whole set of five matching NFT object classes is a winner and can claim or automatically receive some prize. Another implication of changeable set definitions is that a user who owns a complete set one day may find that, the next day, they no longer own a complete set, even though they own the same NFTs as before. For instance, a user may own all number one Billboard™ Hot 100 songs as NFTs, owning the complete setup to a current date, but when a new song appears as number one the next day, the user must purchase an NFT of the new number one song in order to own the complete set again. Of course, such a phenomenon of losing completeness of a once-complete set is not always desirable, for instance when completing an NFT set is meant to feel like a positive achievement that cannot be reversed. Certain mechanisms for defining sets, for instance through the creation of a collector's case NFT, can therefore be structured to prevent such an occurrence if desired.

Another example use of sets that change over time involves another approach to gamification, in which people can be encouraged to collect NFTs that are potentially in the set in advance. For instance, a sports league may release a limited number of trading card NFTs for each player and announce the creation of an NFT set called "record holders 2022" which is defined to include the set of players who are currently the single-season record holders for a number of predetermined record types in the 2022 season so far. After any change in the set of record holders, the league wishes for any fan who owns the new complete set of record holders to receive a reward, such as a badge. The receipt of the badge could be triggered, for instance, by an off-chain oracle that publishes changes to the league records as games are played. This incentivizes fans to own as many trading cards for players likely to break records as they can.

In one embodiment, a central authority and a collector's case may be used in combination to verify set membership and provide evidence of set membership. For instance, some party wishes to define a set of already-minted NFTs. This may be a set of unique NFTs or a set of NFT classes. This party may or may not be the party who originally created these NFTs. This party may provide a service, such as a networked process that interacts with a wallet, that is capable of inspecting a number of NFTs within a wallet and making a determination of whether they constitute the desired set. If so, this party may then mint a collector's case NFT associated with this set, where this NFT may contain a reference to the specific and unique NFTs owned by this particular wallet, this NFT may be cryptographically signed or otherwise made identifiable as coming from this particular party, and this NFT may be deposited in the wallet. From this point on, the wallet owner has evidence that-so long as they own the specific NFTs identified by the collector's case-they own the complete set. Note that such an approach precludes the set definition being changed in the future by the third party.

In one realization, NFT items may be members of more than one set. For instance, a comics fan might collect NFTs corresponding to different characters. A "Loki"™ character NFT could belong to both the set of "Marvel™ villains" and the set of "Avengers™ characters" (among others). This supports additional gamification functionalities, e.g., where a purchaser or player may strategically choose which set(s) to complete given their current tokens. A number of methods for establishing and verifying set membership described above can be used for NFTs that are members of more than one set. For instance, information about multiple sets can be written into the metadata of an NFT, potentially in encrypted form, at the time it is created. Or, for instance, different collector's cases may be produced to hold different sets. Other methods for establishing and verifying set membership are possible as well. In any case, information defining the set, whether existing in an NFT's metadata, in a third-party service, in a collector's case, or elsewhere, may be accompanied by a specification of how to treat the case when multiple intersecting sets are present in a single wallet. For instance, consider a game company with collectible NFT tokens A, B, C, and D, where Set 1 is defined as A, B, and C, and where Set 2 is defined as B, C, and D. The company may wish to define Set 1 and Set 2 such that both sets are complete if the corresponding list of items appears in a single wallet, so that a person who owns A, B, C, and D in a single wallet is considered as having a complete Set 1 and a complete Set 2. Alternatively, the company may wish to specify that an item can only be considered as part of Set 1 or as part of Set 2 within a single user's wallet. A user who owns A, B, C, and D, for instance, may need to choose whether to claim a badge for completing Set 1, or to claim a badge for completing Set 2. Or, the user may purchase an additional copy of B and C so that they may own a complete Set 1 alongside a complete Set 2.

One aspect of the disclosed technology are tools created to aid the artist in creating a set of NFTs. In one example, the artist may have a single image, and upload it to a system. The system automatically pulls out the subject of the image from the background using visual processing techniques and then is able to change the background of the image to generate new images for a set. This could simply be returning a set of 16 images all with different solid color backgrounds or something more complicated that involves backgrounds that match or contrast the subject's image automatically using color theory. The backgrounds may also be provided from previous images of the subject. Various Artificial Intelligence techniques can be used to produce variations of an artist's uploaded image. For instance, aspects of a human subject's appearance such as facial expression or angle can be manipulated by mapping the subject to an embedding in a latent space of a generative adversarial network such as a StyleGAN then generating a new image from a modified embedding vector. Or, a GAN could be used to re-render a human subject's face as an anime character or cartoon face, with a variety of different colour palettes and hairstyles. Or, the season or time of day of a landscape image can be adjusted using techniques such as CycleGAN, and techniques such as CycleGAN and Style Transfer can render an image in the "style" of a famous artist such as Monet or Cezanne, with large variations arising from different choices of artist or more granular variations arising from local manipulations of a latent vector preceding generation in a single artist's style.

As another example, an artist creates an animation with 24 frames per second, and the disclosed technology mints each frame into its own NFT, with the ability to drop each frame at its own scheduled time, for instance one per day. Multiple editions of each daily NFT may be minted. These NFTs are minted to constitute a single set of NFT classes, where a complete set entails one NFT per frame. Similar to the puzzle technology mentioned above, a collector may desire to collect all frames of the animation so that he is rewarded with a bonus token, such as the whole animation within a single NFT, when all frames of the animation are collected. This also has implications on the wallet as the wallet will again collect all minted items from the set together in a folder structure, but this time also displaying a sense of time by auto-ordering what frames a collector has purchased. When all frames are purchased from a set, the collector will have the ability to play the video or animation file and own that token.

In one embodiment, items in a set may be computationally generated, and aspects of the generation of items in a set may be driven by actions or properties associated with previously generated set items. For example, a generative algorithm such as a GAN could automatically generate and mint the next item in a set as soon as the previous item is purchased. Or, for example, the properties of a newly generated item may be influenced by the selling prices of previous items. For instance, an evolutionary method such as a genetic algorithm could be employed such that newly generated items are likely to share characteristics with items that sold for higher prices. Or, a generative machine learning algorithm such as a GAN could be used such that newly generated items are generated using points in the GAN latent space that are closer to existing items with higher social media engagement and/or to existing items with higher sale prices, than to items with lower engagement and/or lower sale prices. Or, a reinforcement learning algorithm could dynamically adjust parameters used to generate new items based on properties such as engagement, sale price and rate, comments about items on social media, and so on, finding a balance between exploiting what is observed about demand for past NFTs and exploring new and untested generation parameters. Such approaches to automatically adjusting the creation of new works in response to such phenomena are described in U.S. patent application Ser. No. 17/810,085, titled "Distributed Ledgers with Ledger Entries Containing Redactable Payloads," filed Jun. 30, 2022, incorporated by reference in its entirety.

Another aspect of the disclosed technology is the ability to aid an artist in generating sets that a collector would want to purchase. For instance, a generative machine learning model such as a GAN could be trained by looking at the public ledger and using the items that sold successfully as training data for a generative machine learning algorithm that performs set art generation. Or, computer vision, music information retrieval, audio analysis, and other computational analysis techniques including those using machine learning, could analyse successfully sold work for patterns or characteristics of visual style, subject characteristics, colour palette, or other properties. Such patterns or characteristics could be used to parameterize an art generation or modification system, or they could be used to provide feedback to an artist about how a given artwork might be changed or which candidate artworks to include in a set, using methods described in U.S. patent application Ser. No. 17/810,085, titled "Distributed Ledgers with Ledger Entries Containing Redactable Payloads," filed Jun. 30, 2022, incorporated by reference in its entirety.

A number of other example use cases are facilitated by the designation of sets of NFTs. This includes applying machine learning systems to NFT analysis and/or generation in ways that are informed by NFT set membership. For example, a machine learning system may be constructed such that its training data is selected from among one or more sets, for instance a new computer vision system may be trained to identify work by a particular artist using training examples constituting NFTs that are members of a set of works by that artist. Here, the presence of an NFT in a set acts as a label for that NFT in the training data, removing the need for manual curation of the training data or error-prone methods such as web-scraping to assemble a training dataset. One such form of a computer vision system can then be applied to identify when existing works by this artist appear in other works, for instance when a fake copy of this work is put up for sale on an NFT marketplace, or when a copy of a work by the artist appears on someone's wall in the background of a vlog or film. Another such form of a computer vision system can be applied to search for visually similar works by different artists.

As another example use case, an artist may choose members of a set to serve as training examples for a generative algorithm. For instance, a music creator may use all songs that appear in the official set of Billboard™ Hot 100 songs as inputs to a system that uses a machine learning algorithm such as a recursive neural network or transformer that attempts to generate new melodies similar to the melodies in these songs.

As another example, items that may be useful in training data for machine learning could intentionally be released as NFTs which are members of one or more sets, as a way to both simplify and monetize the distribution of machine learning training data. For instance, a company may own an image database of outdoor photos which it has internally curated and labeled according to the objects appearing in the photos. It may release each photo in this database as an NFT, where each photo is a member of one or more sets, each set corresponding to a type of object that appears in a photo, such as "stop sign", "crosswalk", "dog", "tree", etc. Third parties may wish to purchase certain items from this database according to their needs, for instance a self-driving car startup could purchase photos containing stop signs, crosswalks, and other object categories relevant to driving, whereas a games company may wish to purchase images of trees and plants. Having individual photo NFTs designated as members of such sets can streamline a company's process of purchasing only the relevant photos. Further, the set membership can be useful in downstream machine-learning applications within each company. For instance, the self-driving car company needs to merely use the NFT set(s) associated with an image to determine the label(s) associated with that image for training a computer vision classifier or object detector. And the games company may train one generative image algorithm such as a GAN on the images in the "tree" set to generate new tree images to insert into a game, and they may train another GAN on images in the "shrub" set to generate new shrub images, and so on.

FIGURES

Figure 27:
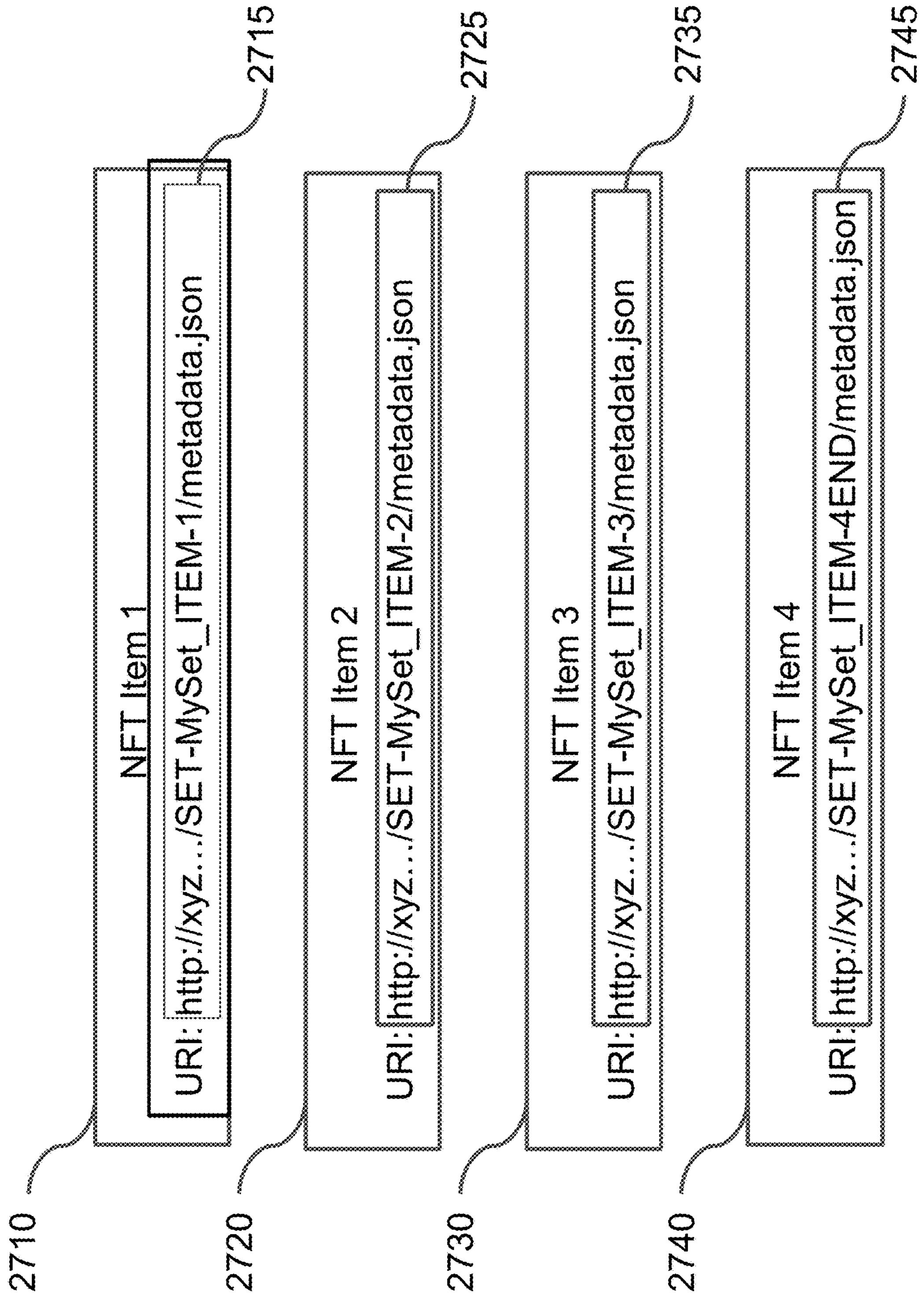
FIG. 27 illustrates a set of unique NFTs in accordance with various embodiments of the invention.

FIG. 27 illustrates a set of 4 unique NFTs 2710, 2720, 2730, and 2740 in which set membership is assigned through an encoding within the URI substrings 2715, 2725, 2735, 2745 associated with each NFT. Specifically, the substrings each encode (i) the set name, in this case "MySet"; (ii) the number of the item in the set; in this case 1, 2, 3, and 4. The fourth NFT substring 2745 also specifies that this is the last item in the set. This approach may be used if the ultimate size of the set is not known at the time of creating the first NFT in the set.

Figure 28:
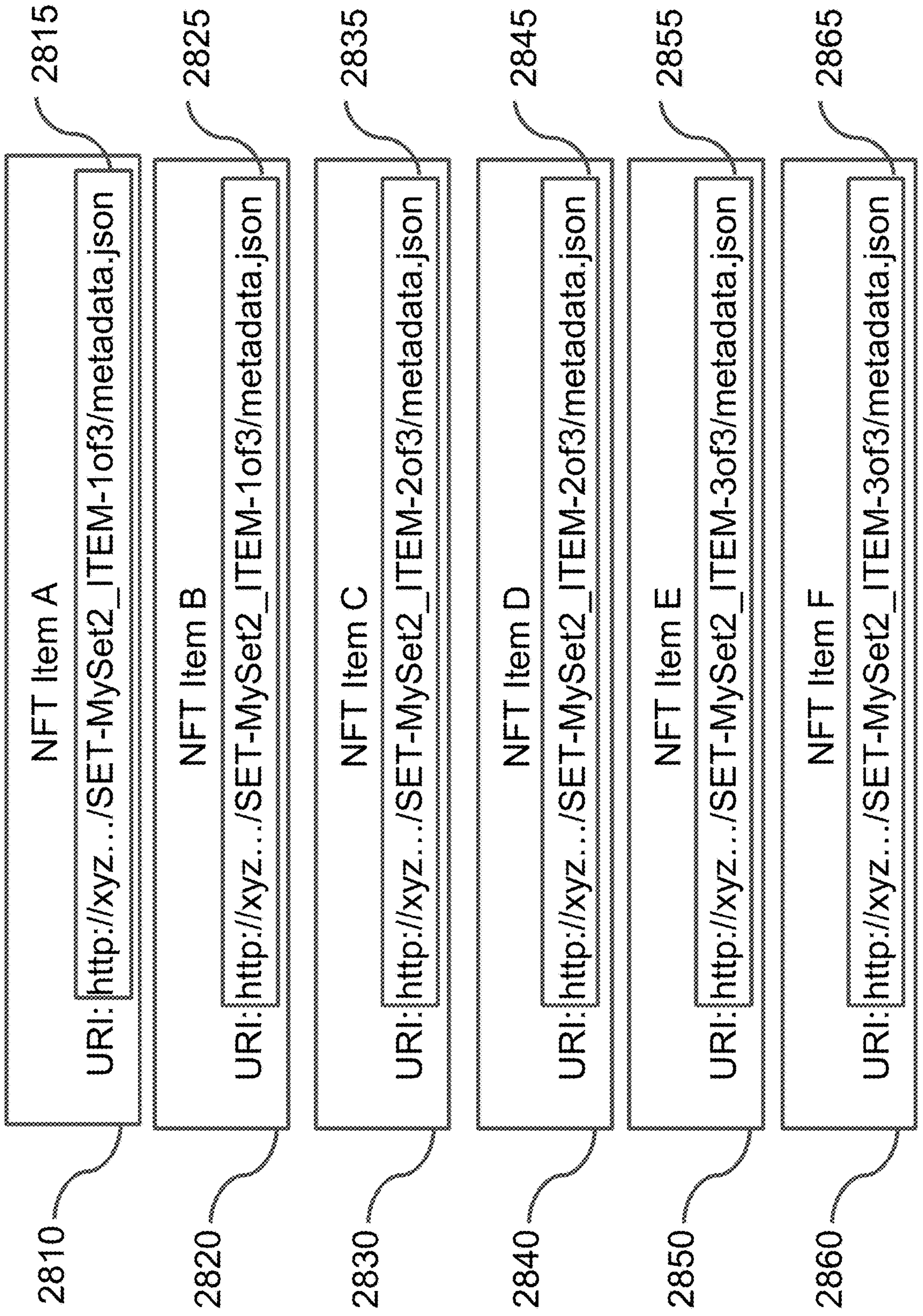
FIG. 28 illustrates a collection of unique NFTs in accordance with numerous embodiments of the invention.

FIG. 28 illustrates a collection of six NFTs 2810, 2820, 2830, 2840, 2850, 2860, each of which is a member of a set of NFT classes in which set membership is assigned through an encoding within the URI substrings associated with each NFT. Specifically, the URIs 2815, 2825, 2835, 2845, 2855, 2865 each encode (i) the set name, in this case "MySet2"; (ii) the number of the item in the set; in this case, 1, 2, and 3; (iii) the size of the set—in this case, 3. This approach may be used if the ultimate size of the set is known at the time of creating the first NFT in the set. Here, either one of two minted NFTs A 2810 or B 2820 may act as item 1 in the set. For instance, these might be two "editions" of the same artwork. Similarly, either one of two minted NFTS C 2830 or D 2840 may act as item 2, and either one of two minted NFTs E 2850 or F 2860 may act as item 3. A wallet holding items A, C, and F may for instance be considered as holding the complete set "MySet2", and another wallet holding items B, D, and E may simultaneously be considered as also holding the complete set "MySet2", as each wallet holds one of item 1, one item 2, and one item 3 from the set.

Figure 29:
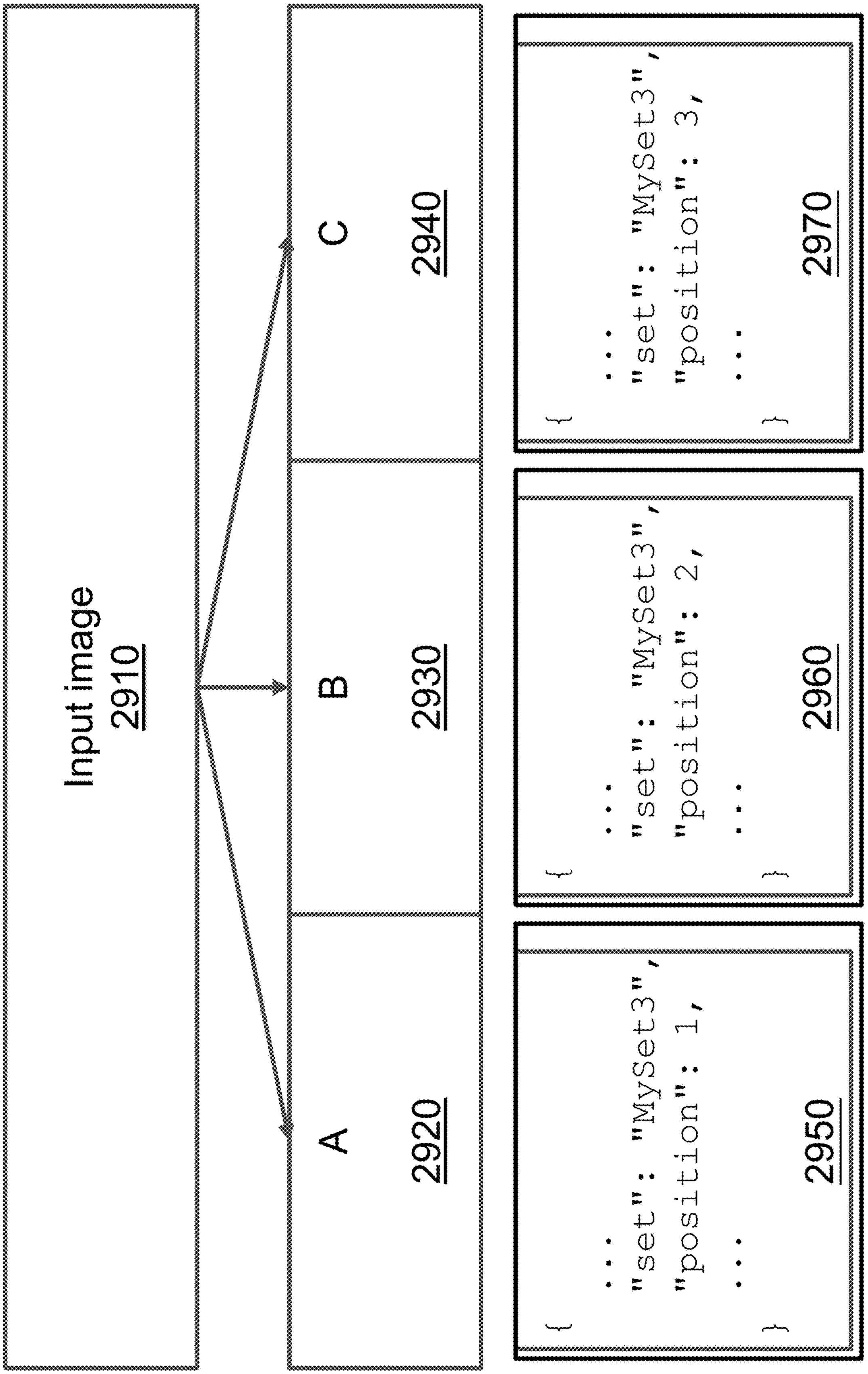
FIGS. 29-30 conceptually illustrate the assignment of NFTs to sets in accordance with some embodiments of the invention.

FIG. 29 illustrates how the method can be used to take 3 NFTs from an initial input image and assign them to a set. FIG. 29A illustrates the result of applying the method, wherein the input image 2910 is broken horizontally into three adjacent segments. NFTs A 2920, B 2930, and C 2940 are minted to correspond to each of these segments. Here, a portion of the metadata of A 2950 refers to the set name, in this case "MySet3," as well as the position of A in the set, in this case 1. Likewise, a portion of the metadata of B 2960 and a portion of the metadata of C 2970 refer to the set name and their respective positions in the set.

Figure 30:
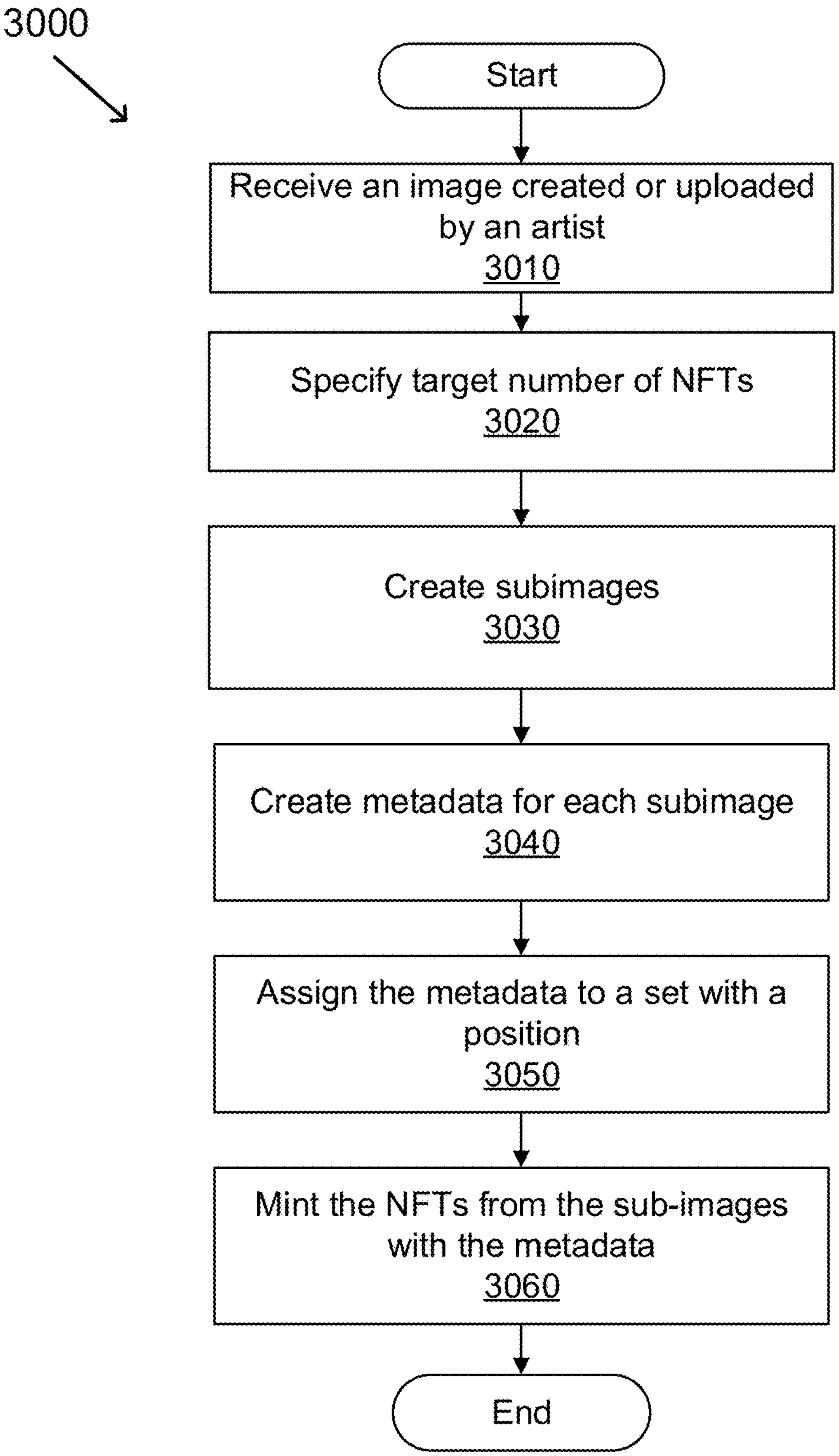

FIG. 30 provides a diagram illustrating the steps applied to create the NFTs A 2920, B 2930, and C 2940 from the input image 2910 and assign them to a set. First, process 3000 receives (3010) an input image created or uploaded by an artist through a receiving node. Process 3000 specifies (3020) the number of NFTs to create from the image. Then, the process 3000 creates (3030), from the image, a number of sub-images, from the number specified. Then, for each sub-image, process 3000 creates (3040) an appropriate metadata file, in this example creating three files containing the portions shown in 2950, 2960, 2970. Then, process 3000 assigns (3050) the metadata to a set with a position. Process 3000 mints (3060) each sub-image into an NFT referencing the corresponding metadata file. A person skilled in the art will note that, where the NFT allows metadata to be changed after minting, step 3060 could precede step 3050 or 3040.

Figure 31:
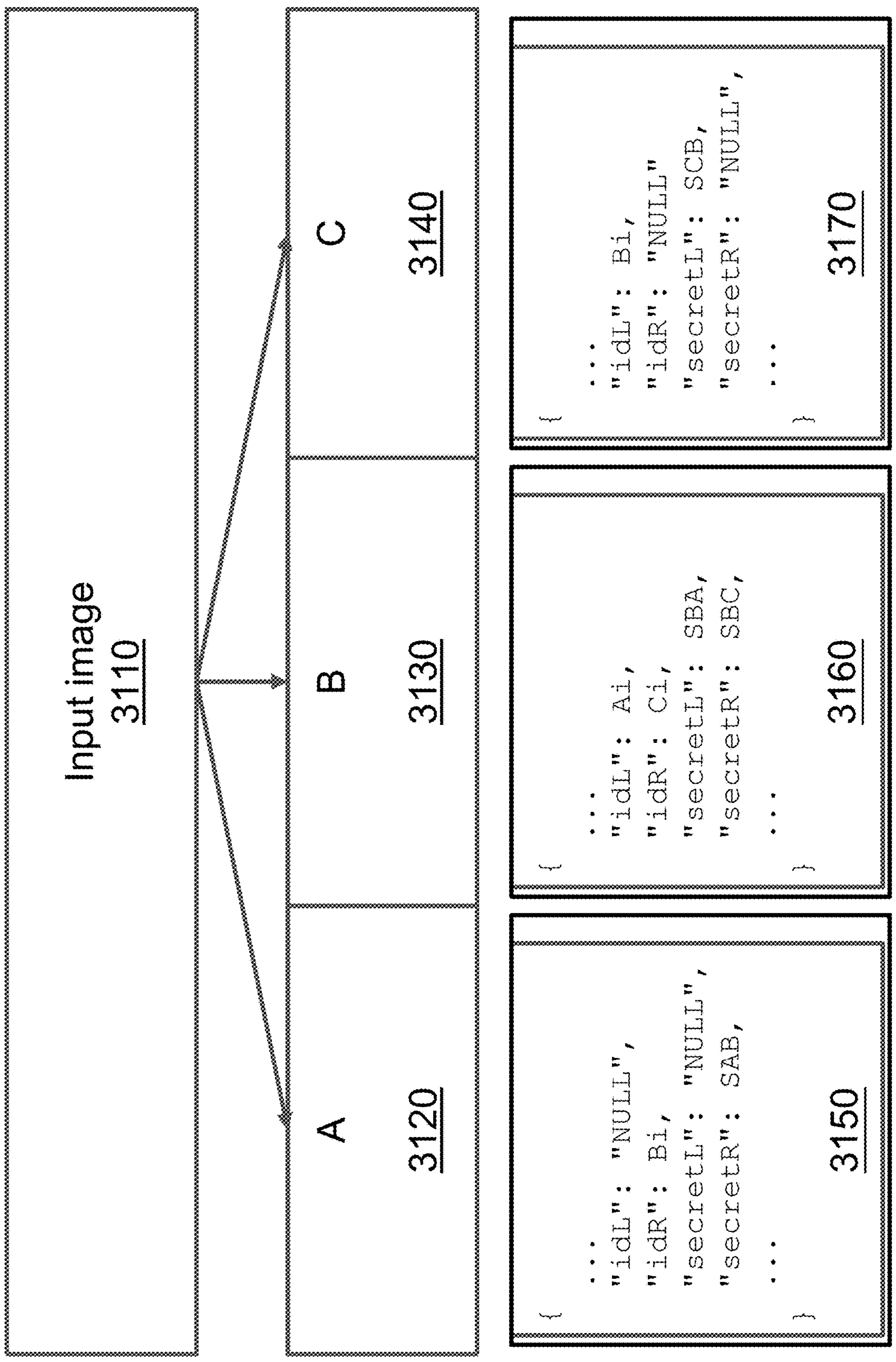
FIG. 31 illustrates the use of a set of NFTs to derive unique content in accordance with various embodiments of the invention.

FIG. 31 shows how an image 3110 may be broken into a set of 3 NFTs, each containing a portion of the overall image 2910 as in FIG. 29A, but where set assignment is encoded in each NFT's metadata by specifying encrypted matches to its neighbor(s). Here, an identifier Ai, Bi, and Ci is computed for each of the constituent NFTs A 3120, B 3130, and C 3140, through for instance concatenating the contract address with the token identifier. Each NFT stores in its metadata the identifier for the NFT to its left and to its right. For instance, the relevant portion of A's metadata 3150 stores Bi as the identifier for the NFT to its right, and it stores a "NULL" value as the identifier for the NFT to its left, since it is the leftmost NFT. Likewise, the relevant portion of B's metadata 3160 stores Ai as the identifier for the NFT to its left and it stores Ci as the identifier for the NFT to its right, and the relevant portion of C's metadata 3170 stores Bi as the identifier for the NFT to its left and "NULL" as the identifier for the NFT to its right. Further, each NFT's relevant portion of metadata stores an encrypted secret "secretL" corresponding to the NFT to its left and an encrypted secret "secretR" corresponding to the NFT to its right, using the process depicted in FIG. 31. A node may determine whether two NFTs are in fact neighbors using the process depicted in FIG. 32.

Figure 32A:
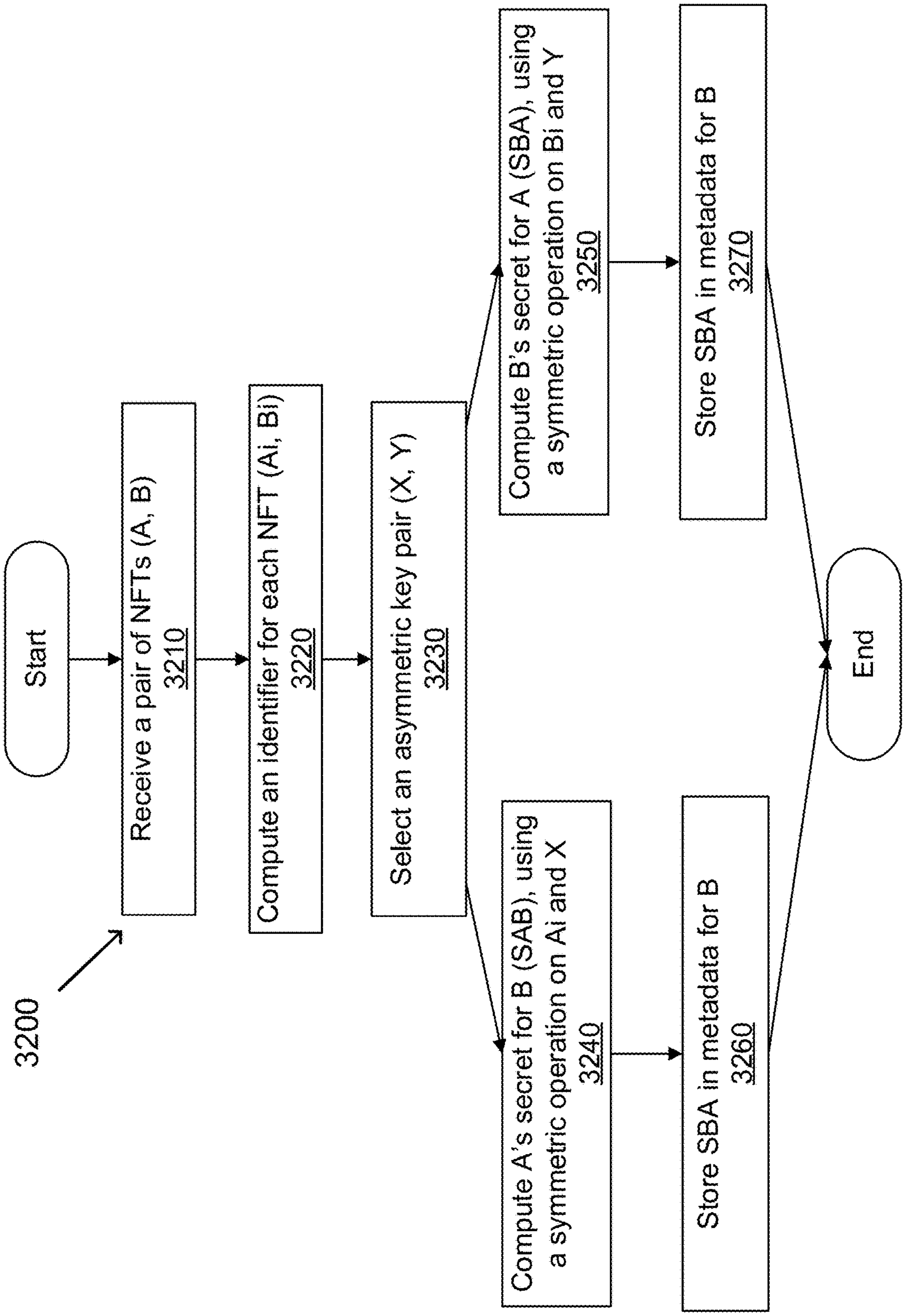
FIGS. 32A-32B conceptually illustrate the implementation of encrypted secrets alongside groups of NFTs in accordance with a number of embodiments of the invention.
Figure 32B:
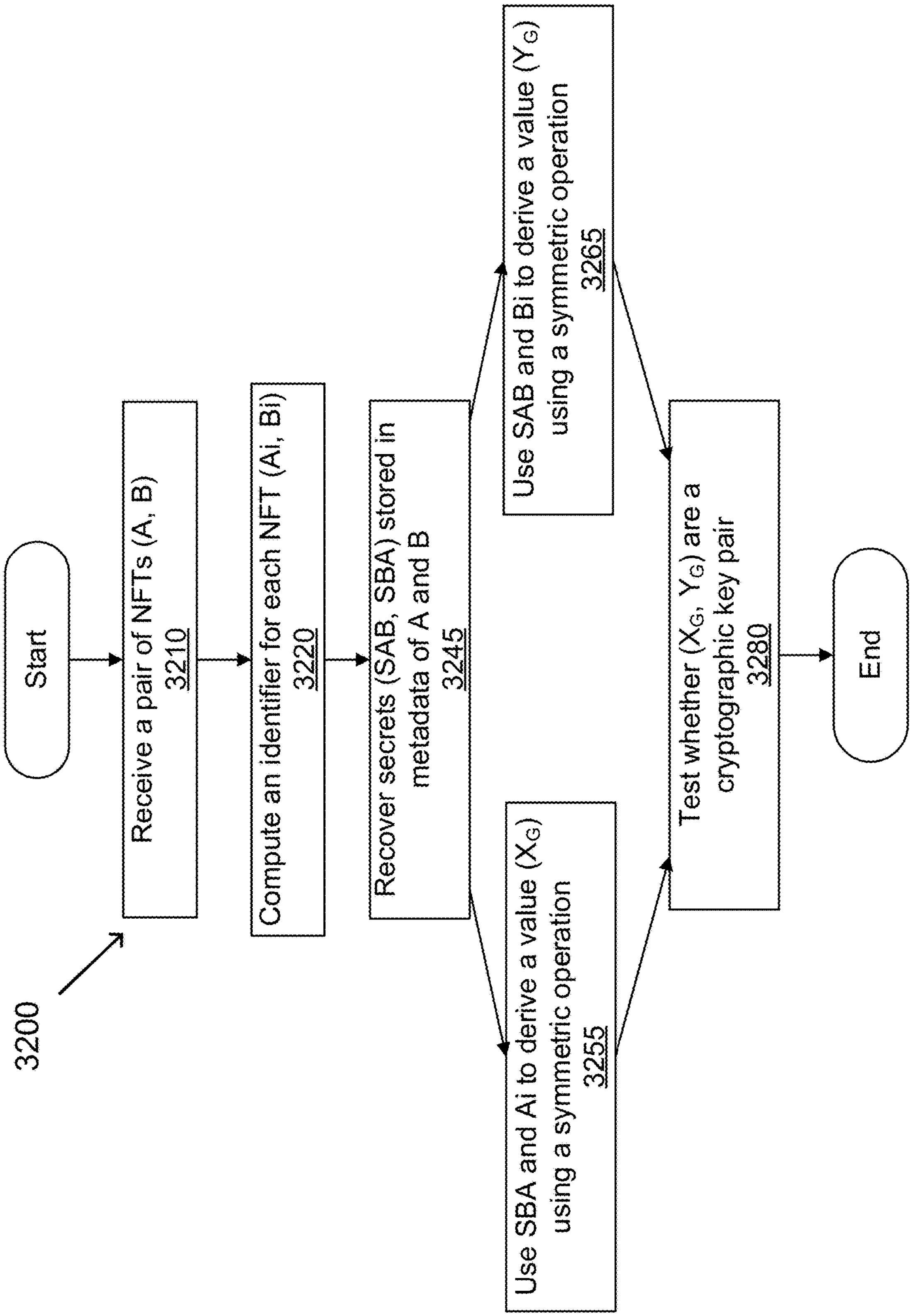

FIGS. 32A-32B shows how a pair of encrypted secrets may be computed for a pair of NFTs. Process 3200 receives (3210) NFTs A and B. These NFTs may be adjacent NFTs in an ordered set, and the secret may be used to associate each NFT in a set with its adjacent neighbors, producing the metadata shown for each NFT in FIG. 29B. Alternatively, the pair of NFTs may consist of an item belonging to a set and a collector's case associated with that set. Process 3200 computes (3220) an identifier for each NFT. First, an identifier is computed for A, for instance by concatenating the contract address with the token identifier, yielding Ai. An identifier Bi is likewise computed for B. Process 3200 selects (3230) or computes an asymmetric key pair X, Y. Process 3200 generates (3250) B's secret for A, SBA, using a symmetric operation on Ai and X, such as Bi XOR X. Process 3200 stores (3270) the secret in the metadata of B. Likewise, Process 3200 computes (3240) A's secret for B SAB using a symmetric operation on Bi and Y. Process 3200 stores (3260) the secret in the metadata of A. Note that the metadata of A and B may live off-chain at URIs referenced by the A and B NFTs.

FIG. 32B shows a diagram of the process for checking that two NFTs A and B are employing a pair of encrypted secrets created using the method of FIG. 32B. Process 3200 receives (3210) NFTs A and B. These NFTs may be adjacent NFTs in an ordered set, and the secret may be used to associate each NFT in a set with its adjacent neighbors, producing the metadata. Alternatively, the pair of NFTs may consist of an item belonging to a set and a collector's case associated with that set. Process 3200 computes (3220) an identifier for each NFT.

Process 3200 recovers (3245) the secrets (SAB, SBA) stored in the metadata of A and B. Process 3200 uses (3265) Bi and the secret SAB stored within the metadata of A to derive a value YG, using a symmetric operation, for instance SAB XOR Bi. Process 3200 also uses (3255) Ai and the secret SBA 3211 stored in the metadata of B to derive a value $X_G$, using a symmetric operation, for instance, SBA XOR Ai. Finally, process 3200 tests (3280) whether $X_G$ and $Y_G$ form a cryptographic key pair, for instance by encrypting an arbitrary string S with $X_G$, decrypting the result with YG, and verifying that the result is equal to S.

Figure 33:
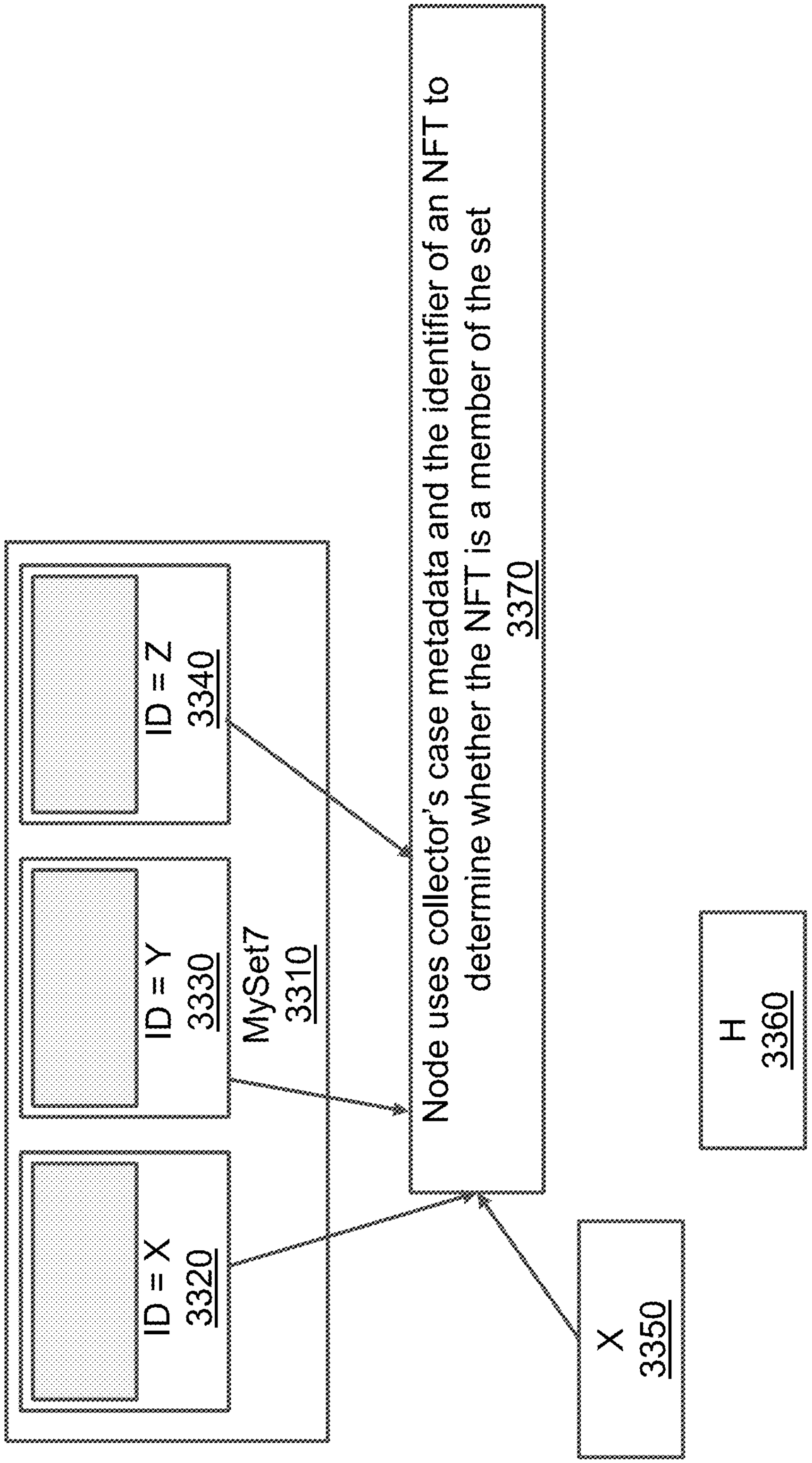
FIG. 33-34 illustrates the use of a collectors case with NFT sets in accordance with certain embodiments of the invention.

FIG. 33 shows a representation of a simple collector's case NFT 3310 for a set called "MySet7" of size 3. Conceptually, this collector's case can be thought of as having three empty "slots" 3320 3330 3340, into which only matching NFTs will "fit." In this embodiment, the assignment of NFTs to the set is performed by inserting into the metadata of the collector's case, which may live at an off-chain URI referenced by the NFT, a list of 3 identifiers, here shown as X Y and Z, which may correspond for instance to the concatenated contract address and token identifier for each of the 3 matching NFTs. A node can test 3370 whether a given NFT is a member of the set by computing whether the identifier of the NFT is present in the collector case's list of identifiers. Here, for instance, the node would determine that an NFT 3350 whose identifier is X is a member of the set, and could conceptually be used to "fill" the corresponding "slot" 3320 in the collector's case. A node would also determine however that NFT 3360 whose identifier is H is not a member of the set and cannot fill any slot. A node can likewise test whether a collection of NFTs, for instance the collection owned by the wallet, includes a complete set, by checking whether each NFT in the collector case's list is present in the collection. Note that the collector's case metadata, which includes the collector's case name and the list of identifiers amongst potentially other information, may live off-chain at a URI referenced by the NFT itself.

Figure 34:
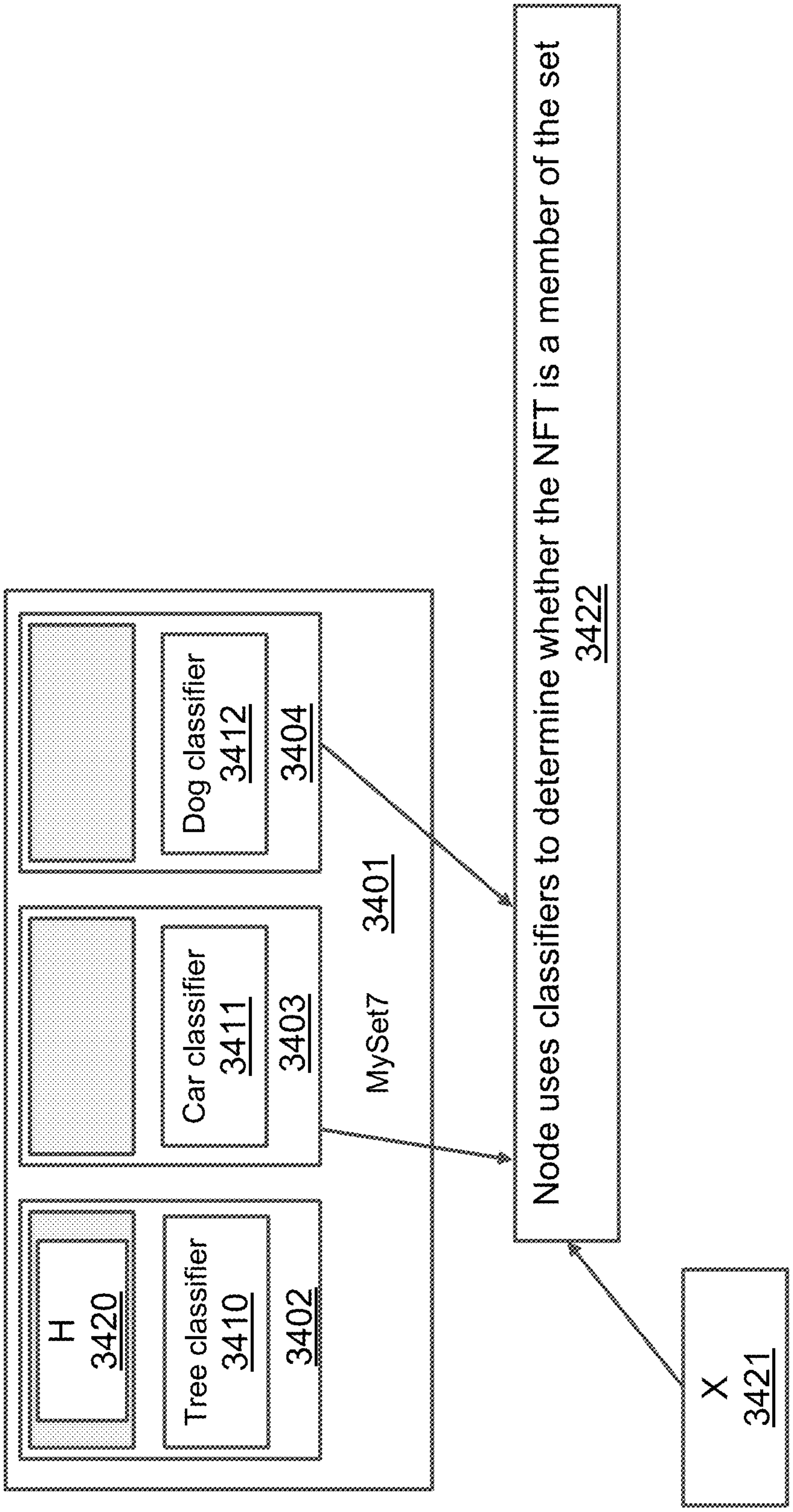

FIG. 34 shows a representation of a collector's case NFT 3401 which contains references to three machine learning classifiers 3410, 3411, 3412, each one used to determine whether an NFT is a member of the set associated with the collector's case. In this example, the collector's case requires three NFTs, one each of a tree, car, and dog, in order for the set to be considered complete. Conceptually, this collector's case can be thought of as having three empty "slots" 3402 3403 3404, into which only one "tree", one "car", and one "dog" will fit. In this embodiment, the assignment of NFTs to the set is performed by inserting into the metadata of the collector's case, which may live at an off-chain URI referenced by the NFT, reference to three classifiers, here shown as the tree classifier 3410, the car classifier 3411, and the dog classifier 3412. These classifiers may be represented as executables, as code that can be run, or as some other symbolic or binary representation that enables the classifier to take as input an NFT and/or data such as media associated with that NFT and to produce as output a classification, potentially a binary decision or a real value which can be thresholded, of whether the input NFT is a member of the corresponding class. A node can test 3422 whether a given NFT is a member of the set by applying the classifiers associated with the collectors case, or by employing another service to apply the classifiers, using the given NFT and/or its associated data as an input to the classifier and using the classifier output to determine membership. Here, for instance, NFT H 3420 has already been determined to be a member of the set because it is a "tree" according to the tree classifier 3410. Conceptually, the "slot" 3420 corresponding to trees is now full. To determine 3422 whether a new NFT X 3421 is a member of the set, the node can use the remaining classifiers 3411 and 3412. In this embodiment, to determine whether a collection of NFTs, such as the set of NFTs in a wallet, includes a complete set, each of the classifiers is applied to items in the collection, and if and only if it is the case that one NFT is classified as a tree, another NFT is classified as a car, and another NFT is classified as a dog, then the collection will be considered to contain a complete set associated with this collector's case.

Figure 35:
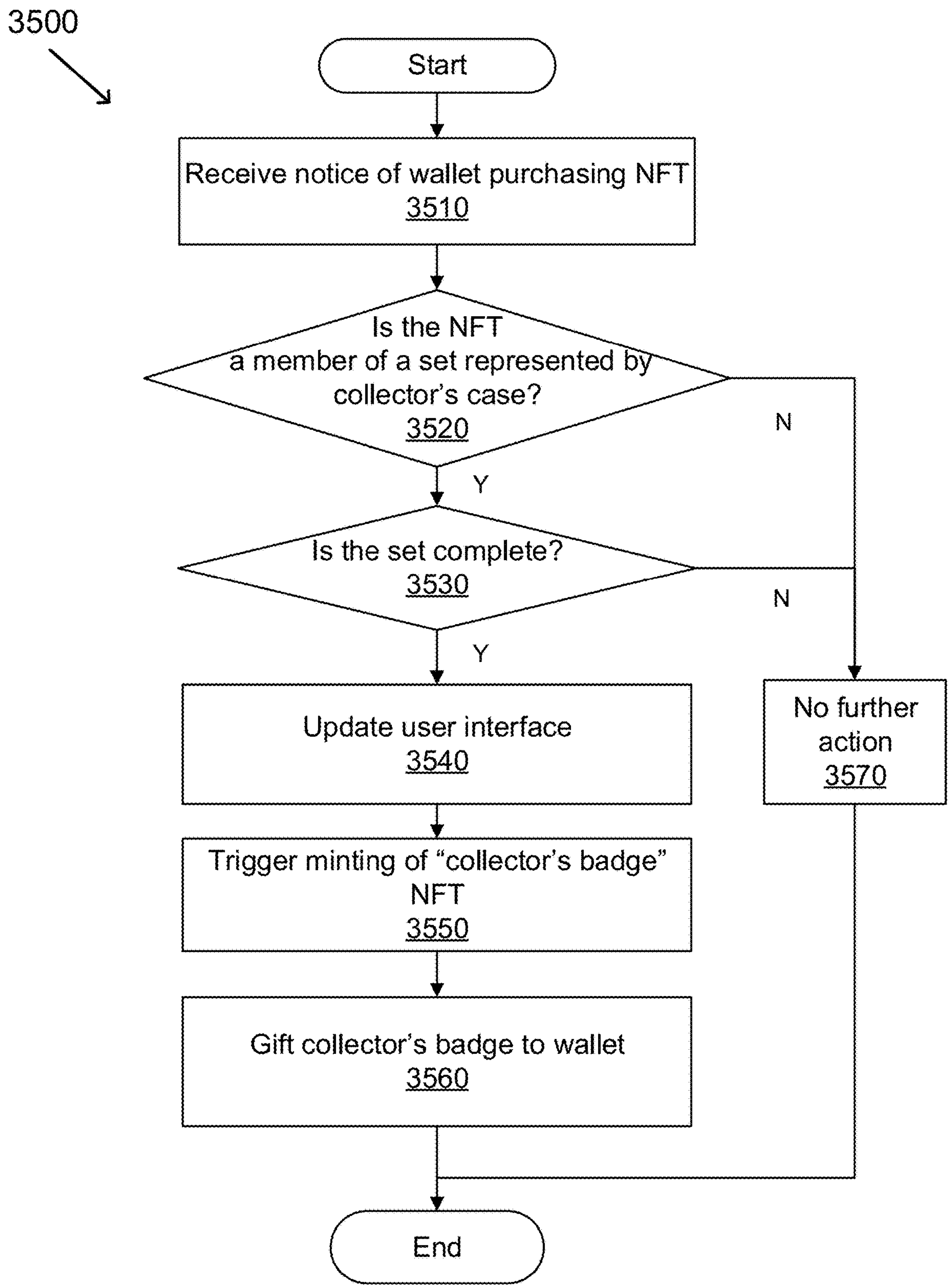
FIG. 35 conceptually illustrates a process followed in response to the completion of NFT sets in accordance with many embodiments of the invention.

FIG. 35 shows a flowchart of actions whereby process 3500 receives (3510) notice that a wallet purchases a new NFT; a collector's case within that wallet is consulted to determine whether the NFT is a member of the set (3520), and if so, whether that set is now complete (3530). If the set is not complete, process 3500 takes (3570) no further action. Then, if the set is now made complete, process 3500 updates (3540) a user to alert the user to this change. Process 3500, through an API or service referenced by the collector's case, triggers (3550) the minting of a new "collector's badge" NFT, and process 3500 gifts (3560) this NFT to the wallet.

Systems and techniques directed towards establishing NFT groups, in accordance with a number of embodiments of the invention, are not limited to use within NFT platforms. Accordingly, it should be appreciated that applications described herein can be implemented outside the context of an NFT platform network architecture and in contexts unrelated to abuse protection for fungible tokens and/or NFTs. Moreover, any of the systems and methods described herein with reference to FIGS. 27-35 can be utilized within any of the NFT platforms described above.

2. Second Factor Authentication

One aspect of the disclosed technology is a method allowing a user to set a policy to govern the balance between account security and user convenience. One way in which this balance can be expressed is in terms of trade-offs of how rapidly a user will be given access to an account from which he or she is locked out. Another way can be expressed in terms to what triggers risk assessments that cause a longer lockout, and ways in which a user can gain partial access to an account within a short period of time, but only in a manner that allows specified types of transactions to take place before an assurance of non-anomalous behavior is determined.

At the heart of the problem is the immediate nature of account access for a user that uses second-factor authentication (2FA) to access an account. Examples of 2FA solutions include security questions, SMS-based authentication including the use of codes sent by SMS to reset passwords, and token-based authentication methods, such as Google™ Authenticator™. All of these can be abused. For example, an attacker can pose as a representative of a service provider, contact a user, and, under an excuse of some account irregularity, request 2FA credentials. If a user agrees, the attacker may, for example, initiate the transmission of an SMS-based reset code from the real service provider, on behalf of the victim and for the purposes of password reset. The attacker may tell the user that to block abuse, he needs to verify that he is the owner by receiving and providing the code that is transmitted. As soon as the user does this, the attacker has account access. Another abuse method is sim-jacking. Other related abuses include email account take-over attacks, as described in the article titled "The Rising Threat of Launchpad Attacks" by Markus Jakobsson, published at IEEE Security & Privacy 2019, Vol 17, Issue 5. A person of skill in the art will recognize that there are many related types of attacks aiming at gaining access to user accounts, and that many of these can be applied to access accounts holding cryptocurrencies and NFTs.

In a traditional SMS-based 2FA reset, a code is transmitted to a user's registered phone number, and if the same code is input in an interface, then it is assumed that the person inputting the code is the legitimate owner of the account. This is not always the case, as the explanations above make clear.

One aspect of addressing this problem is to enable account holders, or more generally, users of resources, to specify a time period governing how rapidly access is given to a user accessing the account/resource using 2FA, such as those approaches listed above, or other 2FA methods. That is, if this time period is set to 48 h, that means that anybody requesting access to the user account of the user having specified the 48 h policy will have to wait for 48 h before being given access to the account, after having provided a valid 2FA response. During this time period, a user with access to the account, such as based on a traditional password or using biometrics, can cause the scheduled 2FA-based account access to be revoked. During the specified time period, the system will notify the account holder, e.g., using SMS and email messages, that there is a pending 2FA-based access request that has been cleared, i.e., the 2FA credential has been verified to be valid. Whereas one user may set a 48 h policy, another may set a 72 h policy, providing additional time to detect potential abuse attempts and have them blocked. Yet another user or service provider may set a policy based on an estimation of the financial value of the transaction being requested, for example, a 24 h policy may be set for transactions with a value less than $1000 and a 72 h policy may be enforced for transactions over $1000. Another policy may set the time period to be proportional to the value of the transaction. In yet another policy, a user may mark specific assets in their wallet as having particular sentimental value to them beyond any specific currency value that can be attributed to the assets, thereby ensuring that stricter constraints are imposed on transactions involving said assets. A user may block an abusive access attempt by clicking on a link provided in the notification of the pending access, for example, where the link is personalized to be specific to a given notification of a successful pending 2FA-based access attempt. This applies not only to the blocking of SMS-based 2FA attempts, but to any type of pending 2FA access request.

Another aspect of the disclosed technology is a method to modify a time period governing the wait until a successful 2FA request is granted based on environmental aspects. One environmental aspect is whether the device used to initiate a 2FA-based access request is recognized as belonging to the specified user, or having previously been used by this user. This may be determined, for example, using the presence of previously set HTML cookies, the presence of previously set cache cookies, the presence of previously recorded User Agent (UA) information, which can be used to profile a device by recognizing constellations of configuration data, including aspects such as operating system version, character sets installed, time zone, etc. A combination of HTML cookies, cache cookies and UA data can be used to determine a risk score, where the more previously identified aspects are present, the lower the risk score. Based on the risk score, and optionally at least one user-specified rule, the system may determine whether to modify the period of lockout. For example, for a high-risk score, the lockout period may be doubled, meaning that a user-set lockout period of 48 hours would be replaced by a 96-hour lockout period, during which a user that has successfully authenticated using 2FA will be unable to access the account/resource.

In one embodiment, the system stores at least one credential associated with a given resource or account. For example, this may be a salted and hashed password, or a public key associated with a given digital signature that is tied to a biometric token. Biometric tokens were disclosed in U.S. patent application Ser. No. 17/933,659, titled "Systems and Methods for Token Content Unlocking, Biometric Authentication using Privacy-Protecting Tokens, Ownership-Based Limitations of Content Access, Policy-Based Time Capsule Technology, and Content Lock Mechanisms," filed Sep. 20, 2022, incorporated by reference in its entirety. When the system receives a request to access the same account using a 2FA, e.g., due to a loss of the password or corruption of the biometric authentication capability, the system initiates a 2FA access. This may, for example, use a token-based authentication method, such as Google™ Authenticator™, or it may use an SMS-based 2FA method. If this is successful, the system allows the creation of a second stored credential. The user registering this credential, however, will not be granted immediate access to the account after having set up the credential, but will be notified that there is a waiting period. The system will then notify the account holder, e.g., using SMS and email, that a successful 2FA access attempt has been registered and a new credential has been established. The user will also be notified of the time period during which he or she can block this new credential from being allowed, e.g., by clicking on a link, responding to the message, or calling a representative and providing an account number or other identifier associated with the notification. If the user performs such a blocking action, the newly created stored credential will be blocked or erased. Otherwise, the newly stored credential will be activated after the specified time associated with the policy. Multiple notifications may be sent to the user during this time period, and may also be sent to one or more pre-specified communication accounts associated with friends or colleagues of the user, explaining the situation and enabling such users to block the newly created credential, e.g., if a threshold number of these users respond to the notification.

Messages sent to users may be designed to reduce risks of misunderstandings and abuse. An example of this is disclosed in the 2017 publication titled "Mind your SMSes: Mitigating social engineering in second-factor authentication" by Hossein Siadati, Toan Nguyen, Payas Gupta, Markus Jakobsson, and Nasir Memon. This includes messages with 2FA codes, as well as messages alerting users to risks. Both types of messages may be selected and tested on users to determine that they are associated with low risk, in accordance with the methods described in the publication.

The disclosed technology can be used to control access to a resource maintained by a third-party service provider, such as a DeFi service provider. It can also be used to control access to a wallet of a user. For example, the wallet may be accessed using a biometric authentication or a password credential, or a combination of such; when a user forgets his or her password, he or she may then use 2FA as a fallback mechanism. In some instances, the authentication mechanism that is available may be rather low security, such as what is provided by traditional security questions. Security questions are significantly weaker than typical passwords, which are typically weaker than traditional biometric authentication mechanisms, such as fingerprint-based authentication, face geometry-based authentication, etc. Therefore, the security questions are vastly less secure than a combination of authentication mechanisms that comprise both password-based authentication and biometric authentication. However, using the disclosed technology, the use of security questions can be made sufficiently secure, e.g., by setting policies that are appropriate for a desired level of security. For example, a third-party service that operates on behalf of a user of a wallet may have a key that enables access to the wallet, but will only initiate such access under certain circumstances, such as a user correctly answering security questions, without a large number of failed attempts, and the absence of a refusal by a user associated with one or more communication channels (such as SMS or email to indicated numbers and accounts) for a specified amount of time. If there is no refusal within the specified time period, the third-party service provider may transmit one or more access keys to the party making the request involving the provision of the answer to the security questions. The keys may provide access to one or more elements of the wallet, and may be specific to certain types of access, e.g., as disclosed in U.S. patent application Ser. No. 18/155,662, titled "Crypto Wallet Configuration Data Retrieval," filed Jan. 17, 2023, incorporated by reference in its entirety. Access limitations can be made based on a threat or the absence thereof, such as what is disclosed in U.S. Provisional Patent Application No. 63/322,051, titled "Vulnerable Wallet Resource Control," filed Mar. 21, 2022, incorporated by reference in its entirety. Other communication channels can be used, such as push notifications to an application or social media messaging. One type of application that can receive push notifications from a service provider is a wallet.

A wallet can be protected against unauthorized access in a similar manner. While wallets may not enable 2FA in some settings, they may still need to limit accesses in some settings, such as if there is an anomalous number of failed access attempts, or if there is an access attempt in a high-risk situation, e.g., one where there is an indication of duress. In such example scenarios, the wallet may wish to constrain access, e.g., by automatically reducing access rights for a logged-in user, by blocking access for a user to log in, or other limiting action, followed by a verification with a registered user account whether to allow the lifting of access limitations should be allowed. This can be performed in a similar manner as described above, but with one significant difference: to avoid that an attacker blocks communication between the wallet and the outside world in order to have the restrictions lifted after the blocked period of time, a positive response may be required in order to lift limitations. Still, such limitations may not be lifted until the end of the delay-period, to avoid an attacker managing to steal a device and respond positively to gain access. If any negative response is received by the system within the delay period, then the access is blocked for the requesting device. If no negative response is received, but at least one positive response is received, potentially received via a proxy that collects all responses and transmits a message to the wallet, then access is allowed. If there is no response at all, the wallet may take another action, such as enabling limited access after the end of the time period, allowing access with a heightened level of security, e.g., requiring additional security measures, etc. The proxy may be a service provider that manages access to the wallet in cases where there is a threat, and where the user has set up service with the proxy ahead of time. The proxy may require that a user comes into a physical location to prove his or her identity, and that he or she is not under duress, before it enables access.

In one embodiment, a user setting up a wallet, an external account, or any type of resource to which the user may be requested to authenticate, the user may select a profile from a collection of two or more profiles identifying the sophistication of the user, such as "I am a high-risk user, as I have previously lost money to scams, or have seen a computer of mine get infected by a virus at least once", to "I am a security professional and need very limited protection". This may be used to select at least one security profile governing the policies used to protect the wallet, external account, or other resource.

A wallet, an external account, or other resource may also modify the protection based on changes in protected contents, such as the account balance, the value of NFTs, or the assessed sensitivity of the data. A user may be notified of these changes and allowed to override protection modifications.

A wallet, an external account, or other resource may further modify the protection based on changes in assessed risk. For example, some attackers place very small amounts of crypto currency in the accounts of strangers (so-called "dusting") with the hope that the stranger may click on a link that enables the attacker to determine the IP address of the stranger (who is the potential victim of the attacker), along with the associated wallet address, any public keys associated with ownership, and any information indicating the type of device or operating system the potential victim uses. This enables the attacker to identify high-value targets of attack, along with information related to their IP address and potential device-based vulnerabilities. Doing so helps the attacker mount targeted attacks. However, a wallet can identify that dusting is likely to have taken place. An amount that is obvious to correspond to dusting can be hidden from the user, or otherwise blocked in terms of the user making interactive queries. A low or anomalous transfer may also trigger a high-risk setting in which any unusual access attempts cause, at least if successful, a time-based blocking.

Other malicious uses for "dusting" include using the dust to forensically link different accounts as belonging to the same wallet. A small amount of "dust" is deposited into a first account, the owner of which has been publicly identified, for example, by providing the account number to a merchant or placing it on a website as a "tip jar" address. Subsequently a wallet may pull the "dust" into a transaction made by a different account in the same wallet, thereby allowing the attacker to determine that the two accounts are owned by the same entity. If the second account has a high balance this puts the wallet owner at risk of the attacker launching a phishing attack against the wallet owner, who has now been identified as a wealthy target. In an embodiment of the present disclosure, the wallet may flag the small amount of dust, and may prevent the dust from being spent in any transaction that involves an address other than the dusted address, thereby ensuring the dusted account is never linked to another account.

In one embodiment, a third-party resource, such as an NFT marketplace, may have user accounts that are protected using passwords and 2FA. This is an example of the type of resource that may use the disclosed technology to protect its users. Such a resource may also enable access to accounts using APIs, where wallets associated with accounts can access the resource, e.g., by sending a request digitally signed using the private key associated with the wallet, and verified by the service provider using the matching public key. If somebody attempts to access the resource of a given user in a manner that is anomalous or indicative of risk, the service provider may notify the registered communication accounts associated with the account being accessed in the manner that is determined to be associated with high risk, with a notification that access will be granted to this party within a specified time period, such as 48 h, unless a denial is transmitted by the user receiving the notification. An example high-risk indicator is the successful use of 2FA to access an account, followed by a request to set a new password. Another example of a high-risk indicator is an access from an anomalous location, an access that appears to be scripted whereas the registered user typically inputs passwords “by hand”, etc. A person of skill in the art will recognize that there are many ways of identifying high risk, and that a variety of such methods can be used to trigger the notification and temporal lock-out disclosed herein. If a wallet with access rights to the account in question is accessing the services within this stated time period, this may be automatically interpreted as a denial for the high-risk access request to be allowed. Alternatively, as a user accesses the resource using the wallet, e.g., using an API, the user may be presented with another notification describing the anomalous access attempt, and asked whether this corresponds to the rightful owner of the account or not. If it does, the risk-detection settings for this account may be modified to allow such an access onwards. If not, the requested access, e.g., in the form of a stored salted and hashed password that will be enabled after the 48 h time period has lapsed, will be denied. This can be expressed by erasing the salted and hashed password that was created after the high-risk access. In one example situation, the creation of a new password is always considered indicative of high risk, and therefore triggers the temporal lock-out, whether 2FA was used or not. Wallet requests using the API will be authenticated, e.g., using the private key of the wallet. The newly created credential that is not yet activated can be said to be quarantined until a condition is satisfied, where this condition may be related to a time elapsing, an event taking place, or a combination of these. The event may be the absence of a response to a notification, but it may also be other indicators of risk or absence of risk.

The account or resource to which a user requests access can be a financial account, an account associated with an NFT marketplace, an email account, a social networking account, an enterprise communication or storage account, a service account such as NetFlix™, an account indicating physical access to a facility, or an account corresponding access to a device, an application running on a device, or a resource accessible from a device. A wallet is an example of an application running on a device.

The account or resource may be associated with one or more access methods, and may involve authentication involving passwords, PINs, security questions, 2FA, biometrics, dedicated removable hardware devices such as dongles, hardware wallets, or USB keys, or a combination of such approaches. The authentication may also depend on heuristics, including device identifiers, IP addresses, movement patterns, patterns of transactions, and more. The access can also be performed using an API, wherein requests are generated by an application or a plugin associated with a user device, and transmitted to a gatekeeper associated with the resource as part of a setup of a communication channel. The request to set up such a channel may comprise a digital signature that is verified using a public key associated with the resource.

The triggering of a block of an access may be associated with a variety of risk assessments. One type of risk assessment is associated with the registration of a new access credential, such as a new stored password or biometric template. It may also be based on an anomalous series of transactions or transaction attempts, or a distress signal transmitted by a user associated with the resource.

The disclosed technology may perform automated logging of select transactions and events. For example, it may log all access attempts to a resource, or all access attempts that succeed but which also satisfy some risk-based criteria. Transactions that can be logged include ownership transfers of tokens, such as crypto funds or non-fungible tokens. The system may log only some such transactions, e.g., those that are anomalous, high-value, are performed in rapid succession of each other, etc. In addition to logging events and transactions, these can be used to assess risk, and to trigger the lock-down of a resource as disclosed herein. The logging may be performed in a private database or on a public database, such as a blockchain ledger.

In one embodiment, the triggering of the blocking of a request is performed in response to the receipt of a request from a wallet associated with the protected resource, where the request corresponds to increased access rights. For example, a wallet associated with a resource and with read-only access to a given NFT may request to also obtain the right to transfer ownership if the NFT. This type of request may result in a different type of blocking than one that results from the use of a 2FA code to reset a password associated with a protected resource. For example, one of them may result in a waiting period of 3 days, whereas the other may result in a waiting period of two weeks. This may be governed by a policy set by the user associated with the resource, or may be automatically set based on common preferences.

Notifications and delayed actions can be triggered by a variety of events. One such event is the creation of a new credential. Another such event is the request to remove an existing active credential. A third such event is an anomalous event, such as the transfer of ownership of a large number of assets. The associated actions that are taken, e.g., adding a new credential, removing an identified credential, or transferring ownership of assets, may be taken after a condition is satisfied, such as a specified amount of time elapsing, unless a response to a notification is received.

FIGURES

Figure 36:
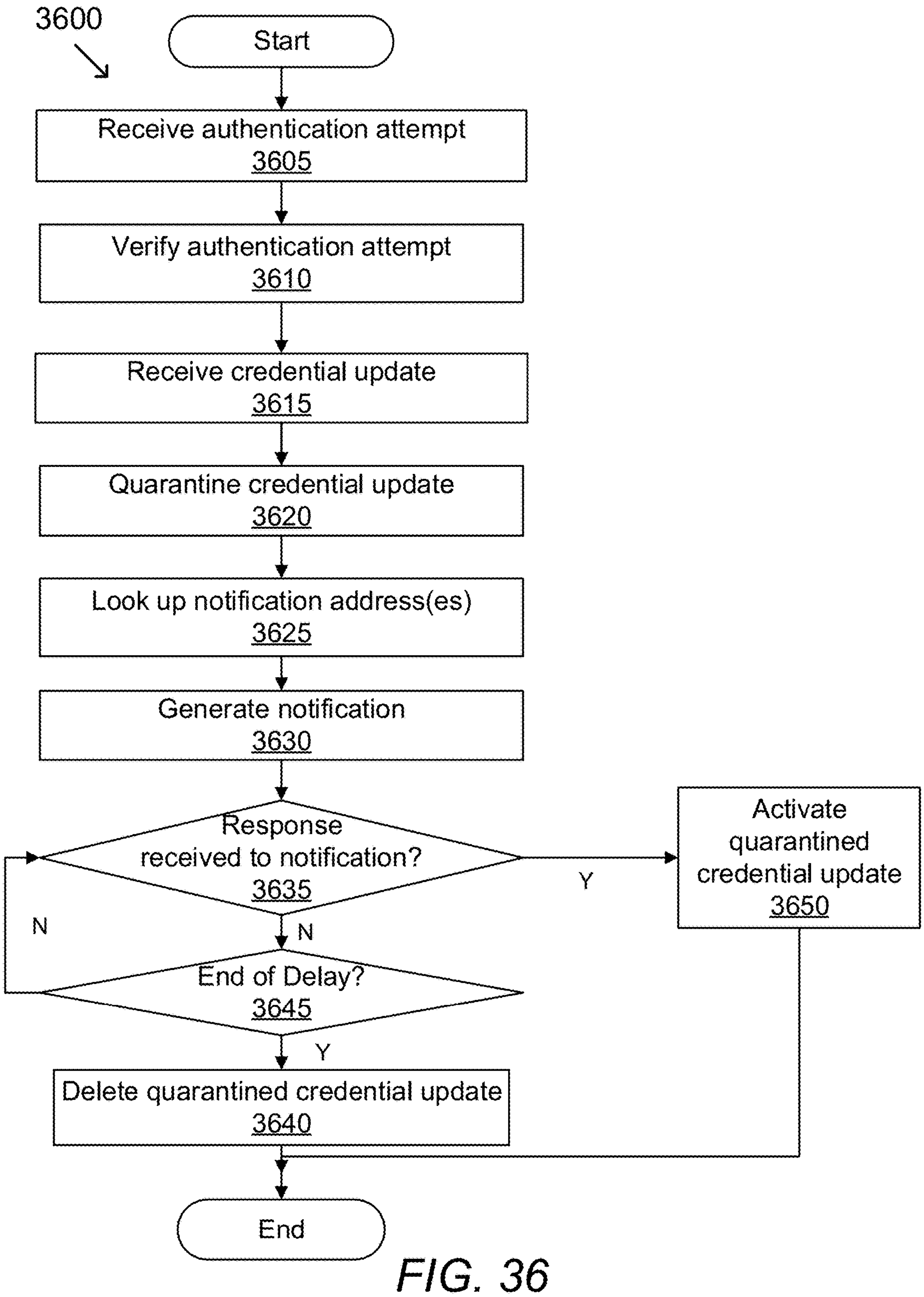
FIGS. 36-37 illustrate the implementation of second factor authentication in accordance with some embodiments of the invention.

FIG. 36 illustrates one embodiment of the disclosed technology. In step 3605, a unit receives an authentication attempt. This may be a 2FA authentication, a password-based authentication, a digital signature-based authentication, a biometrics-based authentication, etc. In step 3610, the received authentication attempt is verified, and determined to be valid. In step 3615 a credential update is received in the same session as the verified authentication attempt. The credential update may be a request to add a new access credential, such as a new 2FA authenticator module, a new public key for which digital signatures will be accepted, a new password, a new biometric credential, etc. It may also comprise receiving a new email address, phone number or other contact information to which 2FA codes may be sent.

This is a new form of authentication credential in that it allows access to a potentially new entity. In step 3620, the received credential from step 3615 is quarantined. This means that it is stored in a manner that is not allowing account access or login using such credential, until it has been validated. A time limit is stored with the quarantined credential, and indicates the duration of the quarantine. Other information such as logs indicating events and anomalies may also be stored. In step 3625, one or more notification addresses is looked up. These may be email addresses, phone numbers, addresses to which push notifications can be sent, etc. The notification address(es) have been stored in a profile associated with the protected resource previously, after a valid account access verification or after account creation. In step 3630, one or more notifications are generated and transmitted, to the one or more addresses determined in step 3625. In step 3635, it is determined whether a response has been received to a notification sent in step 3630. If yes and this indicates a wish to block the use of the quarantined credential, then the processing proceeds to step 3640, wherein the quarantined credential is deleted or otherwise made not usable onwards. In step 3645, it is determined whether the quarantine period has ended. If it has, the processing proceeds to step 3650, where the quarantined credential received in step 3615 is made active, allowing a login or other access using the credential. If the period has not ended, the processing continues to step 3635.

Figure 37:
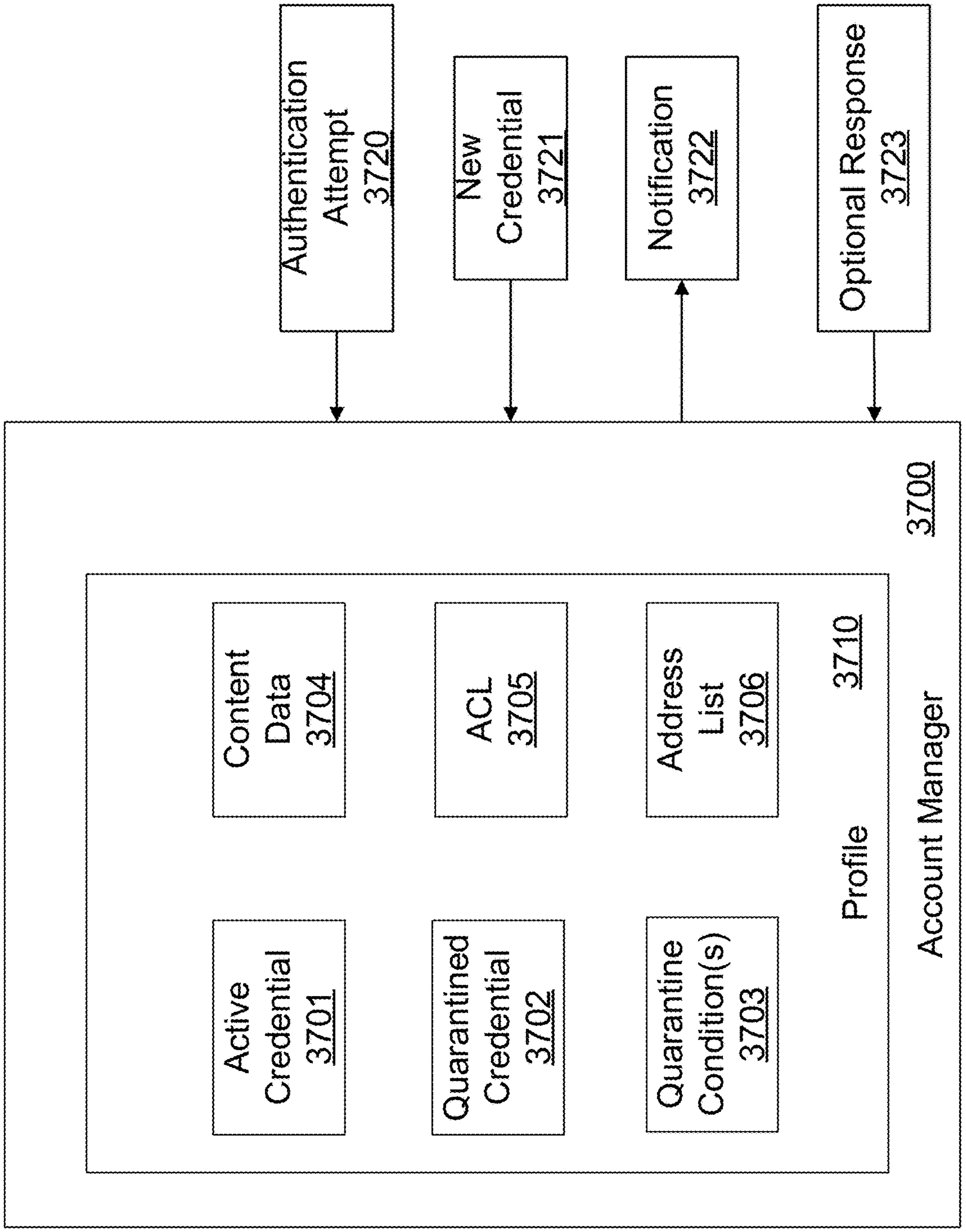

FIG. 37 illustrates an account manager 3700 that may be part of an online service provider, such as a financial institution or an NFT marketplace, or which may be part of a service representing a wallet and its users. The authentication attempt 3720 is the same as the one received in step 3605. Account manager selects profile 3710 based on authentication attempt 3720, and determines based on active credential 3701 whether to provide access, which may be limited. Active credential may be a value representing a password, a PIN, a biometric template, a public key, a 2FA code, etc. If access is permitted, this may be limited, e.g., based on a risk assessment, wherein the limitation enables some form of access but denies another form of access. The access control rules may be stored in ACL 3705, which may comprise rules and policies, as well as identifiers associated with users, credentials, and events. After gaining at least some access based on the verification 3610 of the data of the authentication attempt 3720, the account manager 3700 receives a request to create a new credential 3721, which is a credential other than an active credential 3701. There may be multiple active credentials and multiple quarantined credentials. The new credential 3721 is stored in profile 3710 as a quarantined credential 3702, and associated with a quarantine condition 3703, which may specify a time after which the quarantine ends, or one or more conditions related to events, one or more of which may be related to a time. The storing of quarantine credential 3702 and quarantine condition(s) 3703 corresponds to step 3620. One or more notification addresses is looked up in step 3620 by reading the contents of address list 3706. At least one notification 3722 is generated (step 3630) and transmitted to one or more addresses found in address list 3706. If the account manager 3700 receives an optional response 3723, where such a response is associated with notification 3722, then step 3640 is performed, wherein quarantined credential 3702 and quarantine condition(s) 3703 are erased, before potentially this event being logged. If an optional response 3723 is not received and the quarantine condition(s) 3703 are satisfied, then quarantined credential 3702 is changed to be an active credential, such as active credential 3701. The removal of an active credential may also serve to trigger a notification 3722, wherein the action of removing the active credential is performed after a condition is satisfied.

Systems and techniques directed towards implementing second factor authentication, in accordance with certain embodiments of the invention, are not limited to use within NFT platforms. Accordingly, it should be appreciated that applications described herein can be implemented outside the context of an NFT platform network architecture and in contexts unrelated to abuse protection for fungible tokens and/or NFTs. Moreover, any of the systems and methods described herein with reference to FIGS. 36-37 can be utilized within any of the NFT platforms described above.

Exemplary Embodiments

Systems and techniques to protect against abuses in the transfer and maintenance of tokens within NFT platforms are illustrated. A first embodiment comprises a method to facilitate filtration in blockchains. The method recovers, from a list of prospective entries to be appended to a primary blockchain, a reference to a blockchain entry, wherein the blockchain entry corresponds to a transaction. The method obtains a certainty level associated with the blockchain entry, wherein the certainty level reflects a likelihood that recording the blockchain entry on the primary blockchain will have harmful effects on the primary blockchain. The method assesses a classification of the blockchain entry based on the associated certainty level, wherein the classification is made a confirmation classification when the certainty level falls under a minimum threshold. The method determines whether to record the blockchain entry on the primary blockchain based on the classification, wherein the blockchain entry is recorded on the primary blockchain when the classification is the confirmation classification.

A second embodiment, including the features of the first embodiment and further comprising that the blockchain entry is temporarily stored on a secondary blockchain associated with the list of prospective entries during the determination of whether to record the blockchain entry on the primary blockchain.

A third embodiment, including the features of the second embodiment and further comprising that the primary blockchain is a layer-1 (L1) blockchain and the secondary blockchain is a layer-2 (L2) blockchain.

A fourth embodiment, including the features of any of the first to third embodiments and further comprising that when assessing the classification of the blockchain entry, the classification is made a blocking classification when the certainty level exceeds a maximum threshold; and the blockchain entry is deleted and the transaction associated with the blockchain entry is cancelled when the classification is a blocking classification.

A fifth embodiment, including the features of the fourth embodiment and further comprising that, when assessing the classification of the blockchain entry, the classification is made a delay classification when the certainty level neither exceeds the maximum threshold nor falls below the minimum threshold.

A sixth embodiment, including the features of any of the first to fifth embodiments and further comprising that assessing the classification of the blockchain entry is based on at least one of: feedback from at least one entity; time elapsed from when the transaction occurred; time elapsed from when the reference to the blockchain entry was first stored on the list of prospective entries; and a result from a process evaluating the blockchain entry.

A seventh embodiment, including the features of the fifth embodiment and further comprising that assessing the classification of the blockchain entry is performed by a vote conducted among a plurality of parties.

An eighth embodiment, including the features of the seventh embodiment and further comprising that the vote is conducted through a consensus mechanism.

A ninth embodiment, including the features of the seventh embodiment and further comprising that the vote is conducted through a quorum; wherein the quorum is determined through an application of digital signatures, using at least one private key.

A tenth embodiment, including the features of the ninth embodiment and further comprising that the at least one private key is shared with the plurality of parties using a polynomial secret sharing method.

An eleventh embodiment, including the features of the second embodiment and further comprising that the determination of whether to record the blockchain entry on the primary blockchain is performed by a bridge between the primary blockchain and the secondary blockchain.

A twelfth embodiment, including the features of the eleventh embodiment and further comprising that the bridge between the primary blockchain and the secondary blockchain is generated at periodic intervals, within which the recording of blockchain entries referenced on the list of prospective entries are added to the primary blockchain.

A thirteenth embodiment, including the features of the sixth or seventh embodiments and further comprising that the classification is made a delay classification when no feedback is received from the at least one entity before a predetermined amount of time after the transaction.

A fourteenth embodiment, including the features of any of the first to thirteenth embodiments and further comprising that the classification is a confirmation classification, the blockchain entry is hashed; and a hash value that results from the hash is logged on the primary blockchain.

A fifteenth embodiment, including the features of the fourteenth embodiment and further comprising that the hash is performed by at least one of: a proof of history configuration; and a Merkle tree constructed by a bridge between the primary blockchain and a secondary blockchain associated with the list of prospective entries that temporarily stores the blockchain entry.

A sixteenth embodiment, including the features of the fifth embodiment and further comprising that the blockchain entry is stored on a new secondary blockchain associated with a list of prospective entries to be appended to a new primary blockchain when the classification is the delay classification.

A seventeenth embodiment, including the features of any of the first to sixteenth embodiments and further comprising that the primary blockchain is an L2 blockchain.

An eighteenth embodiment, including the features of the seventeenth embodiment and further comprising that the blockchain entry is temporarily stored on an L3 blockchain.

A nineteenth embodiment, including the features of the sixth embodiment and further comprising that an entity is selected from the group consisting of: a smart contract; a bounty hunter, wherein the bounty hunter provides evidence of abuse associated with the transaction in exchange for a benefit; and an oracle.

A twentieth embodiment, including the features of any of the seventh to tenth embodiments and further comprising that the vote is conducted such that: the classification is made the confirmation classification when a particular majority of votes of the plurality of parties have voted to record the blockchain entry; the classification is made the blocking classification when a particular majority of votes of the plurality of parties have voted to refuse the blockchain entry; and the classification is made the delay classification when there are insufficient votes for a particular majority to exist for at least one of the recording of the blockchain entry and the refusal of the blockchain entry.

A twenty-first embodiment includes a non-transitory computer-readable medium storing instructions that, when executed by a processor, are configured to cause the processor to facilitate filtration in blockchains. The processor recovers, from a list of prospective entries to be appended to a primary blockchain, a reference to a blockchain entry, wherein the blockchain entry corresponds to a transaction. The processor obtains a certainty level associated with the blockchain entry, wherein the certainty level reflects a likelihood that recording the blockchain entry on the primary blockchain will have harmful effects on the primary blockchain. The processor assesses a classification of the blockchain entry based on the associated certainty level, wherein the classification is made a confirmation classification when the certainty level falls under a minimum threshold. The processor determines whether to record the blockchain entry on the primary blockchain based on the classification, wherein the blockchain entry is recorded on the primary blockchain when the classification is the confirmation classification.

A twenty-second embodiment, including the features of the twenty-first embodiment and further comprising that the blockchain entry is temporarily stored on a secondary blockchain associated with the list of prospective entries during the determination of whether to record the blockchain entry on the primary blockchain.

A twenty-third embodiment, including the features of the twenty-second embodiment and further comprising that the primary blockchain is a layer-1 (L1) blockchain and the secondary blockchain is a layer-2 (L2) blockchain.

A twenty-fourth embodiment, including the features of any of the twenty-first to twenty-third embodiments and further comprising that when assessing the classification of the blockchain entry, the classification is made a blocking classification when the certainty level exceeds a maximum threshold; and the blockchain entry is deleted and the transaction associated with the blockchain entry is cancelled when the classification is a blocking classification.

A twenty-fifth embodiment, including the features of the twenty-fourth embodiment and further comprising that, when assessing the classification of the blockchain entry, the classification is made a delay classification when the certainty level neither exceeds the maximum threshold nor falls below the minimum threshold.

A twenty-sixth embodiment, including the features of any of the twenty-first to twenty-fifth embodiments and further comprising that assessing the classification of the blockchain entry is based on at least one of: feedback from at least one entity; time elapsed from when the transaction occurred; time elapsed from when the reference to the blockchain entry was first stored on the list of prospective entries; and a result from a process evaluating the blockchain entry.

A twenty-seventh embodiment, including the features of the twenty-fifth embodiment and further comprising that assessing the classification of the blockchain entry is performed by a vote conducted among a plurality of parties.

A twenty-eighth embodiment, including the features of the twenty-seventh embodiment and further comprising that the vote is conducted through a consensus mechanism.

A twenty-ninth embodiment, including the features of the twenty-seventh embodiment and further comprising that the vote is conducted through a quorum; wherein the quorum is determined through an application of digital signatures, using at least one private key.

A thirtieth embodiment, including the features of the twenty-ninth embodiment and further comprising that the at least one private key is shared with the plurality of parties using a polynomial secret sharing method.

A thirty-first embodiment, including the features of the twenty-second embodiment and further comprising that the determination of whether to record the blockchain entry on the primary blockchain is performed by a bridge between the primary blockchain and the secondary blockchain.

A thirty-second embodiment, including the features of the thirty-first embodiment and further comprising that the bridge between the primary blockchain and the secondary blockchain is generated at periodic intervals, within which the recording of blockchain entries referenced on the list of prospective entries are added to the primary blockchain.

A thirty-third embodiment, including the features of the twenty-sixth or twenty-seventh embodiments and further comprising that the classification is made a delay classification when no feedback is received from the at least one entity before a predetermined amount of time after the transaction.

A thirty-fourth embodiment, including the features of any of the twenty-first to thirty-third embodiments and further comprising that the classification is a confirmation classification, the blockchain entry is hashed; and a hash value that results from the hash is logged on the primary blockchain.

A thirty-fifth embodiment, including the features of the thirty-fourth embodiment and further comprising that the hash is performed by at least one of: a proof of history configuration; and a Merkle tree constructed by a bridge between the primary blockchain and a secondary blockchain associated with the list of prospective entries that temporarily stores the blockchain entry.

A thirty-sixth embodiment, including the features of the twenty-fifth embodiment and further comprising that the blockchain entry is stored on a new secondary blockchain associated with a list of prospective entries to be appended to a new primary blockchain when the classification is the delay classification.

A thirty-seventh embodiment, including the features of any of the twenty-first to thirty-sixth embodiments and further comprising that the primary blockchain is an L2 blockchain.

A thirty-eighth embodiment, including the features of the thirty-seventh embodiment and further comprising that the blockchain entry is temporarily stored on an L3 blockchain.

A thirty-ninth embodiment, including the features of the twenty-sixth embodiment and further comprising that an entity is selected from the group consisting of: a smart contract; a bounty hunter, wherein the bounty hunter provides evidence of abuse associated with the transaction in exchange for a benefit; and an oracle.

A fortieth embodiment, including the features of any of the twenty-seventh to thirtieth embodiments and further comprising that the vote is conducted such that: the classification is made the confirmation classification when a particular majority of votes of the plurality of parties have voted to record the blockchain entry; the classification is made the blocking classification when a particular majority of votes of the plurality of parties have voted to refuse the blockchain entry; and the classification is made the delay classification when there are insufficient votes for a particular majority to exist for at least one of the recording of the blockchain entry and the refusal of the blockchain entry.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method to facilitate filtration in blockchains, comprising:

recovering, from a list of prospective entries to be appended to a primary blockchain, a reference to a blockchain entry, wherein the blockchain entry:
- corresponds to at least one action; and
- is temporarily stored on a secondary blockchain associated with the list of prospective entries;

obtaining, from the primary blockchain, a certainty level associated with the blockchain entry, wherein the certainty level reflects a likelihood that recording the blockchain entry on the primary blockchain will have harmful effects on the primary blockchain;

assessing a classification of the blockchain entry based on the certainty level, wherein:
- the classification is made a blocking classification when the certainty level exceeds a maximum threshold;
- the classification is made a confirmation classification when the certainty level falls under a minimum threshold; and
- the classification is made a delay classification when at least one of:
  - the certainty level neither exceeds the maximum threshold nor falls below the minimum threshold; or
  - no feedback is received from a validating entity before a predetermined amount of time after a given action of the at least one action;

when the classification is the blocking classification:
- deleting the blockchain entry; and
- canceling the at least one action associated with the blockchain entry;

when the classification is the confirmation classification:
- deleting the blockchain entry from the secondary blockchain; and
- recording the blockchain entry on the primary blockchain; and when the classification is the delay classification, temporarily storing the blockchain entry on a new secondary blockchain associated with a list of new prospective entries to be appended to a new primary blockchain.

2. The method of claim 1, wherein the primary blockchain is a layer-1 (L1) blockchain and the secondary blockchain is a layer-2 (L2) blockchain.

3. The method of claim 1, wherein assessing the classification of the blockchain entry is based on at least one factor selected from the group consisting of:

feedback from at least one entity;

time elapsed from when a given action of the at least one action occurred;

time elapsed from when the reference to the blockchain entry was first stored on the list of prospective entries; and a result from a process evaluating the blockchain entry.

4. The method of claim 1, wherein assessing the classification of the blockchain entry is performed by a vote conducted through a consensus mechanism among a plurality of parties.

5. The method of claim 4, wherein:
the vote is further conducted through a quorum;
the quorum is determined through an application of digital signatures, using at least one private key; and
the at least one private key is shared with the plurality of parties using a polynomial secret sharing method.

6. The method of claim 1, wherein:
recording the blockchain entry on the primary blockchain is performed by a bridge between the primary blockchain and the secondary blockchain; and
the bridge between the primary blockchain and the secondary blockchain is generated at periodic intervals, within which recording the blockchain entry on the primary blockchain is performed.

7. The method of claim 1, wherein when the classification is the confirmation classification,
the blockchain entry is hashed; and
a hash value that results from the hash is logged on the primary blockchain.

8. The method of claim 7, wherein the hash is performed by at least one structure selected from the group consisting of:
a proof of history configuration; and
a Merkle tree constructed by a bridge between the primary blockchain and the secondary blockchain.

9. A non-transitory computer-readable medium storing instructions that, when executed by a processor, are configured to cause the processor to facilitate filtration in blockchains, comprising:
recovering, from a list of prospective entries to be appended to a primary blockchain, a reference to a blockchain entry, wherein the blockchain entry:
corresponds to at least one action; and
is temporarily stored on a secondary blockchain associated with the list of prospective entries;
obtaining, from the primary blockchain, a certainty level associated with the blockchain entry, wherein the certainty level reflects a likelihood that recording the blockchain entry on the primary blockchain will have harmful effects on the primary blockchain;
assessing a classification of the blockchain entry based on the certainty level, wherein:
the classification is made a blocking classification when the certainty level exceeds a maximum threshold;
the classification is made a confirmation classification when the certainty level falls under a minimum threshold; and
the classification is made a delay classification when at least one of:
the certainty level neither exceeds the maximum threshold nor falls below the minimum threshold; or
no feedback is received from a validating entity before a predetermined amount of time after a given action of the at least one action;
when the classification is the blocking classification:
deleting the blockchain entry; and
canceling the at least one action associated with the blockchain entry:
when the classification is the confirmation classification:
deleting the blockchain entry from the secondary blockchain; and
recording the blockchain entry on the primary blockchain; and
when the classification is the delay classification, temporarily storing the blockchain entry on a new secondary blockchain associated with a list of new prospective entries to be appended to a new primary blockchain.

10. The non-transitory computer-readable medium of claim 9, wherein the primary blockchain is a layer-1 (L1) blockchain and the secondary blockchain is a layer-2 (L2) blockchain.

11. The non-transitory computer-readable medium of claim 9, wherein assessing the classification of the blockchain entry is based on at least one factor selected from the group consisting of:
feedback from at least one entity;
time elapsed from when a given action of the at least one action occurred;
time elapsed from when the reference to the blockchain entry was first stored on the list of prospective entries; and
a result from a process evaluating the blockchain entry.

12. The non-transitory computer-readable medium of claim 9, wherein assessing the classification of the blockchain entry is performed by a vote conducted through a consensus mechanism among a plurality of parties.

13. The non-transitory computer-readable medium of claim 12, wherein:
the vote is further conducted through a quorum;
the quorum is determined through an application of digital signatures, using at least one private key; and
the at least one private key is shared with the plurality of parties using a polynomial secret sharing method.

14. The non-transitory computer-readable medium of claim 9, wherein:
the processor records the blockchain entry on the primary blockchain by generating a bridge between the primary blockchain and the secondary blockchain; and
the bridge between the primary blockchain and the secondary blockchain is generated at periodic intervals, within which recording the blockchain entry on the primary blockchain is performed.

15. The non-transitory computer-readable medium of claim 9, wherein when the classification is the confirmation classification, the blockchain entry is hashed; and a hash value that results from the hash is logged on the primary blockchain.

16. The non-transitory computer-readable medium of claim 15, wherein the hash is performed by at least one structure selected from the group consisting of:
a proof of history configuration; and
a Merkle tree constructed by a bridge between the primary blockchain and the secondary blockchain.

* * * * *